United States Patent
Manolakos et al.

(10) Patent No.: US 12,500,716 B2
(45) Date of Patent: *Dec. 16, 2025

(54) BANDWIDTH PART OPERATION AND DOWNLINK OR UPLINK POSITIONING REFERENCE SIGNAL SCHEME

(71) Applicant: QUALCOMM Incorporated, San Diego, CA (US)

(72) Inventors: Alexandros Manolakos, Escondido, CA (US); Joseph Binamira Soriaga, San Diego, CA (US); Sony Akkarakaran, Poway, CA (US); Guttorm Ringstad Opshaug, Redwood City, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 213 days.

This patent is subject to a terminal disclaimer.

(21) Appl. No.: 18/534,310

(22) Filed: Dec. 8, 2023

(65) Prior Publication Data
US 2024/0113828 A1 Apr. 4, 2024

Related U.S. Application Data

(63) Continuation of application No. 16/746,594, filed on Jan. 17, 2020, now Pat. No. 12,273,286.
(Continued)

(51) Int. Cl.
*H04L 5/00* (2006.01)
*H04W 4/029* (2018.01)
(Continued)

(52) U.S. Cl.
CPC .......... *H04L 5/0048* (2013.01); *H04W 4/029* (2018.02); *H04W 24/08* (2013.01); *H04W 72/04* (2013.01)

(58) Field of Classification Search
CPC ..... H04L 5/0048; H04L 5/0091; H04L 5/001; H04L 5/0016; H04W 4/029; H04W 24/08;
(Continued)

(56) References Cited

U.S. PATENT DOCUMENTS 7,542,504 B2 6/2009 Chang et al.
8,000,273 B2 8/2011 He et al.
(Continued)

FOREIGN PATENT DOCUMENTS

CN 102422663 A 4/2012
CN 102461292 A 5/2012
(Continued)

OTHER PUBLICATIONS

Intel Corporation: "Downlink and Uplink Reference Signals for NR Positioning", 3GPP TSG RAN WG1 Meeting #96bis, R1-1904320, Xi'an, China, Apr. 8, 2019-Apr. 12, 2019, Apr. 3, 2019, pp. 1-15.
(Continued)

*Primary Examiner* — Said M Elnoubi
(74) *Attorney, Agent, or Firm* — QUALCOMM Incorporated

(57) ABSTRACT

Methods, systems, and devices for wireless communications are described. A user equipment (UE) may receive an indication of a positioning reference signal configuration of a base station. The UE may determine, based on the positioning reference signal configuration, a reference point within a carrier bandwidth of a component carrier and a frequency domain allocation for a positioning reference
(Continued)

signal relative to the reference point. The UE may transmit the positioning reference signal or measure the positioning reference signal based on the frequency domain allocation.

30 Claims, 26 Drawing Sheets

Related U.S. Application Data

(60) Provisional application No. 62/795,514, filed on Jan. 22, 2019, provisional application No. 62/794,958, filed on Jan. 21, 2019.

(51) Int. Cl.
*H04W 24/08* (2009.01)
*H04W 72/04* (2023.01)

(58) Field of Classification Search
CPC ......... H04W 72/04; H04W 4/02; H04W 4/70; H04W 64/00; H04W 8/24; H04W 72/0453; H04W 72/0457; H04W 72/231; H04W 72/232
See application file for complete search history.

(56) References Cited

U.S. PATENT DOCUMENTS

| | | | |
|---|---|---|---|
| 8,254,329 B2 | 8/2012 | Ko et al. |
| 8,254,344 B2 | 8/2012 | Akita et al. |
| 8,428,157 B2 | 4/2013 | Kakura et al. |
| 8,654,727 B2 | 2/2014 | Dai et al. |
| 8,675,752 B2 | 3/2014 | Lahtonen et al. |
| 8,718,001 B2 | 5/2014 | Zhang et al. |
| 8,750,870 B2 | 6/2014 | Palanki et al. |
| 8,855,068 B2 | 10/2014 | Qin et al. |
| 9,036,538 B2 | 5/2015 | Palanki |
| 9,326,283 B2 | 4/2016 | Shin et al. |
| 9,369,250 B2 | 6/2016 | Liu |
| 9,651,653 B2 | 5/2017 | Fischer et al. |
| 9,755,712 B1 | 9/2017 | Bultan et al. |
| 9,763,251 B2 | 9/2017 | Papasakellariou et al. |
| 9,794,039 B2 | 10/2017 | Kwak et al. |
| 9,814,015 B2 | 11/2017 | Xiao et al. |
| 9,913,239 B2 | 3/2018 | Tinnakornsriuphap et al. |
| 10,021,667 B2 | 7/2018 | Akkarakaran et al. |
| 10,171,210 B2 | 1/2019 | Gong et al. |
| 10,333,670 B2 | 6/2019 | Rico Alvarino et al. |
| 10,716,084 B2 | 7/2020 | Wang et al. |
| 10,736,074 B2 | 8/2020 | Edge et al. |
| 11,082,183 B2 | 8/2021 | Bao et al. |
| 11,239,967 B2 | 2/2022 | Manolakos et al. |
| 11,290,229 B2 | 3/2022 | Chuang et al. |
| 11,350,437 B2 | 5/2022 | Xiong et al. |
| 11,496,265 B2 | 11/2022 | Bao |
| 11,496,990 B2 | 11/2022 | Edge et al. |
| 11,777,764 B2 | 10/2023 | Sun et al. |
| 2003/0215035 A1 | 11/2003 | Amerga et al. |
| 2005/0271012 A1 | 12/2005 | Agrawal et al. |
| 2006/0128416 A1 | 6/2006 | Linebarger et al. |
| 2007/0002813 A1 | 1/2007 | Tenny et al. |
| 2010/0130230 A1 | 5/2010 | Aggarwal et al. |
| 2011/0003551 A1 | 1/2011 | Kameno et al. |
| 2012/0021758 A1 | 1/2012 | Gum et al. |
| 2012/0231809 A1 | 9/2012 | Siomina et al. |
| 2012/0252487 A1 | 10/2012 | Siomina et al. |
| 2012/0287882 A1 | 11/2012 | Kim et al. |
| 2013/0029669 A1 | 1/2013 | Boudreau et al. |
| 2013/0165052 A1 | 6/2013 | Chuang |
| 2013/0265962 A1 | 10/2013 | Ouchi et al. |
| 2013/0324154 A1 | 12/2013 | Raghupathy et al. |
| 2014/0073356 A1 | 3/2014 | Siomina et al. |
| 2014/0349582 A1 | 11/2014 | Xiao et al. |
| 2015/0018010 A1 | 1/2015 | Fischer |
| 2015/0063228 A1 | 3/2015 | Aldana |
| 2015/0118678 A1 | 4/2015 | Mandecki et al. |
| 2015/0124673 A1 | 5/2015 | Ouchi et al. |
| 2015/0133173 A1 | 5/2015 | Edge et al. |
| 2015/0188678 A1 | 7/2015 | Wu et al. |
| 2015/0263837 A1 | 9/2015 | Patel et al. |
| 2015/0289311 A1 | 10/2015 | Chang et al. |
| 2015/0382205 A1 | 12/2015 | Lee et al. |
| 2016/0065342 A1 | 3/2016 | Mirbagheri et al. |
| 2016/0094326 A1 | 3/2016 | Moon et al. |
| 2016/0095105 A1 | 3/2016 | Chen et al. |
| 2016/0165458 A1 | 6/2016 | Peng et al. |
| 2016/0192385 A1 | 6/2016 | Tooher et al. |
| 2016/0226647 A1 | 8/2016 | Wang et al. |
| 2017/0026794 A1 | 1/2017 | Baker et al. |
| 2017/0104517 A1 | 4/2017 | Kakishima et al. |
| 2017/0111880 A1* | 4/2017 | Park ...................... H04W 64/00 |
| 2017/0164315 A1 | 6/2017 | Smith |
| 2017/0180194 A1 | 6/2017 | Noh et al. |
| 2017/0201960 A1 | 7/2017 | Park et al. |
| 2017/0238298 A1 | 8/2017 | Wang et al. |
| 2017/0251497 A1 | 8/2017 | Larsson et al. |
| 2017/0288830 A1 | 10/2017 | Fischer |
| 2017/0324455 A1 | 11/2017 | Soriaga et al. |
| 2018/0006787 A1 | 1/2018 | Chen et al. |
| 2018/0020423 A1 | 1/2018 | Wang et al. |
| 2018/0049151 A1 | 2/2018 | Yoon et al. |
| 2018/0097596 A1 | 4/2018 | Palanivelu et al. |
| 2018/0098314 A1 | 4/2018 | Rico Alvarino et al. |
| 2018/0124787 A1 | 5/2018 | Wang et al. |
| 2018/0192404 A1 | 7/2018 | Maaref et al. |
| 2018/0198509 A1 | 7/2018 | Nilsson et al. |
| 2018/0217228 A1 | 8/2018 | Edge et al. |
| 2018/0287682 A1 | 10/2018 | Kwak et al. |
| 2018/0295590 A1 | 10/2018 | Abedini et al. |
| 2018/0324771 A1 | 11/2018 | Hosseini et al. |
| 2018/0375710 A1 | 12/2018 | Chae |
| 2019/0007152 A1 | 1/2019 | Yi et al. |
| 2019/0013909 A1 | 1/2019 | Li et al. |
| 2019/0020454 A1 | 1/2019 | Kim et al. |
| 2019/0052443 A1 | 2/2019 | Cheng et al. |
| 2019/0053287 A1 | 2/2019 | Lin et al. |
| 2019/0068315 A1 | 2/2019 | Ryden et al. |
| 2019/0068346 A1 | 2/2019 | Akkarakaran et al. |
| 2019/0081660 A1 | 3/2019 | Han et al. |
| 2019/0159182 A1* | 5/2019 | Ranta-aho ............. H04W 16/12 |
| 2019/0165913 A1 | 5/2019 | He et al. |
| 2019/0166514 A1 | 5/2019 | Liu |
| 2019/0174440 A1 | 6/2019 | Kwak et al. |
| 2019/0174454 A1 | 6/2019 | Priyanto et al. |
| 2019/0178976 A1 | 6/2019 | Xiong et al. |
| 2019/0182899 A1 | 6/2019 | Ye et al. |
| 2019/0190669 A1 | 6/2019 | Park et al. |
| 2019/0273587 A1 | 9/2019 | Takeda et al. |
| 2019/0285722 A1 | 9/2019 | Markhovsky et al. |
| 2019/0349898 A1 | 11/2019 | Fu et al. |
| 2020/0036556 A1 | 1/2020 | Wei et al. |
| 2020/0091608 A1 | 3/2020 | Alpman et al. |
| 2020/0213161 A1 | 7/2020 | Zhang et al. |
| 2020/0220676 A1 | 7/2020 | Xu et al. |
| 2020/0235877 A1 | 7/2020 | Manolakos et al. |
| 2020/0267718 A1 | 8/2020 | Park et al. |
| 2020/0275416 A1 | 8/2020 | Haghighat et al. |
| 2020/0288482 A1 | 9/2020 | Yi et al. |
| 2020/0296716 A1 | 9/2020 | Lin et al. |
| 2020/0313732 A1 | 10/2020 | Yang et al. |
| 2020/0336264 A1 | 10/2020 | Faxer et al. |
| 2020/0351818 A1 | 11/2020 | Park et al. |
| 2021/0006372 A1 | 1/2021 | Cha et al. |
| 2021/0021447 A1 | 1/2021 | Sun |
| 2021/0036825 A1 | 2/2021 | Choi et al. |
| 2021/0070451 A1 | 3/2021 | Manolakos et al. |
| 2021/0105812 A1 | 4/2021 | Rastegardoost et al. |
| 2021/0120522 A1 | 4/2021 | Kim et al. |
| 2021/0144743 A1 | 5/2021 | Rastegardoost et al. |
| 2021/0176687 A1 | 6/2021 | Ko et al. |
| 2021/0195620 A1 | 6/2021 | Yoshimura et al. |
| 2021/0211957 A1 | 7/2021 | Kamohara et al. |
| 2021/0227509 A1 | 7/2021 | Zhang |
| 2021/0311158 A1 | 10/2021 | Akkarakaran et al. |

(56) References Cited

U.S. PATENT DOCUMENTS

| | | | |
|---|---|---|---|
| 2021/0351887 | A1 | 11/2021 | Qi |
| 2022/0095304 | A1 | 3/2022 | Muruganathan et al. |
| 2022/0132620 | A1 | 4/2022 | Yoshimura et al. |
| 2022/0377701 | A1 | 11/2022 | Edge et al. |
| 2023/0080106 | A1 | 3/2023 | Ji et al. |
| 2024/0023059 | A1 | 1/2024 | Edge et al. |
| 2024/0356700 | A1 | 10/2024 | Manolakos et al. |

FOREIGN PATENT DOCUMENTS

| | | |
|---|---|---|
| CN | 103004267 A | 3/2013 |
| CN | 103703814 A | 4/2014 |
| CN | 103944685 A | 7/2014 |
| CN | 104488345 A | 4/2015 |
| CN | 104885554 A | 9/2015 |
| CN | 105164930 A | 12/2015 |
| CN | 106105073 A | 11/2016 |
| CN | 106341882 A | 1/2017 |
| CN | 107733549 A | 2/2018 |
| CN | 107733563 A | 2/2018 |
| EP | 2418887 A2 | 2/2012 |
| EP | 2663144 A2 | 11/2013 |
| EP | 3041301 A1 | 7/2016 |
| EP | 3306337 A1 | 4/2018 |
| EP | 3490319 A1 | 5/2019 |
| JP | H07111675 A | 4/1999 |
| JP | 2012523738 A | 10/2012 |
| JP | 2012525724 A | 10/2012 |
| JP | 2014216951 A | 11/2014 |
| JP | 2016508217 A | 3/2016 |
| JP | 2017098960 A | 6/2017 |
| JP | 2020533860 A | 11/2020 |
| KR | 20170030773 A | 3/2017 |
| TW | 201828624 A | 8/2018 |
| WO | WO2007022715 A1 | 3/2007 |
| WO | WO-2009096319 A1 | 8/2009 |
| WO | WO2010059940 A1 | 5/2010 |
| WO | WO2011085267 A2 | 7/2011 |
| WO | WO2011139201 A1 | 11/2011 |
| WO | WO2013112972 A1 | 8/2013 |
| WO | WO2013134724 A1 | 9/2013 |
| WO | WO-2014105324 A1 | 7/2014 |
| WO | WO2014131349 A1 | 9/2014 |
| WO | WO2015027118 A1 | 2/2015 |
| WO | WO2015031031 A1 | 3/2015 |
| WO | WO2015138178 A1 | 9/2015 |
| WO | WO2016036840 A1 | 3/2016 |
| WO | WO2016065368 A1 | 4/2016 |
| WO | WO2016122757 A1 | 8/2016 |
| WO | WO2016155810 A1 | 10/2016 |
| WO | WO2016164085 A1 | 10/2016 |
| WO | WO2017040075 A1 | 3/2017 |
| WO | WO2017048064 A1 | 3/2017 |
| WO | WO2017126907 A1 | 7/2017 |
| WO | WO2017200708 A1 | 11/2017 |
| WO | WO2018013672 A1 | 1/2018 |
| WO | WO2018085145 A1 | 5/2018 |
| WO | WO2018126356 A1 | 7/2018 |
| WO | WO2018127137 A1 | 7/2018 |
| WO | WO2018128401 A1 | 7/2018 |
| WO | WO2019000180 A1 | 1/2019 |
| WO | WO-2019047776 A1 | 3/2019 |
| WO | WO2019212246 A1 | 11/2019 |
| WO | WO2020001380 A1 | 1/2020 |
| WO | WO2020145873 A1 | 7/2020 |
| WO | WO2021071570 A1 | 4/2021 |

OTHER PUBLICATIONS

Ericsson: "Uplink Positioning Solutions: Design and Evaluations", 3GPP TSG RAN WG1 96, R1-1903140, Athens, Greece, Feb. 25, 2019-Mar. 1, 2019, Feb. 15, 2019, 6 Pages.

Nokia, et al., "Potential Positioning Techniques—UL Based Solutions", 3GPP TSG RAN WG1 Meeting #96, R1-1901848, Athens, Greece, Feb. 25, 2019-Mar. 1, 2019, Feb. 15, 2019, 6 Pages.

Ericsson: "DFT size for Uplink Transmissions", 3GPP TSG-RAN WG1 #47, R1-063127, Riga, Latvia, Nov. 6, 2006-Nov. 10, 2006, 2 Pages, Nov. 1, 2006.

U.S. Appl. No. 62/740,459, inventor Chiao-Yao; Chuang, filed Oct. 3, 2018, 16 pages.

Sony: "Discussion on OTDOA NR Positioning", 3GPP TSG RAN WG2 Meeting #104, R2-1817081, Spokane, USA, Nov. 12-16, 2018, 3 pages.

3GPP: "3rd Generation Partnership Project, Technical Specification Group Radio Access Network, NR, Physical Layer Procedures for Data (Release 16)", 3GPP TS 38.214, 3rd Generation Partnership Project, Mobile Competence Centre, 650, Route Des Lucioles, F-06921 Sophia-Antipolis Cedex, France, vol. RAN WG1, No. V16.0.0, Dec. 2019, Jan. 14, 2020, XP051860777, pp. 1-147, Section 5.2, Table 6.2.3.1-1, Table 6.2.3.1-2, Table 6.2.3.1-3, section 5.1.6.2, pp. 41.

CATT: "DL Reference Signals for NR Positioning", 3GPP TSG RAN WG1 #97, R1-1906305, V1.0 Final, 3rd Generation Partnership Project, Mobile Competence Centre, 650, Route Des Lucioles, F-06921 Sophia-Antipolis Cede, vol. RAN WG1, No. Reno, USA, May 13, 2019-May 17, 2019 May 13, 2019, XP051727755, pp. 1-17.

Ericsson: "DL and UL Reference Signals for NR Positioning", 3GPP TSG RAN WG1 96, R1-1905461, Xi'an, P.R. China, Apr. 8, 2019-Apr. 12, 2019, Apr. 3, 2019, pp. 1-15.

Ericsson: "DL Reference Signals for NR Positioning", 3GPP TSG RAN WG1 Meeting #97, R1-1907508, 3rd Generation Partnership Project, Mobile Competence Centre, 650, Route Des Lucioles, F-06921 Sophia-Antipolis Cedex, France, vol. RAN WG1, No. Reno, NV, USA, May 13-17, 2019, May 3, 2019, 27 Pages, XP051709523, paragraph [2.2.2].

Ericsson: "DL Reference Signals for NR Positioning", 3GPP TSG-RAN WG1 Meeting #98, Prague, R1-1909424, CZ, Aug. 26-30, 2019 (Year: 2019), pp. 1-28.

Ericsson: "Downlink Positioning Solutions: Design and Evaluations", 3GPP TSG RAN WG1 96, R1-1903139 DL Positioning Solutions, 3rd Generation Partnership Project, Mobile Competence Centre, 650, Route Des Lucioles, F-06921 Sophia-Antipolis Cedex, France, vol. RAN WG1. No. Athens. Greece, Feb. 25, 2019-Mar. 1, 2019, Feb. 15, 2019, XP051600835, 28 Pages.

Ericsson: "RAT Dependent NR Positioning Solutions", [Online] 3GPP TSG-RAN WG1 #95, R1-1813592, RAT Dependent NR Positioning Solutions, 3rd Generation Partnership Project, Mobile Competence Centre, 650, Route Des Lucioles, F-06921 Sophia-Antipolis Cedex, France, vol. RAN WG1. No. Spokane, United States, Nov. 12, 2018-Nov. 16, 2018, Nov. 11, 2018, XP051555648, 17 Pages.

Ericsson: "Uplink Positioning Solutions: Design and Evaluations", 3GPP Draft, 3GPP TSG RAN WG1 #96, R1-1903140 UL Positioning Solutions, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019 Feb. 15, 2019 (Feb. 15, 2019), XP051600836, 7 Pages, figure 1 p. 3-p. 4.

ETSI TS 138 211 V16.2.0, "Physical Channels and Modulation", 5G, NR, 3GPP TS 38.211, version 16.2.0, Release 16, Jul. 2020, pp. 1-135.

ETSI TS 138 211: "5G, NR, Physical Channels and Modulation (3GPP TS 38.211 Version 15.2.0 Release 15)", V15.2.0 (Jul. 2018), 98 Pages, 2018.

Fischer S., "Observed Time Difference of Arrival (OTDOA) Positioning in 3GPP LTE", Qualcomm Technologies Inc, Jun. 6, 2014, XP055284784, pp. 1-62, Figures 6-4, Section 6.3 LPP Procedures.

Huawei, et al., "Downlink Based Solutions for NR Positioning", 3GPP TSG RAN WG1 Ad-Hoc Meeting 1901, R1-1900036, 3rd Generation Partnership Project, Mobile Competence Centre, 650, Route Des Lucioles, F-06921 Sophia-Antipolis Cedex, France, vol. RAN WG1, No. Taipei, Jan. 21, 2019-Jan. 25, 2019, Jan. 20, 2019, XP051592962, 7 Pages.

(56) References Cited

OTHER PUBLICATIONS

Indian Patent Application No. 201941012233, filed Mar. 28, 2019, 102 pages.
Intel Corporation: "Design of Downlink Reference Signals for NR Positioning", 3GPP TSG RAN WG1 Meeting #97, R1-1906821, Reno, USA, May 13-17, 2019, pp. 1-17.
Intel Corporation: "DL Reference Signals for NR Positioning", R1-1908659 Intel—NRPOS DLRS, 3rd Generation Partnership Project, Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019, XP051765267, 27 pages.
Intel Corporation: "Offline Discussion Outcome on DL Reference Signals for NR", 3GPP TSG RAN WG1 Meeting #96bis, R1-1905847, Xi'an, China, Apr. 8-12, 2019, pp. 1-12.
International Search Report and Written Opinion—PCT/US2020/014404—ISA/EPO—Apr. 14, 2020.
Keating R., et al., "Overview of Positioning in 5G New Radio", 2019 16th International Symposium on Wireless Communication Systems, IEEE, Aug. 27, 2019, XP033636268, pp. 320-324, p. 323-p. 324.
LG Electronics: "Discussion on Potential Enhancements for Indoor Positioning", 3GPP Draft, R1-150229 Discussion on potential enhancements for indoor positioning, 3rd Generation Partnership Project (3GPP), vol. Ran WG1, Athens, Greece; Feb. 8, 2015, pp. 1-4, XP050933443, retrieved from the Internet: URL: http://www.3gpp.org/ftp/Meetings_3GPP_SYNC/RAN1/Docs/" title"Link:http://www.3gpp.org/ftp/Meeting_3GPP_SYNC/RAN1/Docs/">http://www.3gpp.org/ftp/Meetings_3GPP_SYNC/RAN1/Docs/.
Media Tek Inc: "Views on Potential Positioning Techniques", R1-1812373, 3GPP TSG-RAN WG1 Meeting #95, Spokane, USA, Nov. 12-Nov. 16, 2018, Date of Publication: Nov. 3, 2018, 6 Pages, http://www.3gpp.Org/Ftp/Tsg_ran/WG1_RL1/TSGR1_95/Docs/R1-1812373.Zip">http://www.3gpp.Org/Ftp/Tsg_ran/WG1_RL1/TSGR1_95/Docs/R1-1812373.Zip.
Mediatek Inc: "On Downlink OTDOA and Angle based Techniques", 3GPP TSG-RAN WG1 #96 Meeting, R1-1903239, Athens, Greece, Feb. 25- Mar. 1, 2019, 8 Pages.
Mediatek Inc: "On Downlink OTDOA Technique: Potential Reference Signal Design", 3GPP Draft, 3GPP TSG-RAN WG1 Ad-Hoc Meeting 1901, R1-1900203 on downlink OTDOA Technique_Final, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593127, 6 Pages, Sections 1-5, figures 4-5.
Mediatek Inc: "Reference Signal Design for NR Positioning", 3GPP Draft, 3GPP TSG-RAN WG1 #96bis Meeting, R1-1904500 DL RS Design_Final, 3rd Generation Partnership Project (3GPP), Mobile Competence Centre , 650, Route Des Lucioles, F-06921 Sophia-Antipolis Cedex, France, vol. RAN WG1. No. Xi'an, China, Apr. 8, 2019-Apr. 12, 2019, Apr. 3, 2019 (Apr. 3, 2019), XP051707240, 24 Pages, Sections 1-4, figures 2e, 2f.
NEXTNAV: "Synchronization for OTDOA Simulations", R1-150691, 3GPP TSG RAN WG1 Meeting #80, Athens, Greece, Feb. 9-13, 2015, 3 Pages.
Nokia., et al., "Views on DL and UL Reference Signals for NR Positioning", 3GPP TSG RAN WG1 #96bis, R1-1905262, 3rd Generation Partnership Project, Mobile Competence Centre, 650, Route Des Lucioles, F-06921 Sophia-Anti Polis Cedex, France, vol. RAN WG1, No. Xi'an, China, Apr. 8, 2019-Apr. 12, 2019, Apr. 2, 2019, XP051707399, 8 Pages, Sections 1-3, figure 3, The whole document.
Shin E., et al., "Sounding Reference Signal Measurement in LTE System", 18th International Conference on Advanced Communication Technology (ICACT), Mar. 3, 2016, pp. 755-758.
Specification of U.S. Appl. No. 62/726,480, filed Sep. 4, 2018, 28 Pages.
Specification of U.S. Appl. No. 62/740,459, filed Oct. 3, 2018, 12 Pages.
Taiwan Search Report—TW109102041—TIPO—Mar. 7, 2023.
VIVO: "Discussion on DL RS for NR Positioning", R1-1908174, 3GPP TSG RAN WG1 #98, Prague, CZ, Aug. 26-30, 2019, 13 Pages.
White Paper: "An Overview of LTE Positioning", Feb. 2012, SPIRENT, 16 Pages.
XINWEI: "Discussion on Indoor Positioning Enhancement Aided by EB/FD-MIMO", R1-154700, 3rd Generation Partnership Project (3GPP), Mobile Competence Centre, 650, Route Des Lucioles, F-06921 Sophia-Antipolis Cedex, France, vol. RAN WG1, No. Beijing, China, Aug. 24, 2015-Aug. 28, 2015, Aug. 14, 2015, XP050993741, 3 Pages.
VIVO: "Views on NR Downlink Positioning Techniques", 3GPP TSG RAN WG1 Ad-Hoc Meeting 1901, R1-1900149, Taipei, Jan. 21-25, 2019, 6 Pages.

* cited by examiner

BANDWIDTH PART OPERATION AND DOWNLINK OR UPLINK POSITIONING REFERENCE SIGNAL SCHEME

CROSS REFERENCE

The present Application for Patent is a Continuation of U.S. patent application Ser. No. 16/746,594 by MANOLAKOS et al., entitled "BANDWIDTH PART OPERATION AND DOWNLINK OR UPLINK POSITIONING REFERENCE SIGNAL SCHEME" filed Jan. 17, 2020, which claims the benefit of U.S. Provisional Patent Application No. 62/795,514 by MANOLAKOS et al., entitled "BANDWIDTH PART CONSIDERATIONS FOR UPLINK AND DOWNLINK POSITIONING REFERENCE SIGNALS," filed Jan. 22, 2019 and U.S. Provisional Patent Application 62/794,958 by MANOLAKOS et al., entitled "BANDWIDTH PART CONSIDERATIONS FOR UPLINK AND DOWNLINK POSITIONING REFERENCE SIGNALS," filed Jan. 21, 2019, assigned to the assignee hereof, and expressly incorporated herein.

BACKGROUND

The following relates generally to wireless communications, and more specifically to bandwidth part considerations for uplink and downlink positioning reference signals.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A wireless communications network may implement techniques to keep track of the positioning of a UE in the wireless communications network. In some cases, the UE may transmit or receive positioning reference signals to or from base stations, which the network may use to determine the positioning of the UE. In some cases, the wireless communications network may support UEs with different bandwidth capabilities. Conventional techniques to assign resources for a positioning reference signal are deficient when assigning resources to UEs with varying bandwidth capabilities.

SUMMARY

The described techniques relate to improved methods, systems, devices, and apparatuses that support bandwidth part (BWP) considerations for uplink and downlink positioning reference signals (PRS). Generally, the described techniques provide for utilizing a resource configured for PRS. A wireless communications system may support a PRS resource, which may be configured per-base station. A network controller controlling a transmission reception point, such as a base station, may configure the PRS resource for a user equipment (UE). The PRS resource may span a bandwidth or frequency domain allocation which at least partially overlaps with one or more configured active BWPs for the UE. The UE may be indicated the frequency domain allocation for the PRS resource and use the PRS resource to receive a downlink PRS or transmit an uplink PRS. In some cases, by configuring and using a PRS resource, a wireless communications system which supports UEs with varying bandwidth capabilities may have enhanced positioning techniques for tracking the UEs and configuring resources for uplink and downlink PRS transmissions.

A method of wireless communication by a UE is described. The method may include receiving an indication of a positioning reference signal configuration for a transmission reception point, determining, based on the positioning reference signal configuration, a reference point within a carrier bandwidth of a component carrier and a frequency domain allocation for a positioning reference signal relative to the reference point, and transmitting the positioning reference signal or measuring the positioning reference signal based on the frequency domain allocation.

An apparatus for wireless communication by a UE is described. The apparatus may include one or more transceivers, one or more memory, and one or more processors electronically coupled to the one or more memory and the one or more transceivers, the one or more processors configured to receive an indication of a positioning reference signal configuration for a transmission reception point, determine, based on the positioning reference signal configuration, a reference point within a carrier bandwidth of a component carrier and a frequency domain allocation for a positioning reference signal relative to the reference point, and transmit the positioning reference signal or measuring the positioning reference signal based on the frequency domain allocation.

Another apparatus for wireless communication by a UE is described. The apparatus may include means for receiving an indication of a positioning reference signal configuration for a transmission reception point, determining, based on the positioning reference signal configuration, a reference point within a carrier bandwidth of a component carrier and a frequency domain allocation for a positioning reference signal relative to the reference point, and transmitting the positioning reference signal or measuring the positioning reference signal based on the frequency domain allocation.

A non-transitory computer-readable medium storing code for wireless communication by a UE is described. The code may include instructions executable by a processor to receive an indication of a positioning reference signal configuration for a transmission reception point, determine, based on the positioning reference signal configuration, a reference point within a carrier bandwidth of a component carrier and a frequency domain allocation for a positioning reference signal relative to the reference point, and transmit the positioning reference signal or measuring the positioning reference signal based on the frequency domain allocation.

Some examples of the method, apparatuses, and non-transitory computer-readable medium described herein may further include operations, features, means, or instructions for determining, based on the positioning reference signal configuration, a start of the frequency domain allocation relative to the reference point and a bandwidth or a number of resource blocks of the frequency domain allocation.

Some examples of the method, apparatuses, and non-transitory computer-readable medium described herein may further include operations, features, means, or instructions for generating a measurement of the positioning reference signal based on the frequency domain allocation, and transmitting the measurement to a network entity.

Some examples of the method, apparatuses, and non-transitory computer-readable medium described herein may further include operations, features, means, or instructions for determining a positioning estimate of the UE based on measuring the positioning reference signal within the frequency domain allocation.

Some examples of the method, apparatuses, and non-transitory computer-readable medium described herein may further include operations, features, means, or instructions for receiving positioning information that indicates a first location of the transmission reception point and at least a second location of at least a second transmission reception point based on transmitting the positioning reference signal and determining a positioning estimate of the UE based on the positioning information.

Some examples of the method, apparatuses, and non-transitory computer-readable medium described herein may further include operations, features, means, or instructions for receiving a positioning reference signal measurement report that indicates a first measurement and a first location of the transmission reception point and at least a second measurement and at least a second location of at least a second transmission reception point based on transmitting the positioning reference signal, and determining a positioning estimate of the UE based on the positioning reference signal measurement report.

In some examples of the method, apparatuses, and non-transitory computer-readable medium described herein, the reference point differs from a starting resource block of the carrier bandwidth.

Some examples of the method, apparatuses, and non-transitory computer-readable medium described herein may further include operations, features, means, or instructions for determining a scrambling sequence for the positioning reference signal based on the reference point, scrambling a first sequence with the scrambling sequence to generate a positioning reference sequence, and generating the positioning reference signal based on the positioning reference sequence.

Some examples of the method, apparatuses, and non-transitory computer-readable medium described herein may further include operations, features, means, or instructions for measuring the positioning reference signal within the frequency domain allocation using a subcarrier spacing of the carrier bandwidth that differs from a subcarrier spacing of an active bandwidth part within the carrier bandwidth configured for the UE.

In some examples of the method, apparatuses, and non-transitory computer-readable medium described herein, the reference point may be a starting resource block of the carrier bandwidth.

Some examples of the method, apparatuses, and non-transitory computer-readable medium described herein may further include operations, features, means, or instructions for measuring the positioning reference signal within the frequency domain allocation using a subcarrier spacing of the carrier bandwidth that may be the same as a subcarrier spacing of an active bandwidth part within the carrier bandwidth configured for the UE.

Some examples of the method, apparatuses, and non-transitory computer-readable medium described herein may further include operations, features, means, or instructions for determining a scrambling sequence for the positioning reference signal based on a second reference point that differs from the reference point, scrambling a first sequence with the scrambling sequence to generate a positioning reference sequence, and generating the positioning reference signal based on the positioning reference sequence.

Some examples of the method, apparatuses, and non-transitory computer-readable medium described herein may further include operations, features, means, or instructions for receiving a second indication of a second positioning reference signal configuration of a second transmission reception point, determining, based on the second positioning reference signal configuration, a second reference point within the carrier bandwidth of the component carrier and a second frequency domain allocation for a second positioning reference signal relative to the second reference point, and transmitting a second positioning reference signal or measuring the second positioning reference signal within the second frequency domain allocation.

Some examples of the method, apparatuses, and non-transitory computer-readable medium described herein may further include operations, features, means, or instructions for receiving a message instructing the UE to transmit the positioning reference signal.

In some examples of the method, apparatuses, and non-transitory computer-readable medium described herein, the message may be a RRC message, a higher layer protocol message, a positioning message, a LTE positioning protocol message, a New Radio (NR) positioning message, DCI, or a medium access control (MAC) control element (CE).

In some examples of the method, apparatuses, and non-transitory computer-readable medium described herein, the UE maintains transmission of the positioning reference signal throughout a duration of a connection with the transmission reception point based on received RRC signaling or a received configuration.

Some examples of the method, apparatuses, and non-transitory computer-readable medium described herein may further include operations, features, means, or instructions for transmission of the positioning reference signal occurs periodically throughout the duration of the connection.

In some examples of the method, apparatuses, and non-transitory computer-readable medium described herein, the UE maintains transmission of the positioning reference signal beginning after receiving a first MAC CE and until receiving a second MAC CE that de-activates the transmission of the positioning reference signal.

Some examples of the method, apparatuses, and non-transitory computer-readable medium described herein may further include operations, features, means, or instructions for transmitting the positioning reference signal one per DCI trigger.

In some examples of the method, apparatuses, and non-transitory computer-readable medium described herein, the DCI trigger indicates to transmit the positioning reference signal in a positioning reference signal occasion or in a defined number of positioning reference signal occasions with a defined periodicity.

Some examples of the method, apparatuses, and non-transitory computer-readable medium described herein may further include operations, features, means, or instructions for receiving a gap indicator that indicates one or more symbols before or after a positioning reference signal occasion.

Some examples of the method, apparatuses, and non-transitory computer-readable medium described herein may further include operations, features, means, or instructions for receiving signaling that configures the UE with at least one bandwidth part and an active bandwidth part from the at least one bandwidth part, where the frequency domain allocation intersects with a bandwidth of the active bandwidth part.

Some examples of the method, apparatuses, and non-transitory computer-readable medium described herein may further include operations, features, means, or instructions for determining that an intersection of the frequency domain allocation and the bandwidth of the active bandwidth part satisfies a threshold.

Some examples of the method, apparatuses, and non-transitory computer-readable medium described herein may further include operations, features, means, or instructions for configuring the UE with the threshold.

In some examples of the method, apparatuses, and non-transitory computer-readable medium described herein, the threshold may be based on a capability of the UE, or a type of positioning method, or a configured positioning reference signal pattern, or frequency hopping pattern, or any combination thereof.

In some examples of the method, apparatuses, and non-transitory computer-readable medium described herein, a bandwidth of the frequency domain allocation exceeds the bandwidth of the active bandwidth part.

Some examples of the method, apparatuses, and non-transitory computer-readable medium described herein may further include operations, features, means, or instructions for receiving a measurement indicator that configures the UE to measure the positioning reference signal over the bandwidth of the frequency domain allocation that exceeds the bandwidth of the active bandwidth part.

In some examples of the method, apparatuses, and non-transitory computer-readable medium described herein, the measurement indicator may be based on a type of positioning method.

Some examples of the method, apparatuses, and non-transitory computer-readable medium described herein may further include operations, features, means, or instructions for transmitting a capability indicator that indicates whether the UE may be capable of measuring the positioning reference signal over the bandwidth of the frequency domain allocation that exceeds the bandwidth of the active bandwidth part, where the measurement indicator may be based on the capability indicator.

In some examples of the method, apparatuses, and non-transitory computer-readable medium described herein, the capability indicator indicates a gap before or after a positioning reference signal occasion.

In some examples of the method, apparatuses, and non-transitory computer-readable medium described herein, the active bandwidth part does not change during at least one positioning reference signal occasion or at least one positioning reference signal occasion group.

In some examples of the method, apparatuses, and non-transitory computer-readable medium described herein, the active bandwidth part does not change during a set of positioning reference signal occasions or a set of positioning reference signal occasion groups within a defined time window.

In some examples of the method, apparatuses, and non-transitory computer-readable medium described herein, the active bandwidth part does not change during a set of positioning reference signal occasions or a set of positioning reference signal occasion groups for measuring a set of positioning reference signals of a set of transmission reception points.

In some examples of the method, apparatuses, and non-transitory computer-readable medium described herein, the frequency domain allocation of the positioning reference signal does not change when the active bandwidth part changes to a second active bandwidth part during at least one positioning reference signal occasion or at least one positioning reference signal occasion group.

Some examples of the method, apparatuses, and non-transitory computer-readable medium described herein may further include operations, features, means, or instructions for receiving a port indication that indicates a same port has been applied across the frequency domain allocation or a different port has been applied for each component carrier of a set of component carriers, where the frequency domain allocation of the positioning reference signal spans the set of component carriers.

Some examples of the method, apparatuses, and non-transitory computer-readable medium described herein may further include operations, features, means, or instructions for determining a same port has been applied across the frequency domain allocation based on the frequency domain allocation of the positioning reference signal spanning a set of component carriers.

Some examples of the method, apparatuses, and non-transitory computer-readable medium described herein may further include operations, features, means, or instructions for determining a same port has been applied across the frequency domain allocation based on the frequency domain allocation of the positioning reference signal spanning a set of contiguous component carriers.

Some examples of the method, apparatuses, and non-transitory computer-readable medium described herein may further include operations, features, means, or instructions for determining a same port has been applied across the frequency domain allocation based on the frequency domain allocation of the positioning reference signal spanning a set of component carriers within a same frequency band.

Some examples of the method, apparatuses, and non-transitory computer-readable medium described herein may further include operations, features, means, or instructions for determining a same port has been applied across the frequency domain allocation based on the frequency domain allocation of the positioning reference signal spanning a set of component carriers and a frequency domain separation of each pair of the set of component carriers satisfying a threshold.

Some examples of the method, apparatuses, and non-transitory computer-readable medium described herein may further include operations, features, means, or instructions for transmitting a capability indicator that indicates a defined bandwidth support for the positioning reference signal that spans a set of component carriers, and receiving a gap indicator that configures a time domain gap before or after a positioning reference signal occasion.

Some examples of the method, apparatuses, and non-transitory computer-readable medium described herein may further include operations, features, means, or instructions for receiving a port indication that indicates a same port has been applied for each active bandwidth part of a set of active bandwidth parts of the component carrier, where the frequency domain allocation spans the set of active bandwidth parts.

Some examples of the method, apparatuses, and non-transitory computer-readable medium described herein may further include operations, features, means, or instructions for receiving a port indication that indicates a different port has been applied each active bandwidth part of a set of active bandwidth parts of the component carrier, where the frequency domain allocation spans the set of active bandwidth parts.

Some examples of the method, apparatuses, and non-transitory computer-readable medium described herein may further include operations, features, means, or instructions for determining a same port has been applied for each active bandwidth part of a set of active bandwidth parts of the component carrier, where the frequency domain allocation spans the set of active bandwidth parts.

Some examples of the method, apparatuses, and non-transitory computer-readable medium described herein may further include operations, features, means, or instructions for determining a same port has been applied for each active bandwidth part of a set of contiguous active bandwidth parts of the component carrier, where the frequency domain allocation spans the set of active bandwidth parts.

Some examples of the method, apparatuses, and non-transitory computer-readable medium described herein may further include operations, features, means, or instructions for transmitting a capability indicator that indicates whether the UE supports measuring the positioning reference signal on a set of active bandwidth parts, and receiving a measurement indicator that configures the UE to measure the positioning reference signal over at least one of the set of active bandwidth parts based on the capability indicator.

Some examples of the method, apparatuses, and non-transitory computer-readable medium described herein may further include operations, features, means, or instructions for transmitting a capability indicator that indicates a measurement bandwidth that the UE supports for measuring the positioning reference signal on a set of active bandwidth parts, and receiving a measurement indicator that configures the UE to measure the positioning reference signal over at least one of the set of active bandwidth parts based on the capability indicator.

A method of wireless communication by a network entity is described. The method may include transmitting an indication of a positioning reference signal configuration for a transmission reception point, determining, based on the positioning reference signal configuration, a reference point within a carrier bandwidth of a component carrier and a frequency domain allocation for a positioning reference signal relative to the reference point, and monitoring for a transmission of the positioning reference signal from a UE within the frequency domain allocation.

An apparatus for wireless communication by a network entity is described. The apparatus may include one or more transceivers, one or more memory, and one or more processors electronically coupled to the one or more memory and the one or more transceivers, the one or more processors configured to transmit an indication of a positioning reference signal configuration for a transmission reception point, determine, based on the positioning reference signal configuration, a reference point within a carrier bandwidth of a component carrier and a frequency domain allocation for a positioning reference signal relative to the reference point, and monitor for a transmission of the positioning reference signal from a UE within the frequency domain allocation.

Another apparatus for wireless communication by a network entity is described. The apparatus may include means for transmitting an indication of a positioning reference signal configuration for a transmission reception point, determining, based on the positioning reference signal configuration, a reference point within a carrier bandwidth of a component carrier and a frequency domain allocation for a positioning reference signal relative to the reference point, and monitoring for a transmission of the positioning reference signal from a UE within the frequency domain allocation.

A non-transitory computer-readable medium storing code for wireless communication by a network entity is described. The code may include instructions executable by a processor to transmit an indication of a positioning reference signal configuration for a transmission reception point, determine, based on the positioning reference signal configuration, a reference point within a carrier bandwidth of a component carrier and a frequency domain allocation for a positioning reference signal relative to the reference point, and monitor for a transmission of the positioning reference signal from a UE within the frequency domain allocation.

Some examples of the method, apparatuses, and non-transitory computer-readable medium described herein may further include operations, features, means, or instructions for determining, based on the positioning reference signal configuration, a start of the frequency domain allocation relative to the reference point and a bandwidth or a number of resource blocks of the frequency domain allocation.

Some examples of the method, apparatuses, and non-transitory computer-readable medium described herein may further include operations, features, means, or instructions for determining a positioning estimate of the UE based on receiving the positioning reference signal from the UE within the frequency domain allocation.

Some examples of the method, apparatuses, and non-transitory computer-readable medium described herein may further include operations, features, means, or instructions for transmitting positioning information that indicates a first location of the transmission reception point and at least a second location of at least a second transmission reception point.

Some examples of the method, apparatuses, and non-transitory computer-readable medium described herein may further include operations, features, means, or instructions for transmitting a positioning reference signal measurement report that indicates a first measurement and a first location of the transmission reception point and at least a second measurement and at least a second location of at least a second transmission reception point.

In some examples of the method, apparatuses, and non-transitory computer-readable medium described herein, the reference point differs from a starting resource block of the carrier bandwidth.

Some examples of the method, apparatuses, and non-transitory computer-readable medium described herein may further include operations, features, means, or instructions for determining a scrambling sequence for the positioning reference signal based on the reference point, decoding a first sequence from the frequency domain allocation, descrambling the first sequence with the scrambling sequence to generate a candidate positioning reference sequence, and determining that the candidate positioning reference sequence corresponds to a positioning reference sequence assigned to the UE.

Some examples of the method, apparatuses, and non-transitory computer-readable medium described herein may further include operations, features, means, or instructions for measuring the positioning reference signal within the frequency domain allocation using a subcarrier spacing of the carrier bandwidth that differs from a subcarrier spacing of an active bandwidth part within the carrier bandwidth configured for the UE.

In some examples of the method, apparatuses, and non-transitory computer-readable medium described herein, the reference point may be a starting resource block of the carrier bandwidth.

Some examples of the method, apparatuses, and non-transitory computer-readable medium described herein may further include operations, features, means, or instructions for measuring the positioning reference signal within the frequency domain allocation using a subcarrier spacing of the carrier bandwidth that may be the same as a subcarrier spacing of an active bandwidth part within the carrier bandwidth configured for the UE.

Some examples of the method, apparatuses, and non-transitory computer-readable medium described herein may further include operations, features, means, or instructions for transmitting a message instructing the UE to transmit the positioning reference signal.

In some examples of the method, apparatuses, and non-transitory computer-readable medium described herein, the message may be a RRC message, a higher layer protocol message, a positioning message, a LTE positioning protocol message, a New Radio (NR) positioning message, DCI, or a MAC CE.

Some examples of the method, apparatuses, and non-transitory computer-readable medium described herein may further include operations, features, means, or instructions for transmitting a gap indicator that indicates one or more symbols before or after a positioning reference signal occasion.

Some examples of the method, apparatuses, and non-transitory computer-readable medium described herein may further include operations, features, means, or instructions for transmitting signaling that configures the UE with at least one bandwidth part and an active bandwidth part within the at least one bandwidth part, where the frequency domain allocation intersects with a bandwidth of the active bandwidth part.

Some examples of the method, apparatuses, and non-transitory computer-readable medium described herein may further include operations, features, means, or instructions for determining that an intersection of the frequency domain allocation and the bandwidth of the active bandwidth part satisfies a threshold.

Some examples of the method, apparatuses, and non-transitory computer-readable medium described herein may further include operations, features, means, or instructions for configuring the UE with the threshold.

In some examples of the method, apparatuses, and non-transitory computer-readable medium described herein, the threshold may be based on a capability of the UE, or a type of positioning method, or a configured positioning reference signal pattern, or frequency hopping pattern, or any combination thereof.

In some examples of the method, apparatuses, and non-transitory computer-readable medium described herein, a bandwidth of the frequency domain allocation exceeds the bandwidth of the active bandwidth part.

Some examples of the method, apparatuses, and non-transitory computer-readable medium described herein may further include operations, features, means, or instructions for transmitting a measurement indicator to configure the UE to measure the positioning reference signal over the bandwidth of the frequency domain allocation that exceeds the bandwidth of the active bandwidth part.

In some examples of the method, apparatuses, and non-transitory computer-readable medium described herein, the measurement indicator may be based on a type of positioning method.

Some examples of the method, apparatuses, and non-transitory computer-readable medium described herein may further include operations, features, means, or instructions for receiving a capability indicator that indicates whether the UE may be capable of measuring the positioning reference signal over the bandwidth of the frequency domain allocation that exceeds the bandwidth of the active bandwidth part, where the measurement indicator may be based on the capability indicator.

In some examples of the method, apparatuses, and non-transitory computer-readable medium described herein, the capability indicator indicates a gap before or after a positioning reference signal occasion.

In some examples of the method, apparatuses, and non-transitory computer-readable medium described herein, the active bandwidth part does not change during at least one positioning reference signal occasion or at least one positioning reference signal occasion group.

In some examples of the method, apparatuses, and non-transitory computer-readable medium described herein, the active bandwidth part does not change during a set of positioning reference signal occasions or a set of positioning reference signal occasion groups within a defined time window.

In some examples of the method, apparatuses, and non-transitory computer-readable medium described herein, the active bandwidth part does not change during a set of positioning reference signal occasions or a set of positioning reference signal occasion groups for measuring a set of positioning reference signals of a set of transmission reception points.

In some examples of the method, apparatuses, and non-transitory computer-readable medium described herein, the frequency domain allocation of the positioning reference signal does not change when the active bandwidth part changes to a second active bandwidth part during at least one positioning reference signal occasion or at least one positioning reference signal occasion group.

Some examples of the method, apparatuses, and non-transitory computer-readable medium described herein may further include operations, features, means, or instructions for transmitting a port indication that indicates a same port has been applied across the frequency domain allocation or a different port has been applied for each component carrier of a set of component carriers, where the frequency domain allocation of the positioning reference signal spans the set of component carriers.

Some examples of the method, apparatuses, and non-transitory computer-readable medium described herein may further include operations, features, means, or instructions for applying a same port across the frequency domain allocation to transmit the positioning reference signal based on the frequency domain allocation of the positioning reference signal spanning a set of component carriers.

Some examples of the method, apparatuses, and non-transitory computer-readable medium described herein may further include operations, features, means, or instructions for applying a same port across the frequency domain allocation to transmit the positioning reference signal based on the frequency domain allocation of the positioning reference signal spanning a set of contiguous component carriers.

Some examples of the method, apparatuses, and non-transitory computer-readable medium described herein may further include operations, features, means, or instructions for applying a same port across the frequency domain allocation to transmit the positioning reference signal based on the frequency domain allocation of the positioning reference signal spanning a set of component carriers within a same frequency band.

Some examples of the method, apparatuses, and non-transitory computer-readable medium described herein may further include operations, features, means, or instructions for applying a same port across the frequency domain allocation to transmit the positioning reference signal based on the frequency domain allocation of the positioning reference signal spanning a set of component carriers and a frequency domain separation of each pair of the set of component carriers satisfying a threshold.

Some examples of the method, apparatuses, and non-transitory computer-readable medium described herein may further include operations, features, means, or instructions for receiving a capability indicator that indicates a defined bandwidth support for the positioning reference signal that spans a set of component carriers, and transmitting a gap indicator that configures a time domain gap before or after a positioning reference signal occasion.

Some examples of the method, apparatuses, and non-transitory computer-readable medium described herein may further include operations, features, means, or instructions for transmitting a port indication that indicates a same port has been applied for each active bandwidth part of a set of active bandwidth parts of the component carrier, where the frequency domain allocation spans the set of active bandwidth parts.

Some examples of the method, apparatuses, and non-transitory computer-readable medium described herein may further include operations, features, means, or instructions for transmitting a port indication that indicates a different port has been applied for each active bandwidth part of a set of active bandwidth parts of the component carrier, where the frequency domain allocation spans the set of active bandwidth parts.

Some examples of the method, apparatuses, and non-transitory computer-readable medium described herein may further include operations, features, means, or instructions for applying a same port for each active bandwidth part of a set of active bandwidth parts of the component carrier to transmit the positioning reference signal, where the frequency domain allocation spans the set of active bandwidth parts.

Some examples of the method, apparatuses, and non-transitory computer-readable medium described herein may further include operations, features, means, or instructions for applying a same port for each active bandwidth part of a set of contiguous active bandwidth parts of the component carrier to transmit the positioning reference signal, where the frequency domain allocation spans the set of active bandwidth parts.

Some examples of the method, apparatuses, and non-transitory computer-readable medium described herein may further include operations, features, means, or instructions for receiving a capability indicator that indicates whether the UE supports measuring the positioning reference signal on a set of active bandwidth parts, and transmitting a measurement indicator that configures the UE to measure the positioning reference signal over at least one of the set of active bandwidth parts based on the capability indicator.

Some examples of the method, apparatuses, and non-transitory computer-readable medium described herein may further include operations, features, means, or instructions for receiving a capability indicator that indicates a measurement bandwidth that the UE supports for measuring the positioning reference signal on a set of active bandwidth parts, and transmitting a measurement indicator that configures the UE to measure the positioning reference signal over at least one of the set of active bandwidth parts based on the capability indicator.

DETAILED DESCRIPTION

Figure 1:
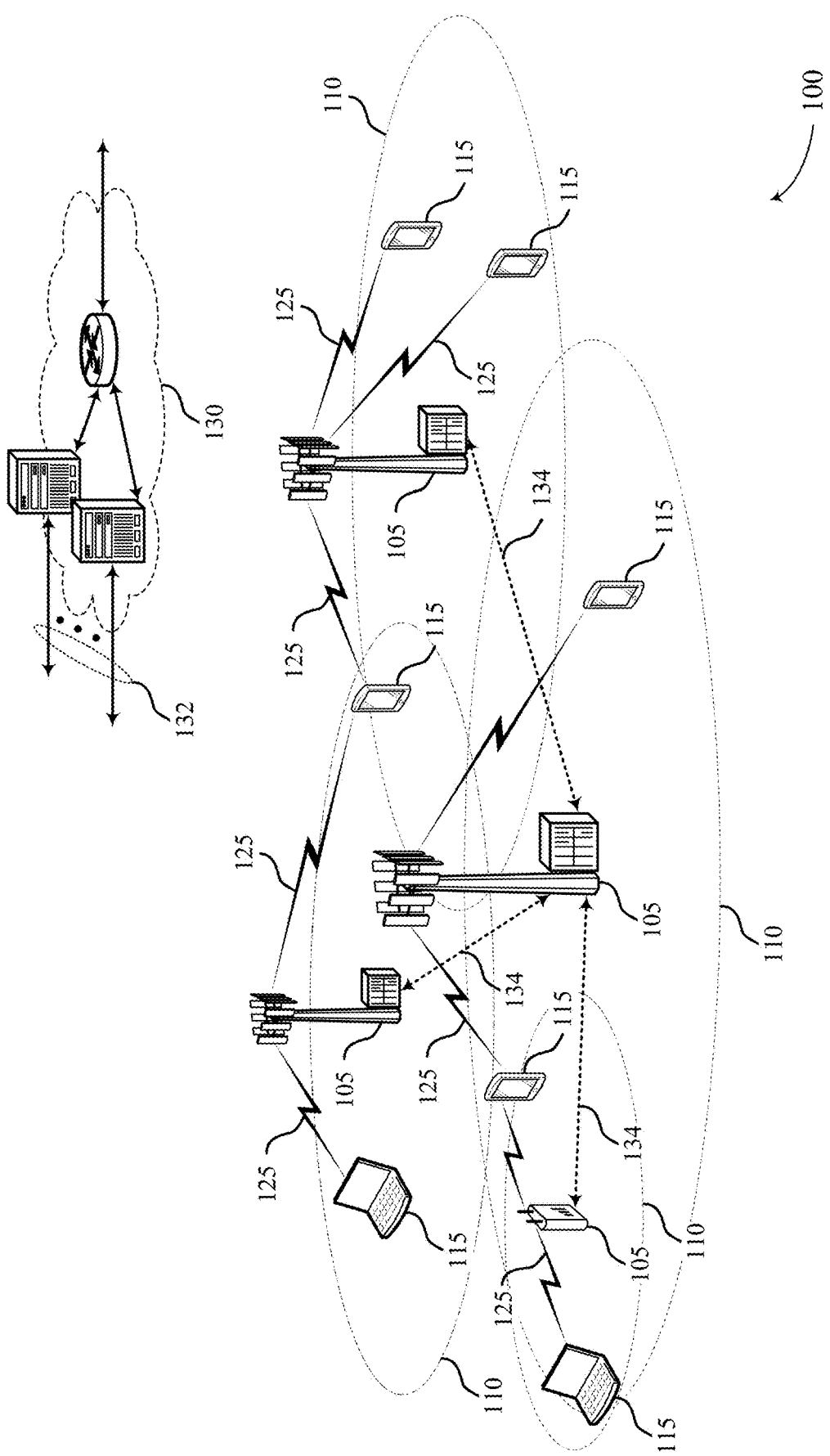
FIG. 1 illustrates an example of a system for wireless communications that supports bandwidth part considerations for uplink and downlink positioning reference signals in accordance with aspects of the present disclosure.

A user equipment (UE) in a wireless communications system may communicate with one or more transmission reception points, such as base stations. Each transmission reception point may provide a cell which extends within a coverage area of the transmission reception point. The UE may move within the coverage area, and the cell may provide wireless communications (e.g., New Radio (NR) communications, or others) to the UE. In some cases, the UE may be allocated a bandwidth part (BWP) to communicate with a serving base station. The BWP may be a contiguous set of physical resource blocks (PRBs) on a given wireless communications carrier. Each BWP may be associated with a numerology, where a subcarrier spacing (SCS), symbol duration, and cyclic prefix length used for the BWP is based on the numerology. The PRBs may be selected from a contiguous subset of common resource blocks, which are allocated or assigned by a base station to served UEs. The UE may have one active BWP for uplink transmissions and one active BWP for downlink communications. Generally, the UE may transmit and receive within the frequency ranges of the active BWPs, and the UE may not be configured to transmit or expected to receive outside of the active BWPs for uplink and downlink respectively. In some cases, a base station configuring a BWP for the UE may indicate the start of the BWP (e.g., in frequency) based on an offset from a common reference point in the carrier. In some cases, the common reference point may correspond to a reference resource block, a start, end, or center point of the carrier, etc.

A serving base station of a UE may keep track of the location or positioning of the UE. Various positioning techniques may be used to track the UE. In some cases, the UE may be configured to transmit to an uplink positioning reference signal (PRS) to the serving base station and one or more neighboring base stations, or the UE may be configured to receive a downlink PRS from the serving base station and one or more neighboring base stations. For an uplink PRS, the base station and the neighboring base stations may exchange, for example via backhaul links, information associated with the receipt of the uplink PRS, such as reference signal time difference (RSTD) measurements made by the UE. The network (e.g., including the base stations) may then determine the location of the UE based on the one or more uplink PRS transmissions. For downlink PRS transmissions, the UE may receive a PRS from each of one or more base stations.

In some cases, UE may estimate its positioning based on the measurements, for example based on reference signal time difference (RSTD) measurements. Additionally, or alternatively, the UE may transmit measurement reports for the one or more PRSs to a serving base station. Generally, a positioning technique may be UE-based or UE-assisted. In UE-based positioning, the UE may perform the positioning estimation without feeding back RSTD measurements to the network (e.g., via a base station). In UE-assisted positioning, the UE may provide the RSTD measurements, and the network may perform the positioning estimation using the RSTD measurements. A UE may be configured for a UE-based mode, a UE-assisted mode, or a mode which incorporates aspects of both. The used positioning mode may be based on a connection initialization configuration, downlink control information, a Medium Access Control (MAC) control element (CE), etc.

In some conventional systems, UEs in a carrier may be assigned resources uniformly. For example, UEs in the carrier may have similar bandwidth capabilities, such that the base station may uniformly assign resources for an uplink PRS or a downlink PRS. In wireless communications systems described herein, some wireless devices such as UEs, machine-type-communications (MTC) devices, and others, may have different capabilities for the amount of bandwidth the wireless devices are able to use. Further, the BWP resource assignment schemes described above may provide flexibility in bandwidth assignment such that two UEs may not use the same BWP or even overlap in assigned frequency resources, even if the two UEs are in the same carrier. Therefore, a UE and a base station as described herein, as well as other wireless devices, may implement techniques which consider BWP implementations for uplink and downlink PRS transmissions.

For example, the UE may be indicated a PRS bandwidth for receiving a downlink PRS or transmitting an uplink PRS. The PRS bandwidth may at least partially overlap with one or more configured active BWPs for the UE. For example, a downlink PRS transmitted by a serving or neighboring cell can be configured to be transmitted in the PRS bandwidth. In some cases, the PRS bandwidth may be configured based on a common reference point in the carrier. In a first example, a start and an end resource block of the frequency domain allocation for the PRS bandwidth may be defined with respect to the common reference point (e.g., a reference resource block). In this example, the subcarrier spacing for the PRS bandwidth may be different than the subcarrier spacing for the active BWP. In a second example, the start and end resource block of the frequency domain allocation for the PRS bandwidth may be defined with respect to the start of the component carrier. In this example, the subcarrier spacing for the PRS bandwidth may be the same as the subcarrier spacing of the active BWP. For either example, the scrambling sequence may be based on the reference point. In some cases, two base stations may have PRS bandwidths configured based on the two different examples. For example, a first base station may have a first PRS bandwidth for downlink PRS based on the first example (e.g., with respect to the reference point), and the second base station may have a second PRS bandwidth for downlink PRS based on the second example (e.g., with respect to the start of the component carrier). In other cases, the two base stations may each configure a PRS bandwidth with reference to the reference point or with reference to the start of the component carrier.

An uplink PRS transmitted by a UE toward a serving or neighboring cell may similarly be transmitted in a PRS bandwidth for uplink PRS. The PRS bandwidth for uplink PRS may be based on a reference similar to the PRS bandwidth for downlink PRS. In a first example, a beginning and end for the frequency domain of the uplink PRS bandwidth may be configured with respect to a common reference point (e.g., a reference resource block). In a second example, the beginning and end for the frequency domain of the uplink PRS bandwidth may be configured with respect to the bandwidth part start. The UE may implement any number of the first or second example to transmit an uplink PRS to one or more serving or neighboring base stations. For example, a first and second PRS transmission to a respective first and second base station may either both be based on a common reference point, or both may be based on the BWP start. Or, in some cases, one uplink PRS transmission may be based on the common reference point while the other is based on the BWP start.

In some cases, the UE may have a measurement gap before or after a downlink PRS or an uplink PRS. The measurement gap may span a number of symbols during which the UE is not expected to transmit or receive any other signal. In some cases, a base station may signal the measurement gap to the UE. In some cases, the measurement gap may be indicated to be 0 symbols long, or the measurement gap may not be indicated at all. In some cases, if the UE is expected to measure, transmit, or both, in the intersection of an active BWP and the PRS bandwidth, the intersection may be larger than a minimum threshold. The threshold may be configured by higher layer signaling (e.g., Radio Resource Control (RRC) signaling), based on a UE capability, based on a positioning technique used, based on a configured PRS pattern, based on whether frequency hopping is supported, or any combination thereof.

In some examples, the UE may be configured to measure a larger bandwidth than just the intersection of the PRS bandwidth with the active BWP. For example, the PRS bandwidth may extend beyond the frequency range of the active BWP. Whether the UE is configured to make a measurement outside of the active BWP may be determined at the UE based on an indication from a base station, based on whether the positioning technique is UE-based or UE-assisted, determined at the base station based on an indication of UE capability, based on whether a sufficient gap before or after is provided to the UE (e.g., which may be based on UE capability), or any combination thereof.

In some cases, the UE may be configured to measure PRS transmitted by multiple base stations. The active BWP (e.g., corresponding to the serving base station) may change dynamically. In this example, the intersection of the active BWP with each PRS may be different. This may lead to different accuracy for each of the PRS measurements. In a first example, to increase accuracy for the PRS measurements, the active BWP may not be expected or configured to change within until certain conditions have been met. For example, the active BWP may not change during reception of a specific PRS occasion or a PRS occasion group. In some examples, the active BWP may not be configured to change during multiple consecutive PRS occasions or during an occasion group inside a configured time window. In some examples, the active BWP may not be configured to change during multiple PRS occasions or an occasion group until at least all configured base stations have been measured. In a second example, the active BWP may change, but the UE may not be expected or configured to change the PRS-measured bandwidth based on the active BWP change. For example, the UE may first receive a PRS which has an intersection of a first BWP equal to the bandwidth of the first BWP. The active BWP then changes to a second BWP which has a smaller bandwidth, and the UE receives a second PRS. The UE may still measure the larger PRS corresponding to the bandwidth of the first BWP. In some cases, the UE may have a measurement gap before or after the second PRS.

In some cases, a PRS resource may span across multiple component carriers. The PRS resource may be configured in one component carrier with enough bandwidth to span across multiple component carriers. In some cases, this may occur if the PRS bandwidth is configured with respect to a reference point (e.g., and not with respect to a start of a component carrier). In a first example, the base station may indicate to the UE whether the same antenna port is assumed across the whole PRS resource, or whether the antenna port in each CC is different. In some cases, the UE may assume that the same set of ports are transmitted. In some examples, if the two component carriers are contiguous, the UE may assume the same set of ports are transmitted. If the two component carriers are in the same band, the UE may assume that the same set of antenna ports are transmitted. In some cases, if the frequency domain separation of the two component carriers is smaller than a threshold, the UE may assume the same set of antenna ports are transmitted. In some cases, the UE may measure on the PRS bandwidth which intersects with a first active bandwidth part, with a second active bandwidth part, or with both the first and the second active bandwidth parts. In some cases, there may be a UE capability to indicate the maximum bandwidth of the PRS resource that the UE can process if the PRS resource is supported to span across multiple component carriers. In some cases, the time domain gaps (e.g., measurement gaps) for a measurement across multiple component carriers may be greater (e.g., longer) then a measurement gap for a measurement in a single component carrier.

In some examples, the PRS resource may span across multiple active BWPs. A PRS resource may be configured in one component carrier with enough bandwidth to span across multiple active BWPs. In some cases, the serving base station may indicate to the UE of which antenna ports are used for the multiple BWPs of the component carrier. For example, the serving base station may indicate that the UE the same antenna ports are assumed across BWPs of the same component carrier. In another example, the UE may always assume that the same set of ports are transmitted. In some cases, if each of the BWPs spanned by the PRS resource are contiguous, the UE may assume that the same set of ports are transmitted. If the configured PRS bandwidth spans multiple active BWPs in a component carrier, there may be a corresponding UE capability which indicates whether the UE can measure PRS on multiple active BWPs. The UE capability may indicate the maximum bandwidth of the PRS resource that the UE may process in the case that the PRS configuration is supported to span across multiple active BWPs.

Aspects of the disclosure are initially described in the context of a wireless communications system. Aspects of the disclosure are further illustrated by and described with reference to apparatus diagrams, system diagrams, and flowcharts that relate to bandwidth part considerations for uplink and downlink positioning reference signals.

FIG. 1 illustrates an example of a wireless communications system 100 that supports bandwidth part considerations for uplink and downlink positioning reference signals in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link) An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

The wireless communications system 100 may support a PRS resource, which may be configured per-base station 105. A base station 105 may configure a PRS resource for a UE 115. The PRS resource may span a bandwidth or frequency domain allocation which at least partially overlaps with one or more configured active BWPs for the UE 115. The UE 115 may be indicated the frequency domain allocation for the PRS resource and use the PRS resource to receive a downlink PRS or transmit an uplink PRS. In some cases, by configuring and using a PRS resource, a wireless communications system which supports UEs 115 with varying bandwidth capabilities may have enhanced positioning techniques for tracking the UEs 115 and configuring resources for uplink and downlink PRS transmissions.

Figure 2:
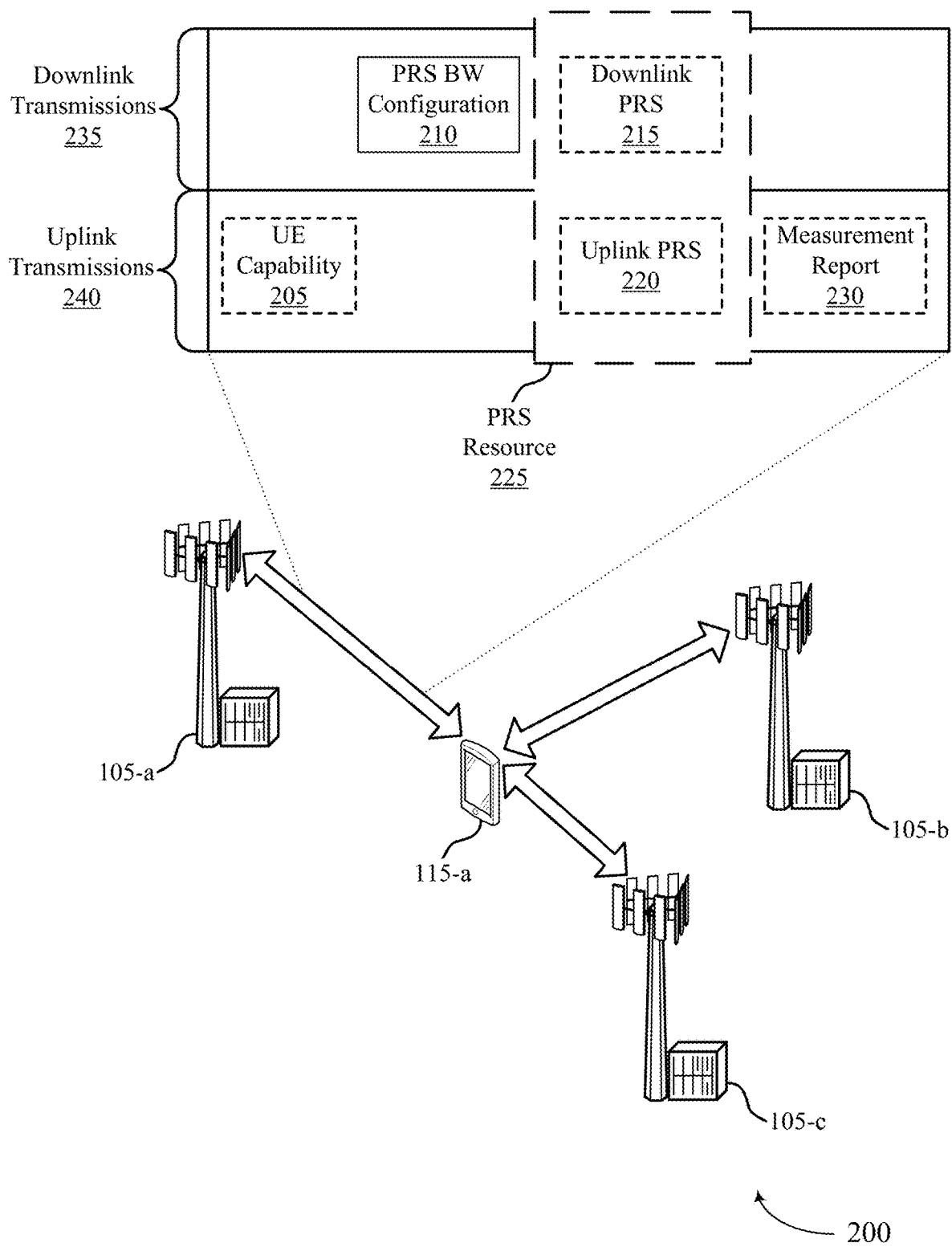
FIG. 2 illustrates an example of a wireless communications system that supports aspects of the present disclosure.

FIG. 2 illustrates an example of a wireless communications system 200 that supports bandwidth part considerations for uplink and downlink positioning reference signals in accordance with aspects of the present disclosure. In some examples, the wireless communications system 200 may implement aspects of wireless communication system 100.

The wireless communication system 200 may include one or more base stations 105 and one or more UEs 115, for example including base stations 105-a, 105-b, and 105-c, and UE 115-a. The base stations 105 described in FIG. 2 may be examples of the base stations 105 described with reference to FIG. 1. In some examples, base stations 105-*a*, 105-*b*, and 105-*c* may be referred to as a network device and/or a next generation NodeB (gNB). UE 115-*a* may be an example of a UE 115 described with reference to FIG. 1. Base station 105-*a* may be an example of a serving base station 105 for UE 115-*a*, while base stations 105-*b* and base station 105-*c* may be examples of neighboring base stations 105.

The wireless communication system 200 may illustrate operations of and communications between the base stations 105 and the UEs 115 that support configurations for a PRS resource. Each base station 105 may provide a cell, where a base station 105 can provide service for a UE 115 within the coverage area of the cell. UE 115-*a* may move within the coverage area, and the cell may provide wireless communications to UE 115-*a*. In some cases, UE 115-*a* may be allocated a BWP to communicate with a serving base station. The BWP may be a contiguous set of PRBs on a given wireless communications carrier. Each BWP may be associated with a numerology, where an SCS, symbol duration, and cyclic prefix length used for the BWP is based on the numerology. The PRBs may be selected from a contiguous subset of common resource blocks, which may be allocated or assigned by a base station 105 to served UEs 115. For example, base station 105-*a* may assign UE 115-*a* BWPs of a carrier.

In some examples, UE 115-*a* may have one active BWP for uplink transmissions and one active BWP for downlink communications. In some cases, the downlink BWP may correspond to the downlink transmissions range 235 and the uplink BWP may correspond to the uplink transmissions range 240. The uplink BWP and the downlink BWP may be contiguous or separated (e.g., with a gap between them) in the frequency domain Generally, UE 115-*a* may transmit and receive within the frequency ranges of the active BWPs, and UE 115-*a* may not be configured to transmit or expected to receive outside of the active BWPs for uplink and downlink respectively. In some cases, base station 105-*a*, as the serving base station 105 which configures a BWP for UE 115-*a*, may indicate the start of the BWP (e.g., in frequency) based on an offset from a common reference point in the carrier. In some cases, the common reference point may correspond to a reference resource block, a start, end, or center point of the carrier, etc. In some cases, the common reference block may indicate a resource block location in the common resource block. A physical resource block may indicate a resource block within a specific carrier BWP. The common reference block may be a position in an absolute (e.g., reference-based) coordinate system. A physical reference block (e.g., in a BWP) may be a position in a relative coordinate system.

The network, including base station 105-*a*, may keep track of the geographic location or positioning of UE 115-*a*. Various positioning techniques may be used to track UE 115-*a*. Some techniques for determining the positioning of UE 115-*a* may include network-assisted Global Navigation Satellite System (GNSS) techniques (e.g., Global Positioning System (GPS)), barometric pressure sensing, wireless local area network (WLAN) signaling, Bluetooth signaling, and Terrestrial Beacon System techniques, among others. The implementation of some techniques may be based on the radio access technology (RAT) used for wireless communications between UE 115-*a* and the base stations 105. For example, techniques which use downlink positioning, tracking via an enhanced cell ID, and uplink positioning may be based on the RAT.

The positioning methods in Table 1 may be UE-based, UE-assisted/evolved serving mobile location center (E-SMLC)-based, eNB-assisted, location measurement unit (LMU)-assisted/E-SMLC-based versions, and secure user plan location (SUPL)-based. The table may indicate which versions are supported for some positioning methods.

TABLE 1

| Method | UE-Based | UE-Assisted, E-SMLC-based | eNB-assisted | LMU-assisted/E-SMLC-based | SUPL |
|---|---|---|---|---|---|
| A-GNSS | Yes | Yes | No | No | Yes (UE-based and UE-assisted) |
| Downlink | No | Yes | No | No | Yes (UE-assisted) |
| E-CID | No | Yes | Yes | No | Yes (UE-assisted) |
| Uplink | No | No | No | Yes | No |
| Barometric | Yes | Yes | No | No | No |
| WLAN | Yes | Yes | No | No | Yes |
| Bluetooth | No | Yes | No | No | No |
| TBS | Yes | Yes | No | No | Yes (MIBS) |

In some cases, the downlink may include TBS positioning based on PRS signals. In some cases, TBS may be based on Metropolitan Beacon System (MBS) signals.

In some cases, UE 115-*a* may be configured to transmit to an uplink PRS 220 to the serving base station 105 and one or more neighboring base stations 105, or UE 115-*a* may be configured to receive a downlink PRS 215 from the serving base station 105 and one or more neighboring base stations 105. Upon receipt of an uplink PRS 220, base station 105-*a*, base station 105-*b*, and base station 105-*c* may exchange, for example via backhaul links, information associated with the receipt of the uplink PRS, such as reference signal time difference (RSTD) measurements made by UE 115-*a*. The network (e.g., including the base stations) may then determine the location of UE 115-*a* based on the one or more uplink PRS 220. For downlink PRS techniques, UE 115-*a* may receive a downlink PRS 215 from each of one or more base stations 105 (e.g., base station 105-*a*, 105-*b*, 105-*c*, or a combination thereof). In some cases, UE may estimate its positioning based on the measurements, for example based on reference signal time difference (RSTD) measurements. Additionally, or alternatively, the UE may transmit measurement reports for the one or more PRSs to a serving base station.

Generally, a positioning technique may be UE-based or UE-assisted. In UE-based positioning, UE 115-*a* may perform the positioning estimation without feeding back RSTD measurements to the network (e.g., via a base station 105). In some cases, UE 115-*a* may perform a UE-based positioning estimate based on received downlink PRS. In another example, UE 115-*a* may receive PRS measurement reports from multiple base stations 105 in the network corresponding to one or more transmitted uplink PRS. The UE 115 may determine a position estimate from the received PRS measurement reports. In UE-assisted positioning, UE 115-*a* may provide the RSTD measurements, and the network may perform the positioning estimation using the RSTD measurements. UE 115-*a* may be configured for a UE-based mode, a UE-assisted mode, or a mode which incorporates aspects of both. The used positioning mode may be based on a connection initialization configuration, downlink control information, a MAC CE, etc.

In some conventional systems, UEs 115 in a carrier may be assigned resources uniformly. For example, UEs 115 in the carrier may have similar bandwidth capabilities, such that a serving base station 105 can uniformly assign resources for an uplink PRS or a downlink PRS. In wireless communications systems 200 and other wireless communications systems described herein, some wireless devices such as UEs 115, base stations 105, machine-type-communications (MTC) devices, and others, may have different capabilities for the amount of bandwidth the wireless device is able to use. Further, the BWP resource assignment schemes described above may provide flexibility in bandwidth assignment such that two UEs 115 may not use the same BWP or even overlap in assigned frequency resources, even if the two UEs 115 are in the same carrier. Therefore, a UE 115 and a base station 105 as described herein, such as UE 115-a and base stations 105-a, 105-b, and 105-c, may implement techniques which consider BWP implementations for uplink and downlink PRS transmissions.

The wireless communications system 200 may support a PRS resource 225. For example, base station 105-a may configure the PRS resource 225 for UE 115-a. The PRS resource 225 may span a bandwidth or frequency domain allocation which at least partially overlaps with one or more configured active BWPs for UE 115-a. UE 115-a may be indicated the frequency domain allocation for the PRS resource 225 and use the PRS resource 225 to receive a downlink PRS 215 or transmit an uplink PRS 220.

For example, a downlink PRS 215 transmitted by a serving or neighboring cell can be configured to be transmitted in the bandwidth of the PRS resource 225. In some cases, the PRS bandwidth may be configured based on a common reference point in the carrier. In a first example, a start and an end resource block of the frequency domain allocation for the PRS resource 225 may be defined with respect to the common reference point (e.g., a reference resource block). The common reference point may be referred to as the common reference point "A" herein. The common reference point "A" may be based on a common resource block, an absolute point in the system bandwidth, a relative or absolute point in a component carrier, etc. In this example, the SCS for the PRS bandwidth may be different than the subcarrier spacing for the active BWP. Some configurations for a downlink PRS 215 may be described in more detail in FIG. 3.

In a second example for configuring a PRS bandwidth for a downlink PRS 215, the start and end resource block of the frequency domain allocation for the PRS resource 225 may be defined with respect to a reference point that is the start of a component carrier (e.g., RB of the component carrier assigned the lowest index). In this example, the SCS for the PRS bandwidth may be the same as the subcarrier spacing of the active BWP. For either example, the scrambling sequence may be based on the reference point. In some cases, two base stations 105 may have PRS bandwidths configured based on the two different examples. For example, base station 105-a may have a first PRS bandwidth for downlink PRS based on the first example (e.g., with respect to the reference point), and base station 105-b may have a second PRS bandwidth for downlink PRS based on the second example (e.g., with respect to the start of the component carrier). In other cases, the two base stations 105 may each configure a PRS bandwidth with reference to the reference point that is situated within the component carrier or with reference to a reference point that is the start of the component carrier.

An uplink PRS transmitted by UE 115-a toward a serving or neighboring cell may similarly be transmitted in a PRS bandwidth for uplink PRS. In some cases, the PRS bandwidth for uplink PRS may be based on the common reference point "A" similar to the PRS bandwidth for downlink PRS. In a first example, a beginning and end for the frequency domain of the uplink PRS bandwidth may be configured with respect to a common reference point (e.g., a reference resource block). In a second example, the beginning and end for the frequency domain of the uplink PRS bandwidth may be configured with respect to the bandwidth part start. UE 115-a may apply the first or second example, or both, to transmit an uplink PRS to one or more serving or neighboring base stations. For example, a first and second uplink PRS transmission to a respective first and second base station may either both be based on a common reference point, or both may be based on the BWP start. Or, in some cases, one uplink PRS transmission may be based on the common reference point while the second uplink PRS transmission is based on the lowest frequency of the BWP. Configurations for an uplink PRS 220 may be described in more detail in FIGS. 4 and 5.

In some cases, UE 115-a may have a measurement gap before or after a downlink PRS or an uplink PRS. The measurement gap may span a number of symbols (e.g., OFDM symbols) during which UE 115-a is not expected to transmit or receive any other signal (e.g., in up to all carriers). In some cases, UE 115-a may not be expected to transmit or receive as described in both cases of intra-band carrier aggregation and inter-band carrier aggregation. In some cases, UE 115-a may not be expected to transmit or receive only in the carriers of the same band in scenarios of inter-band carrier aggregation, or all carriers of intra-band carrier aggregation. In some cases, base station 105-a may signal the measurement gap to UE 115-a. In some cases, the measurement gap may be indicated to be 0 symbols long, or the measurement gap may not be indicated at all. In some cases, if UE 115-a is expected to measure, transmit, or both, in the intersection of an active BWP and the bandwidth of the PRS resource 225, the intersection may be larger than a minimum threshold. The threshold may be configured by higher layer signaling (e.g., Radio Resource Control (RRC) signaling), based on a UE capability, based on a positioning technique used, based on a configured PRS pattern, based on whether frequency hopping is supported, or any combination thereof.

In some cases, UE 115-a may be expected to measure or transmit only in the DL/UL PRS bandwidth which intersects with the active BWP. In some cases, performance requirements or tests may be defined based on if the gap is signaled to 0 OFDM symbols, if there is no gap is signaled at all, or if some other channel (DL/UL) is scheduled, configured, or activated to be received or transmitted on by UE 115-a.

In some examples, UE 115-a may be configured to measure a larger bandwidth than just the intersection of the PRS bandwidth with the active BWP. For, example, the PRS bandwidth may extend beyond the frequency range of the active BWP. Whether UE 115-a is configured to make a measurement outside of the active BWP may be determined at UE 115-a based on an indication from base station 105-a, based on whether the positioning technique is UE-based or UE-assisted, determined at base station 105-a based on an indication in a UE capability 205, based on whether a sufficient gap before or after is provided to UE 115-a (e.g., which may be based on an indicator in the UE capability 205), or any combination thereof.

In some cases, UE 115-a may be configured to measure a downlink PRS 215 transmitted by multiple base stations 105. The active BWP (e.g., corresponding to the serving base station 105, base station 105-a) configured for downlink communications may change dynamically. In this example, the intersection of the active BWP with each PRS from the multiple base stations 105 may be different. This may lead to different accuracy for each of the PRS measurements. In a first example, to increase accuracy for the PRS measurements, the active BWP may not be expected or configured to change within until certain conditions have been met. For example, the active BWP may not change during reception of a specific PRS occasion or a PRS occasion group. In some examples, the active BWP may not be configured to change during multiple consecutive PRS occasions or during an occasion group inside a configured time window. In some examples, the active BWP may not be configured to change during multiple PRS occasions or an occasion group until at least all configured base stations have been measured. In a second example, the active BWP may change, but UE 115-a may not be expected or configured to change the PRS-measured bandwidth based on the active BWP change. For example, UE 115-a may first receive a downlink PRS 215 which has an intersection of a first BWP equal to the bandwidth of the first BWP. The active BWP then changes to a second BWP which has a smaller bandwidth, and UE 115-a receives a second downlink PRS 215. UE 115-a may still measure the downlink PRS 215 corresponding to the larger bandwidth of the first BWP. In some cases, UE 115-a may have a measurement gap before or after the second downlink PRS 215.

In some cases, a PRS resource 225 may span across multiple component carriers. An example of this is described in more detail in FIG. 9. The PRS resource 225 may be configured in one component carrier with enough bandwidth to span across multiple component carriers. In some cases, this may occur if the PRS bandwidth is configured with respect to a reference point (e.g., the reference point "A" and not with respect to a start of a component carrier). In a first example, base station 105-a may indicate to UE 115-a whether the same antenna port is assumed across the whole PRS resource, or whether the antenna port in each component carrier is different. In some cases, UE 115-a may assume that the same set of ports are transmitted. In some examples, if the two component carriers are contiguous, UE 115-a may assume the same set of ports are transmitted. If the two component carriers are in the same band, UE 115-a may assume that the same set of antenna ports are transmitted. In some cases, if the frequency domain separation of the two component carriers is smaller than a threshold, UE 115-a may assume the same set of antenna ports are transmitted. In some cases, UE 115-a may measure on the PRS bandwidth which intersects with a first active bandwidth part, with a second active bandwidth part, or with both the first and the second active bandwidth parts. In some cases, there may be an indicator in the UE capability 205 to indicate the maximum bandwidth of the PRS resource that UE 115-a can process if the PRS resource is supported to span across multiple component carriers. In some cases, the time domain gaps (e.g., measurement gaps) for a measurement across multiple component carriers may be greater (e.g., longer) then a measurement gap for a measurement in a single component carrier.

In some examples, the PRS resource may span across multiple active BWPs. An example of this is described in more detail in FIG. 10. A PRS resource 225 may be configured in one component carrier with enough bandwidth to span across multiple active BWPs. In some cases, the serving base station 105 may indicate to UE 115-a of which antenna ports are used for the multiple BWPs of the component carrier. For example, the serving base station 105 may indicate to UE 115-a that the same antenna ports are assumed across BWPs of the same component carrier. In another example, UE 115-a may assume that the same set of ports are transmitted. In some cases, if each of the BWPs spanned by the PRS resource 225 are contiguous, UE 115-a may assume that the same set of ports are transmitted. If the configured PRS bandwidth spans multiple active BWPs in a component carrier, there may be a corresponding indicator in the UE capability 205 which indicates whether UE 115-a can measure PRS on multiple active BWPs. The UE capability may indicate the maximum bandwidth of the PRS resource that UE 115-a may process in the case that the PRS configuration is supported to span across multiple active BWPs.

In the illustrated example, base station 105-a may provide the serving cell for UE 115-a. Base stations 105-b and base station 105-c may be examples of neighboring cells. Base station 105-a may have an active uplink BWP and an active downlink BWP configured for UE 115-a. In other examples, additional active uplink or downlink BWPs may be configured. UE 115-a and base station 105-a may implement techniques described herein to support a PRS resource 225, which UE 115-a may use to receive a downlink PRS 215 or transmit an uplink PRS 220. In some cases, UE 115-a may transmit a UE capability 205, or an indicator of the UE capability, to base station 105-a.

Base station 105-a may transmit an indication of a PRS configuration of base station 105-a. UE 115-a may determine, based on the PRS configuration, a reference point within a carrier bandwidth of a component carrier and a frequency domain allocation for a PRS relative to the reference point. For example, UE 115-a may determine the frequency domain allocation for the PRS resource 225. In some cases, UE 115-a may determine the reference point and the frequency domain allocation based on identifying the reference point and the frequency domain allocation (e.g., from memory stored at UE 115-a). In some cases, UE 115-a may determine the reference point and the frequency domain allocation based on obtaining them (e.g., from base station 105-a).

If UE 115-a is performing a downlink PRS measurement, base station 105-a may transmit the downlink PRS 215 based on the frequency domain allocation of the PRS resource 225. UE 115-a may measure the reference signal based on the frequency domain allocation and, in some cases, transmit a measurement report 230 to base station 105-a. For an uplink PRS measurement, UE 115-a may transmit an uplink PRS 220 based on the frequency domain allocation of the PRS resource 225.

Figure 3:
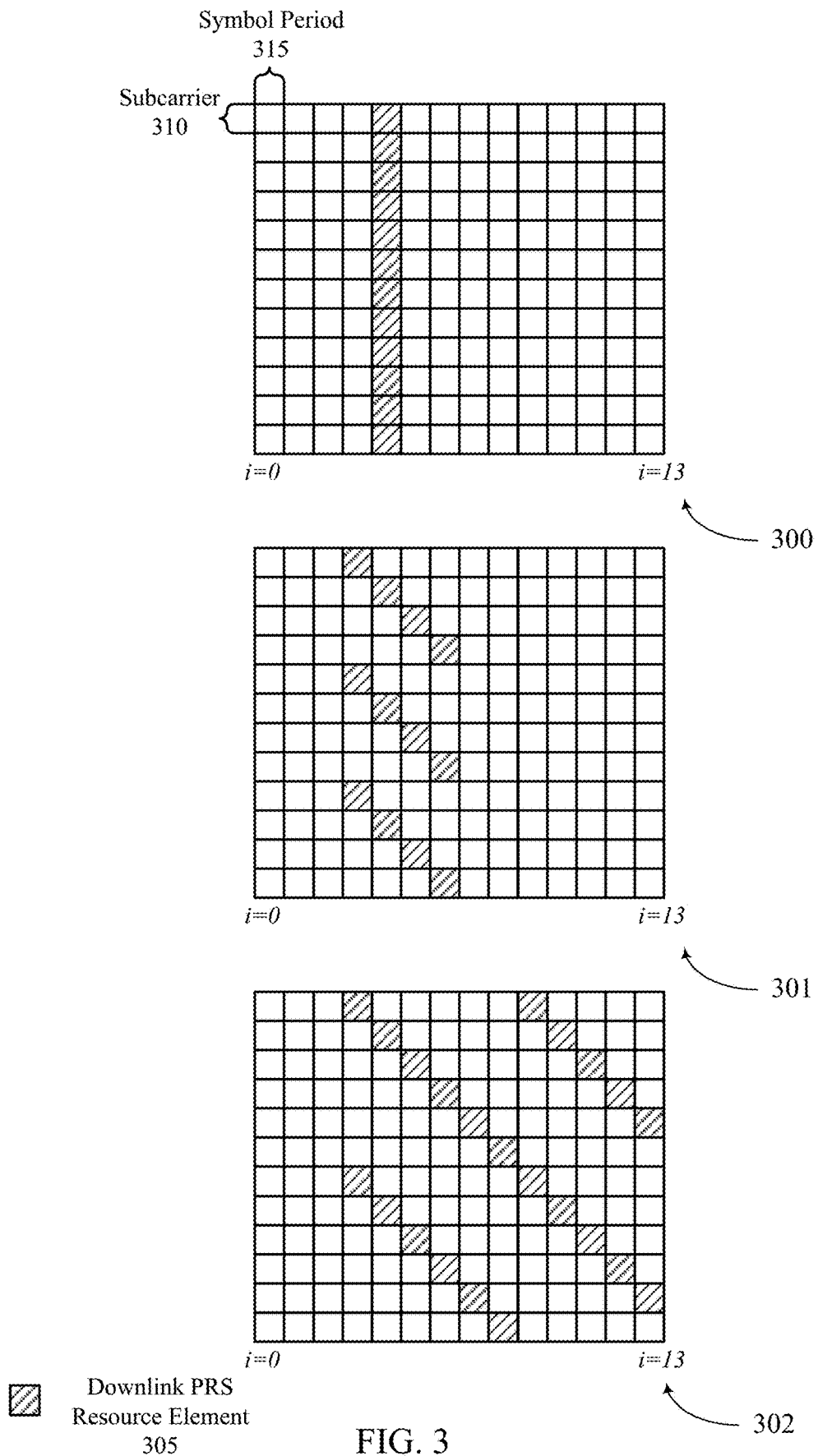
FIG. 3 illustrates examples of downlink PRS configurations that support aspects of the present disclosure.

FIG. 3 illustrates an example of downlink PRS configurations 300, 301, and 302 that support aspects of the present disclosure. In some examples, the downlink PRS configurations 300 may implement aspects of wireless communication system 100.

In some cases, a base station 105 may transmit a downlink PRS to a UE 115. The UE 115 may monitor for and measure the downlink PRS. In some cases, multiple base stations 105 may transmit a downlink PRS to the UE 115, and the UE 115 may take measurements for each of the multiple downlink PRS. An RSTD measurement may be an example of a measurement the UE 115 takes for the downlink PRS. In some cases, the UE 115 or the network, or both, may perform an RTT or a TDOA estimate based on the RSTD measurements.

In some cases, the UE 115 may perform a positioning estimate based on the measurements of the downlink PRS. For example, the UE 115 may perform positioning estimation without feedback back RSTD measurements to the network. This may be an example of a UE-based mode for positioning estimation. In some other examples, the UE 115 may provide RSTD measurements for the downlink PRS to the network, and the network may perform the positioning estimating using the RSTD measurements. This may be an example of a UE-assisted mode for positioning estimation. A downlink PRS may be, for example, a synchronization signal block (SSB), a channel state information reference signal (CSI-RS), a tracking reference signal (TRS), or another type of signal for the downlink PRS.

The downlink PRS configurations 300, 301, and 302 describe some of multiple different possible configurations for a downlink PRS. Each of the downlink PRS configurations may show, for example, a resource block which includes multiple resource elements. A resource element may span the time-frequency resources of one subcarrier 310 by one symbol period 315. The size of the subcarrier 310 and the symbol period 315 may be based on the configured subcarrier spacing. In some cases, a resource block may span one slot by a configurable number of subcarriers (e.g., 12 subcarriers). A downlink PRS may be transmitted in a downlink PRS resource element 305. The distribution of the downlink PRS resource elements 305 in the time-frequency resources may be configurable.

For example, the downlink PRS may, in some cases, have uniform density in the frequency domain. The downlink PRS configuration 300 may show a frequency comb of 1. The PRS configuration 301 may show a frequency comb of 4, and the PRS configuration 302 may show a frequency comb of 6. In some cases, frequency domain staggering may be implemented. For example, the PRS configurations 301 and 302 may implement frequency domain staggering. In some cases, for a PRS sequence, a Quadrature Phase Shift Keying (QPSK) Pseudorandom Noise (PN) sequence may be used. In some cases, multiple ports may be configured. For example, a downlink PRS configuration may use two ports for PRS transmission.

The downlink PRS bandwidth may be configurable. For example, the PRS bandwidth may be based on bandwidth or bandwidth flexibility of CSI-RS. In some cases, the downlink PRs configurations may support configurable PRS time-domain occasions (e.g., based on CSI-RS flexibility). PRS transmission may be configured to be Periodic, Semi-persistent, or aperiodic. In some cases, this scheme may be configurable. For example, the PRS transmission may be configured to be periodic. Then, a base station 105 may transmit a MAC CE to configure the UE 115 to monitor for semi-persistent downlink PRS transmissions. The base station 105 may later transmit another MAC CE to switch the PRS transmission back to periodic or to aperiodic. In some cases, the downlink PRS occasions may be configured by RRC signaling or by downlink control information.

A DL PRS transmitted by a serving or neighboring cell can be configured one of two options. For option 1, the start and end resource blocks of frequency domain allocation may be defined with respect to the common reference point A. The scrambling sequence for option 1 may be with respect to reference point A. Subcarrier spacing for option 1 may be different than that the active BWP. For option 2, the start and end resource blocks of frequency domain allocation may be defined with respect to the start of the component carrier (CC). For option 2, the scrambling sequence may still be with respect to reference point A. For option 2, the subcarrier spacing cannot be different than that of an active BWP. A UE may perform positioning measurements from the same gNBs or different gNBs using DL PRS where at least one is configured according to Option 1 and at least one according to Option 2.

Figure 4:
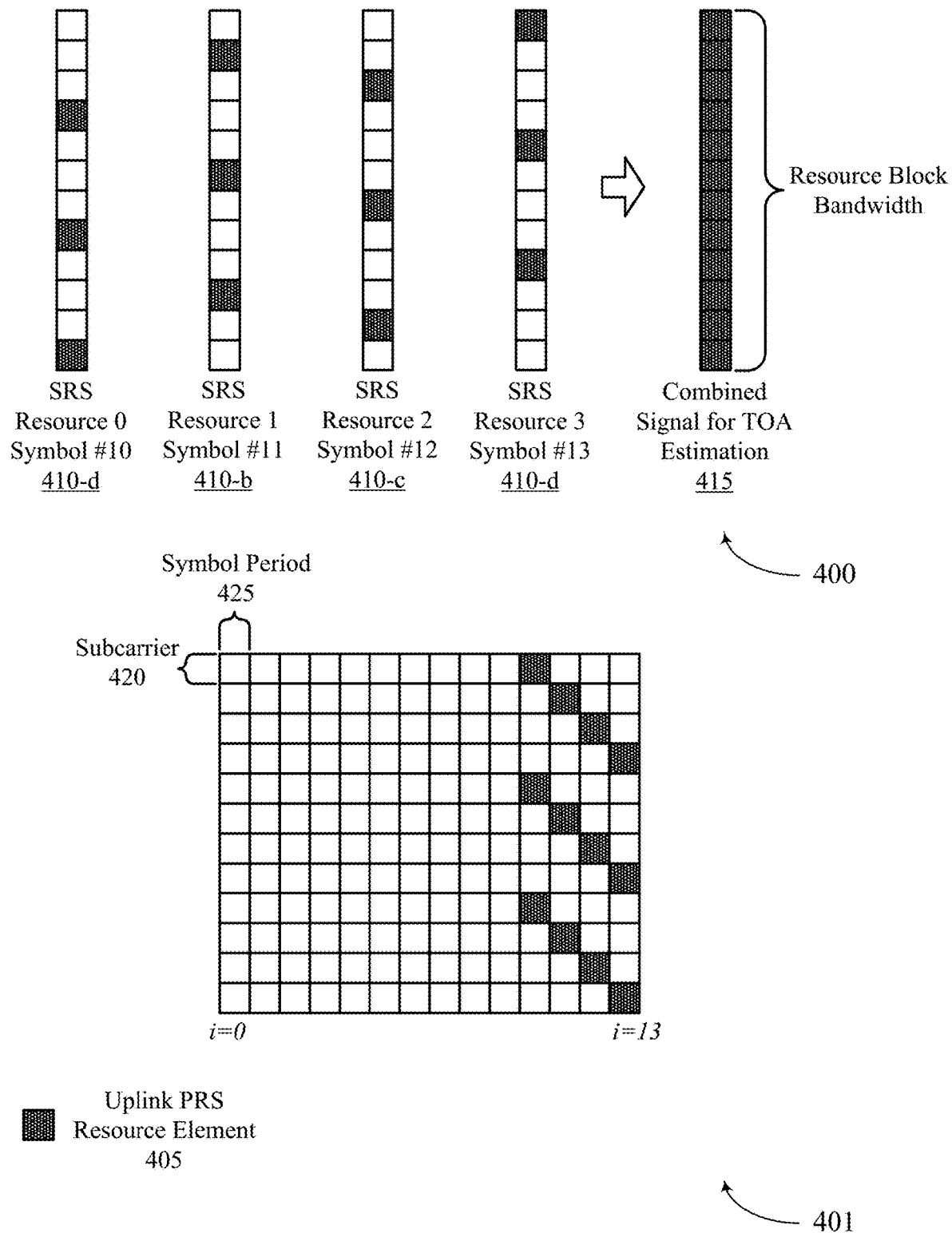
FIG. 4 illustrates examples of uplink PRS configurations that support aspects of the present disclosure.

FIG. 4 illustrates an example of an uplink PRS configuration 400 that supports aspects of the present disclosure. In some examples, the uplink PRS configuration 400 may implement aspects of wireless communication system 100.

In some cases, a UE 115 may be configured to transmit an uplink PRS to a base station 105. The base station 105 may monitor for and measure the uplink PRS. In some cases, the UE 115 may transmit an uplink PRS to multiple base stations 105, and each base station 105 may take a measurement for one of the multiple uplink PRS. An RSTD measurement may be an example of a measurement the base station 105 takes for the uplink PRS. In some cases, the base station 105 or the network, or both, may perform an RTT or a TDOA estimate based on the RSTD measurements.

In some cases, a first base station 105 may transmit a first measurement report for the uplink PRS and an indicator of the location of the base station 105 to the UE 115. The first base station 105 may also provide at least a second measurement report generated by at least a second base station 105 and the location of at least the second base station 105 to the UE 115. The UE 115 may perform a positioning estimate based on the first and second measurement report and the locations of the first and second base station. In some cases, the UE 115 may include other additional information, such as locations of additional base stations 105 and measurement reports generated by the additional base stations 105, in the positioning estimate. The UE 115 may apply UE-based techniques, UE-assisted techniques, or both, for an uplink PRS-based positioning estimate. An uplink PRS may be, for example, an SRS (e.g., a modified NR SRS), a PRACH signal, or a DMRS of PUSCH.

The uplink PRS configurations 400 and 401 describe some of multiple different possible configurations for an uplink PRS. Each of the uplink PRS configurations may show, for example, a set of time-frequency resources which include multiple resource elements. In some cases, the set of time-frequency resources may be, for example, one or more symbol periods 425 spanning a set of subcarriers 420 (e.g., as shown in uplink PRS configuration 400), or a full resource block (e.g., as may be shown in uplink PRS configuration 401). A resource element may span the time-frequency resources of one subcarrier 420 by one symbol period 425. The size of the subcarrier 420 and the symbol period 425 may be based on the configured subcarrier spacing. An uplink PRS may be transmitted in an uplink PRS resource element 405. The distribution of the downlink PRS resource elements 405 in the time-frequency resources may be configurable.

For example, an uplink PRS may have uniform density in the frequency domain. In some cases, the uplink PRS may have a frequency domain comb of two (e.g., comb-2) or a frequency domain comb of four (e.g., comb-4). In an example, the uplink PRS configurations 400 and 401 may each have a frequency domain comb of four. In some cases, the uplink PRS may use frequency domain staggering. The uplink PRS may be transmitted intra-slot, inter-slot, or both.

The uplink PRS configuration 400 may be an example of non-contiguous uplink PRS transmission. For example, the uplink PRS resource 410-*a* may correspond to a first slot and be transmitted in a first symbol period. In some cases, the first symbol period may actually be a tenth symbol period of a slot. For example, an uplink PRS transmitted in the uplink PRS resources 410 may be an example of an SRS, where the SRS is configured to be transmitted in one of a last few symbol periods of a slot. The uplink PRS resource 410-*b* may correspond to a second slot and be transmitted in a second symbol period. In some cases, the second slot may be the same as the first slot (e.g., the uplink PRS resource 410-*a* and the uplink PRS resource 410-*b* are in the same slot). In some other example, the first slot and the second slot may be different slots. A UE 115 may transmit a set of uplink PRS in each of the shown uplink PRS resources 410. A base station 105 receiving the set of uplink PRS for each of the uplink PRS resources 410 and generate a combined signal 415. Based on the combined signal 415, the base station 105 may reconstruct the frequency domain for corresponding to the uplink PRS transmissions. For example, the base station 105 may reconstruct the frequency domain for a resource block bandwidth corresponding to the uplink PRS resources 410. The base station 105 may then perform a TOA estimate based on the combined signal 415.

The sequence for an uplink PRS may be based on a Zadoff-Chu sequence. In some cases, an uplink PRS may be transmitted using multiple ports (e.g., antenna ports). The uplink PRS may have a configurable symbol location and bandwidth. In some cases, frequency domain hopping may be applied. The uplink PRS transmission may be configured to be Periodic, Semi-persistent, or aperiodic, for example similar to the downlink PRS transmission.

In some cases, an SRS may be transmitted in an uplink PRS resource element 405 in one of the last symbol periods 425 of a slot (e.g., in one of the last four symbol periods 425 of the slot). The uplink PRS resource elements 405 may be staggered. In some cases, the uplink PRS resource elements 405 may enable a receiving base station 105 to reconstruct the entire frequency domain of the corresponding set of subcarriers 420.

A PRS resource for a UE 115 to transmit an uplink PRS toward a serving or neighboring cell may be configured with beginning and end in the frequency domain In a first example, the beginning and end of the frequency domain may be configured with respect to common reference point A. In a second example, the start and end of the frequency domain may be configured with respect to the BWP start. A UE 115 may perform transmissions associated with positioning measurements towards the same gNBs or different gNBs using uplink PRS where at least one is configured according to the first example and at least one according to the second example.

Uplink PRS may be configured, activated, or triggered. In some cases, the uplink PRS may be configured by RRC signaling. The UE 115 may maintain uplink PRS transmission throughout the entire duration of the connection. In this example, the uplink PRS transmission may be periodic, where the periodicity and periodic characteristics of the uplink PRS are configurable.

In some cases, uplink PRS may be activated. Uplink PRS may be activated by a MAC CE message. In this example, the UE 115 may begin and maintain transmitting uplink PRS at some point after receiving the MAC CE. The UE 115 may continue transmitting uplink PRS (e.g., periodically) until another MAC CE has been received to de-activate the uplink PRS transmission. Uplink PRS may be activated or deactivate multiple times across the duration of a single connection.

In some examples, uplink PRS may be triggered. For example, a base station 105 may transmit DCI to the UE 115, which triggers the UE 115 to transmit an uplink PRS. The transmission may be for one occasion, or the UE 115 may be configured to transmit uplink PRS for a fixed number of occasions with a configured periodicity. After transmitting the uplink PRS for the configured number of occasions, the UE 115 may stop transmitting the uplink PRS. The base station 105 may later transmit a second DCI to re-trigger the UE 115 to transmit uplink PRS. In some cases, this may be an example of dynamic transmission of uplink PRS.

If the UL PRS is configured, triggered, or activated by, respectively, RRC signaling, DCI, or a MAC CE message from the cell in which the uplink PRS is configured to be transmitted, then the resources for the uplink PRS (e.g., the beginning and end of the frequency domain) may be configured with respect to the current active BWP. For example, if a base station 105 providing a cell for a UE 115 transmits an indicator to the UE 115 to transmit an uplink PRS, then the UE 115 may transmit the uplink PRS in PRS resources which are configured based on a BWP provided by that base station 105. The indicator may be a dynamic indication transmitted in DCI, a semi-static indication indicated by RRC signaling, or a configuration which is indicated (e.g., or toggled) by a MAC CE message.

Figure 5:
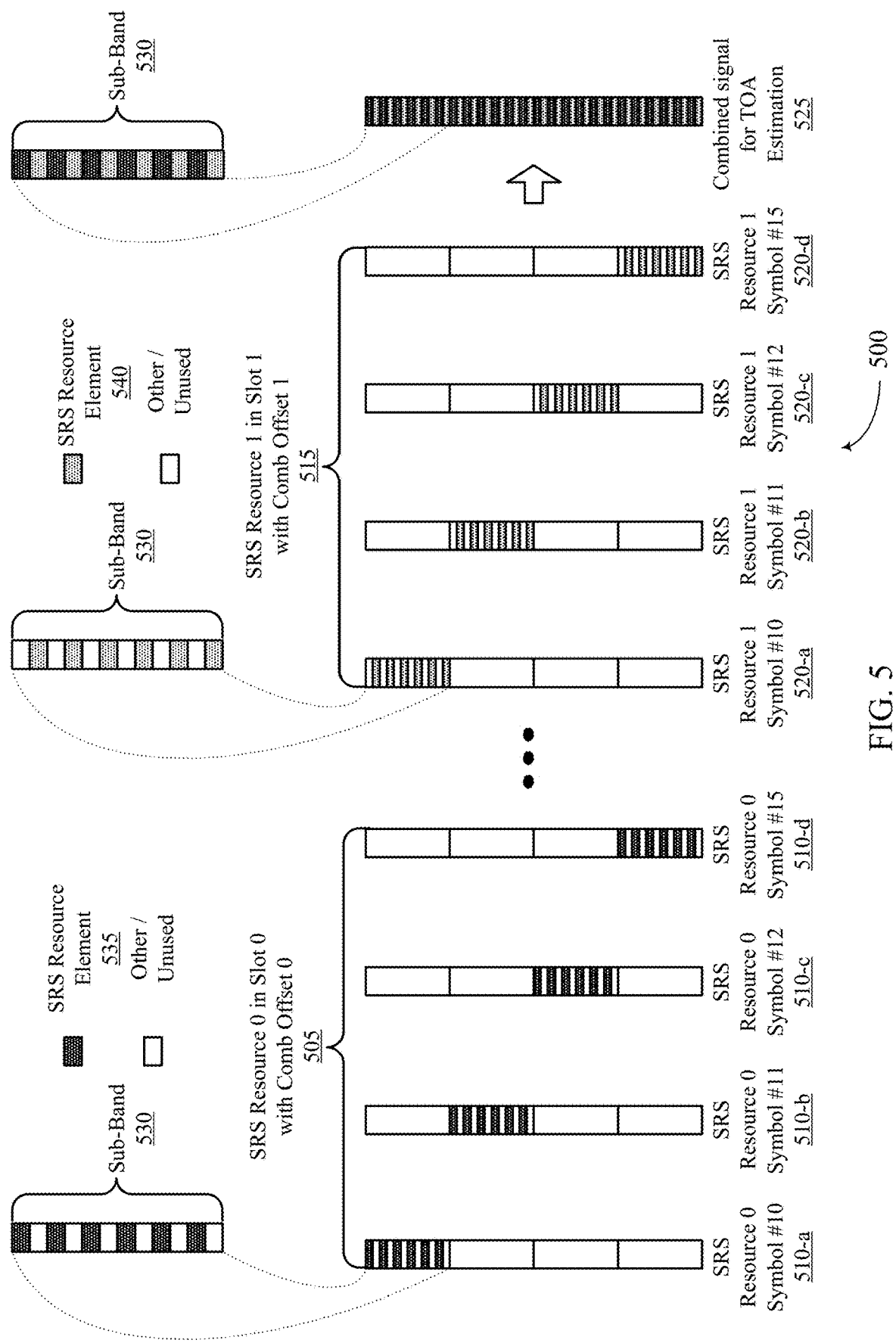
FIG. 5 illustrates an example of an uplink PRS configuration that supports aspects of the present disclosure.

FIG. 5 illustrates an example of an uplink PRS configuration 500 that supports aspects of the present disclosure. In some examples, the uplink PRS configuration 500 may implement aspects of wireless communication system 100.

An example of an uplink PRS may be, for example, an SRS (e.g., a modified NR SRS), a PRACH signal, or a DMRS of PUSCH. An uplink PRS may have uniform density in the frequency domain In some cases, the uplink PRS may have a frequency domain comb of two (e.g., comb-2) or a frequency domain comb of four (e.g., comb-4). In some cases, the uplink PRS may use frequency domain staggering. The uplink PRS may be transmitted intra-slot, inter-slot, or both. In the illustrated example, an SRS may be used for the uplink PRS. In other examples, other signals may be used for an uplink PRS.

The sequence for an uplink PRS may be based on a Zadoff-Chu sequence. In some cases, an uplink PRS may be transmitted using multiple ports (e.g., antenna ports). The uplink PRS may have a configurable symbol location and bandwidth. In some cases, frequency domain hopping may be applied. The uplink PRS transmission may be configured to be Periodic, Semi-persistent, or aperiodic, for example similar to the downlink PRS transmission.

In this example, a UE 115 may transmit an uplink PRS using frequency domain hopping and different comb offsets. A UE 115 may transmit a PRS, such as an SRS, in the first SRS resource 505. The first SRS resource 505 may include one or more SRS resource symbols 510. In some cases, an SRS resource symbol 510 may span multiple sub-bands 530. The UE 115 may sweep transmission of the uplink PRS across sub-bands 530 for the different SRS resource symbols 510. In this example, the SRS resource elements 535 may have a frequency comb of two. At the end of the SRS resource 505, the UE 115 may have transmitted an uplink PRS in half of the subcarriers of a configured frequency range. For SRS resource 515, the UE 115 may transmit an uplink PRS in the SRS resource elements 540. The SRS resource elements 540 may have a frequency comb of two, but a comb offset of one. The UE 115 may similarly sweep transmission of the uplink PRS across sub-bands 530 for the different SRS resource symbols 520.

A base station 105 receiving the uplink PRS may combine the uplink PRS transmitted in the SRS resource elements 535 and the SRS resource elements 540 across the SRS resource 505 and the SRS resource 515 to generate a combined signal 525. The base station 105 may reconstruct the full frequency domain for the corresponding sub-bands 530 and frequency range. In some cases, the uplink PRS configuration 500 may be an example of a zoomed out example of the uplink PRS configuration 400, where an active sub-band 530 is swept across a configured bandwidth.

Figure 6:
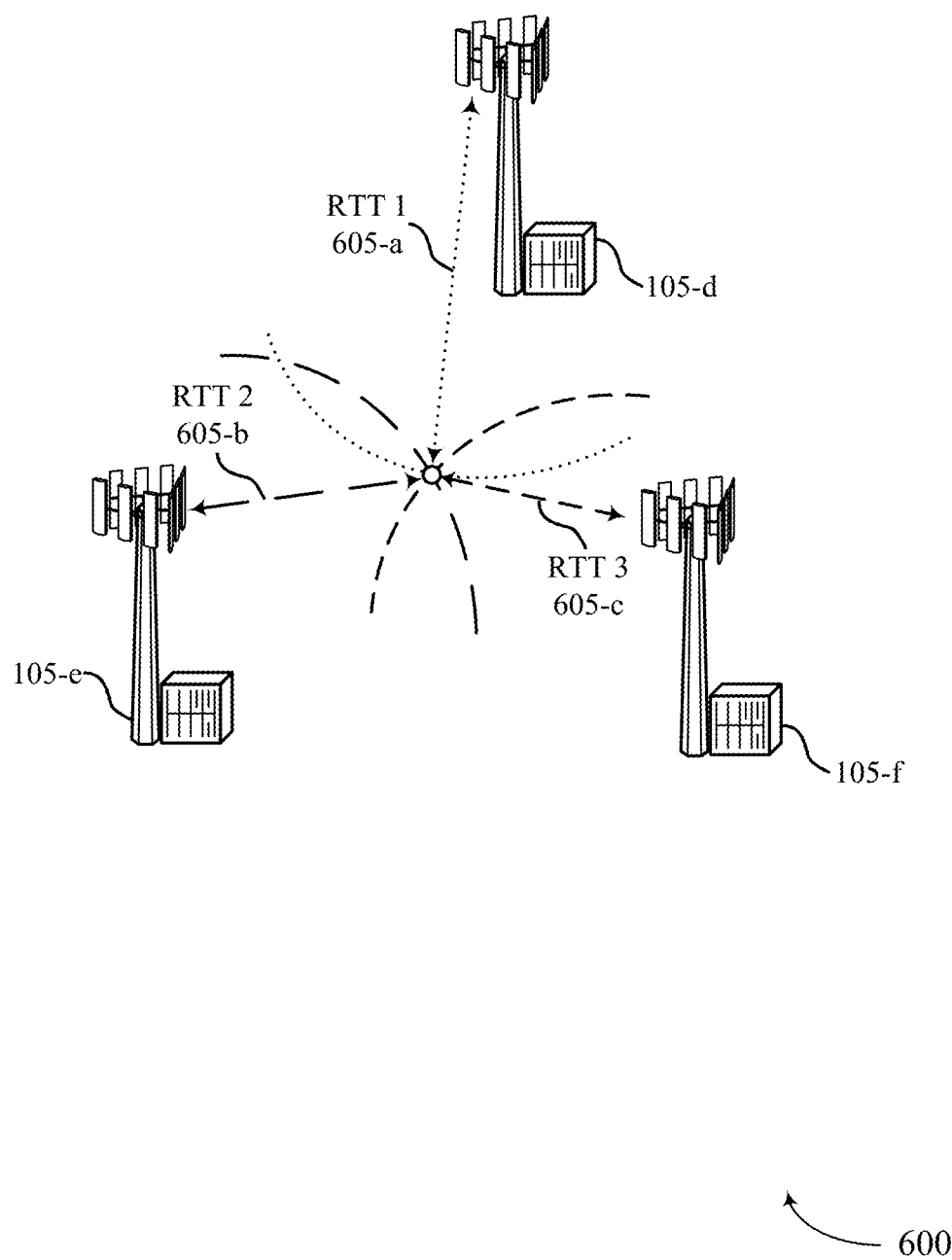
FIG. 6 illustrates an example of a round trip time (RTT) estimation that supports aspects of the present disclosure.

FIG. 6 illustrates an example of an RTT estimation 600 that supports aspects of the present disclosure. In some examples, the RTT estimation 600 may implement aspects of wireless communication system 100.

In some cases, UE positioning may be determined based on multiple cells performing an RTT estimation procedure. For example, base station 105-d may determine RTT 605-a, base station 105-e may determine RTT 605-b, and base station 105-f may determine RTT 605-c. The base stations 105 may exchange the RTT 605 information and attempt to determine or calculate the position of a UE 115 based on the RTT 605 information. The RTT procedure may be repeated across multiple cells (e.g., base station 105-d, 105-e, and 105-f). The positioning determining technique may be based on a distance to each cell along with location of each cell used for multi-lateral positioning. In some cases, a minimum of 3 cells may be used for RTT positioning. In some other examples, fewer cells may be used if the network has additional positioning information related to the UE 115. In some cases, further pruning or averaging across multiple observations may improve the positioning estimate. Multiple observations can be from more cells, angle of arrival or angle of departure, or more time instances.

Figure 7:
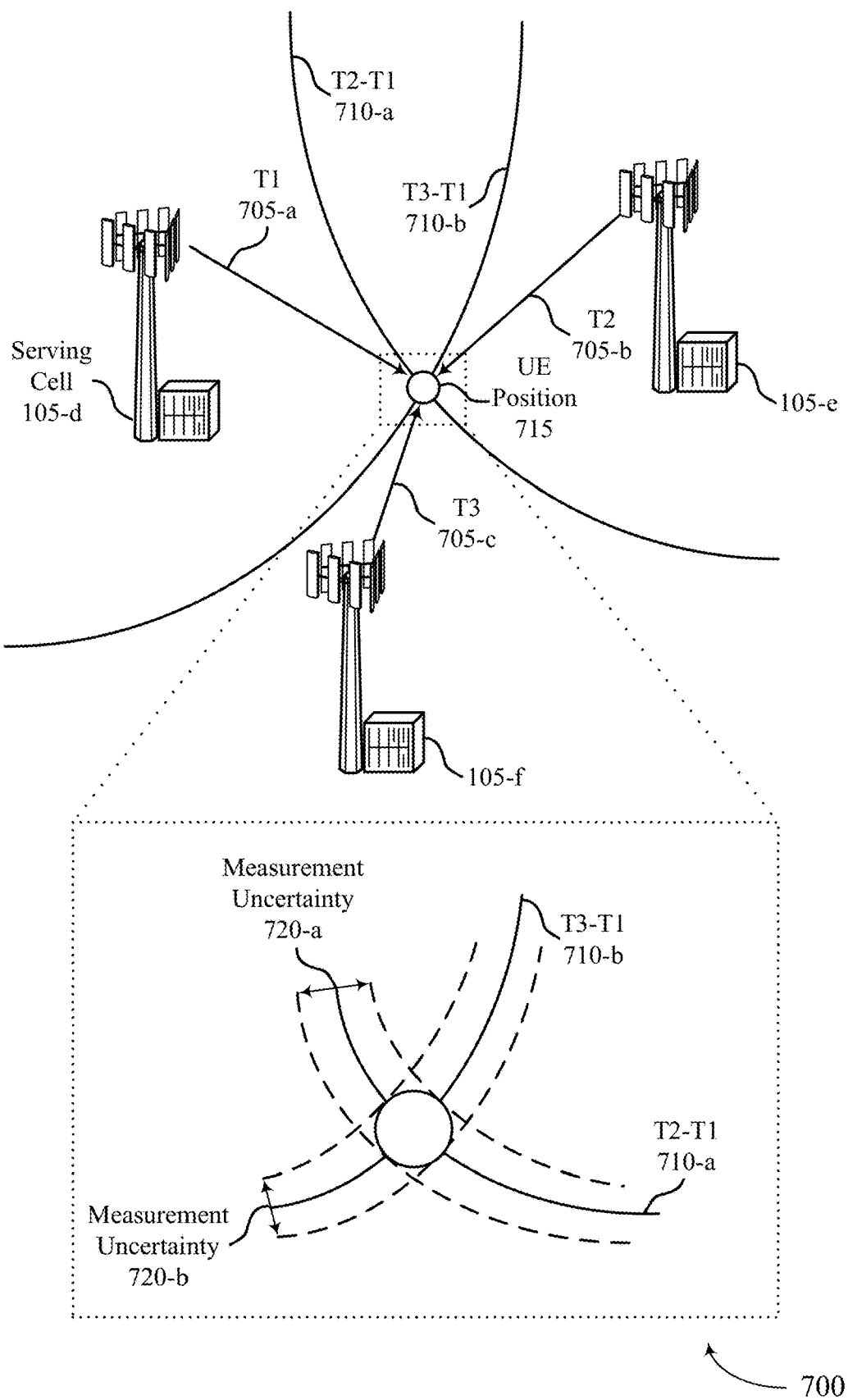
FIG. 7 illustrates an example of a time difference of arrival (TDOA) estimation that supports aspects of the present disclosure.

FIG. 7 illustrates an example of a time difference of arrival (TDOA) estimation 700 that supports aspects of the present disclosure. In some examples, the TDOA estimation 700 may implement aspects of wireless communication system 100.

In some cases, the UE position 715 may be determined based on a TDOA estimation. The TDOA estimation 700 may describe a mathematical model of the UE positioning problem using TDOA. A time of arrival (TOA) $T_i$ at the UE 115 for the shortest path from Cell i may be based on the equation $$T_i = \tau_i + \frac{D_i}{c},$$

where $\tau_i$ is sum of transmission time from NodeB i, NLOS transmission time, and UE timing measurement noise. In some cases, $T_i$ may be obtained from the estimation of the PRS. $D_i$ may be the Euclidean distance between Cell i with location ($q_i$) and UE 115 with location (p). In the equation, c may be the speed of light in the air (e.g., 299700 km/s). In some cases, cell locations $q_i$ may be assumed or known based on a cell information database.

As a mathematical notation, D may be the distance between two points on the surface of the earth. R may be the radius of the earth (6371 km). Respectively, $\varphi_1$ and $\varphi_2$ may be latitude (in radians) of point 1 and latitude (in radians) of point 2. Additionally, $\beta_1$ and $\beta_2$ may be the longitude (in radians) of point 1 and latitude (in radians) of point 2, respectively. In some cases, the formula used for Euclidean Distance (line distance) may be $c(T_k-\tau_k)=\sqrt{2}R\sqrt{1-\sin(\varphi_1)\sin(\varphi_2)-\cos(\varphi_1)\cos(\varphi_2)\cos(\beta_1-\beta_2)}$.

A first timing estimate 705-a for base station 105-d may be T1, a second timing estimate 705-b for base station 105-e may be T2, and a third timing estimate 705-c for base station 105-f may be T3. In an example, a wireless device making the positioning estimation (e.g., the UE 115 or one of the base stations 105) may determine first timing difference 710-a between second timing estimate 705-b and first timing estimate 705-a (e.g., T2-T1). The wireless device may also determine second timing difference 710-b between third timing estimate 705-c and first timing estimate 705-a (e.g., T3-T1). The wireless device may use the timing differences 710 to determine the UE position 715 based on the equations described above. In some cases, there may be some measurement uncertainties 720 for the timing differences 710. For example, first timing difference 710-a may have measurement uncertainty 720-a, and second timing difference 710-b, may have measurement uncertainty 720-b.

Figure 8:
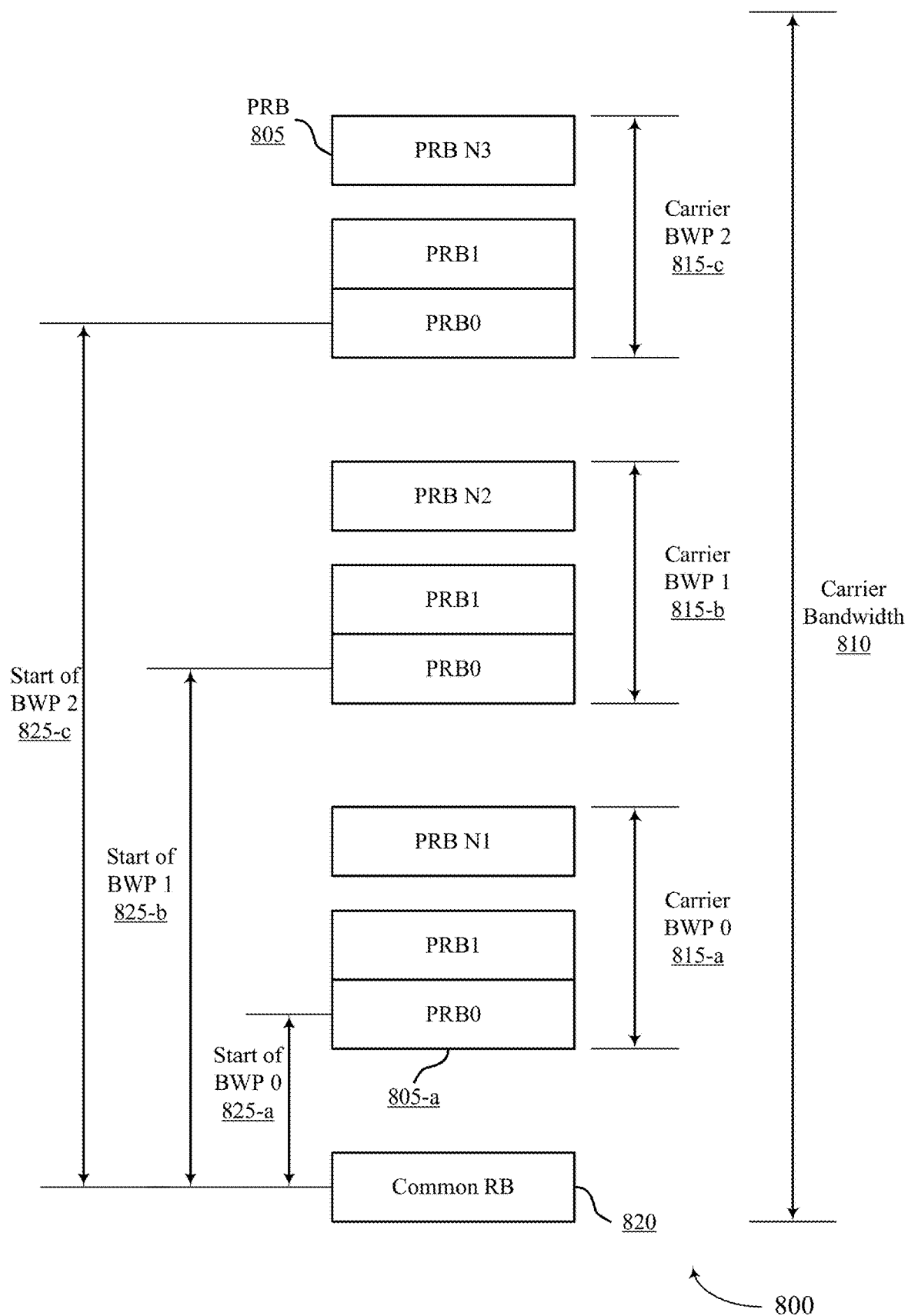
FIG. 8 illustrates an example of a BWP configuration that supports aspects of the present disclosure.

FIG. 8 illustrates an example of a BWP configuration 800 that supports aspects of the present disclosure. In some examples, the BWP configuration 800 may implement aspects of wireless communication system 100.

As described herein, a BWP 815 may be a contiguous set of physical resource blocks (PRBs) 805 on a given carrier. These resource blocks may be selected from a contiguous subset of the common resource blocks for a given numerology (u). Each BWP 815 defined for a numerology may have three different parameters, including SCS, symbol duration, and cyclic prefix length.

A BWP 815 may have some configuration properties. A UE 115 may be configured with, for example, up to four BWPs 815 for downlink and uplink at a given point in time. In some cases, the UE 115 may support one active BWP 815 for uplink and one active BWP 815 for downlink at a time. In some cases, by using BWPs 815, the wireless communications system may support a UE 115 to operate in narrow bandwidth. When a user needs more data (e.g., due to experiencing bursty traffic), the UE 115 can inform its serving cell to provide more (e.g., wider) bandwidth. When a base station 105 configures a BWP 815, the gNB may indicate some parameters for the BWP 815. The parameters may include a BWP Numerology (u), a BWP bandwidth size, the frequency location (NR-ARFCN), a control resource set, or any combination thereof.

In some cases, the UE 115 may be configured to receive and transmit only within the frequency range configured for the active BWPs with the associated numerologies. For downlink, the UE 115 may not be expected to receive PDSCH, PDCCH, CSI-RS, or TRS outside an active bandwidth part. Each downlink BWP may include at least one control resource set with a UE Specific Search Space (USS). In some cases, a primary carrier for at least one of the configured downlink BWPs may include one control resource set with a common search space (CSS).

For uplink, the UE 115 may generally not transmit PUSCH or PUCCH outside an active BWP 815. In some cases, however, the UE 115 may perform a Radio Resource Management (RRM) measurement or transmit a sounding reference signal (SRS) outside of its active uplink BWP. In some cases, uplink transmissions outside of the configured active uplink BWP may use a measurement gap. In some cases for a UE 115, there may be at most one active DL BWP and at most one active UL BWP. The HARQ retransmission across different BWPs 815 may be supported when a UE's active BWP is switched.

A BWP implementation may contribute to power saving. The BWP concept may reduce a baseband processing requirement to transmit or receive narrow bandwidth. A BWP may enable RF-Baseband interface operation with a lower sampling rate. UE radio frequency bandwidth adaptation may provide UE power saving at least if the carrier bandwidth before adaptation is large.

A common resource block 820 may indicate a resource block location in the set of common resource blocks. A In some cases, a PRB 805 may indicate a resource block within a specific carrier bandwidth part. A common resource block 820 may be a position in an absolute (reference) coordinate system and a physical resource block may be a position in a relative coordinate system.

In an example, a UE 115 may be configured with BWP 815-*a*, BWP 815-*b*, and BWP 815-*c*. To configure BWP 815-*a*, the serving base station 105 may transmit an indicator of a difference between the common resource block 820 and a start 825-*a* of BWP 815-*a*. BWP 815-*a* may include N1 PRBs 805, which may be contiguous in frequency. BWP 815-*b* may have a start 825-*b*, which may be contiguous to or separate from the last PRB 805 of BWP 815-*a*. For example, BWP 815-*a* and BWP 815-*b* may be contiguous in frequency, or they may be separated by some gap in the carrier bandwidth 810. BWP 815-*b* may include N2 PRBs 805. In some cases, N2 and N1 may be the same number, such that BWP 815-*a* and BWP 815-*b* have the same number of PRBs 805. In other examples, they may be different numbers, where BWP 815-*a* and BWP 815-*b* have different numbers of PRBs 805. In some cases, BWP 815-*a*, BWP 815-*b*, and BWP 815-*c* may each be configured with different parameters as described above.

Figure 9:
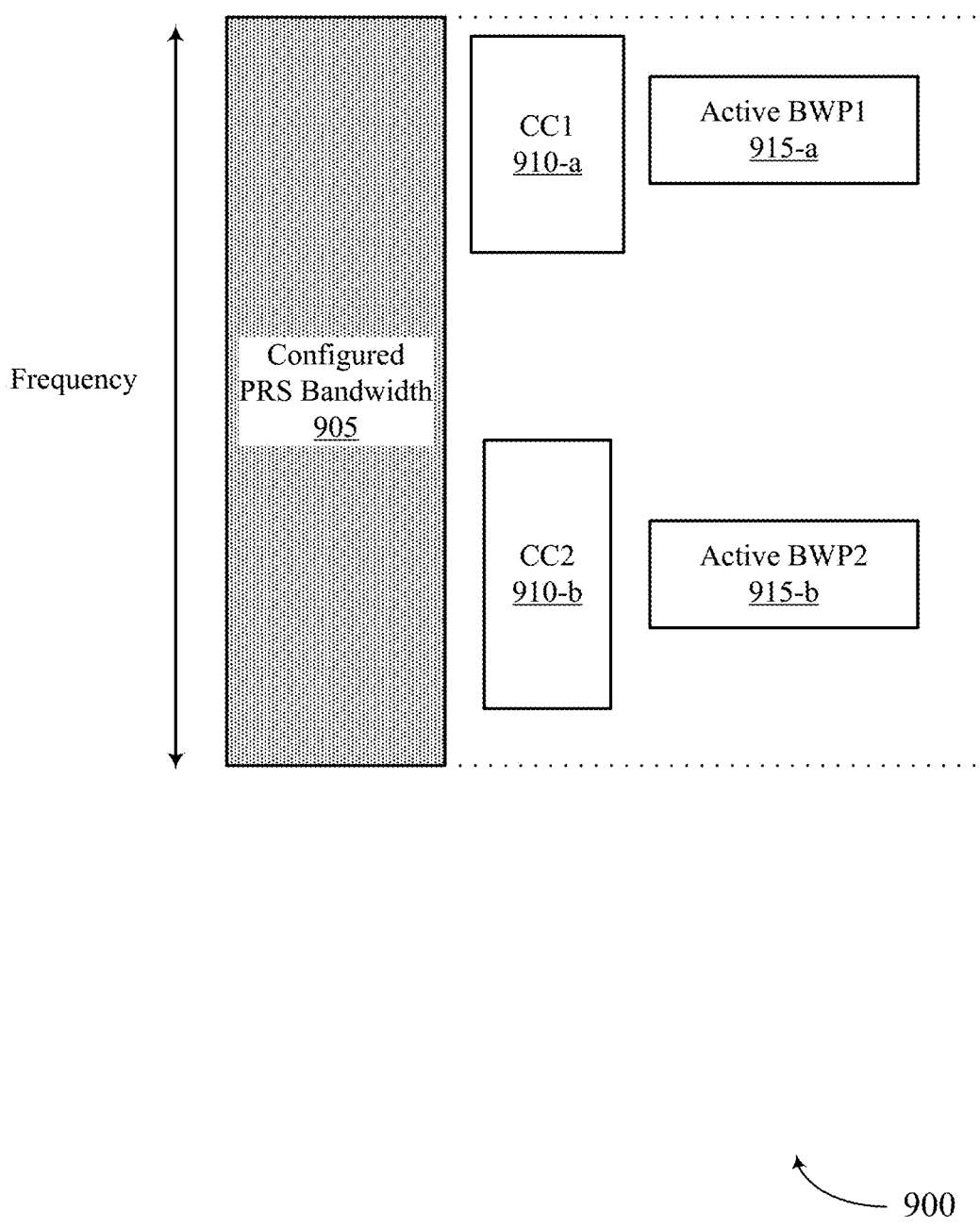
FIG. 9 illustrates an example of a PRS resource configuration that supports aspects of the present disclosure.

FIG. 9 illustrates an example of a PRS resource configuration 900 that supports aspects of the present disclosure. In some examples, the PRS resource configuration 900 may implement aspects of wireless communication system 100.

Figure 10:
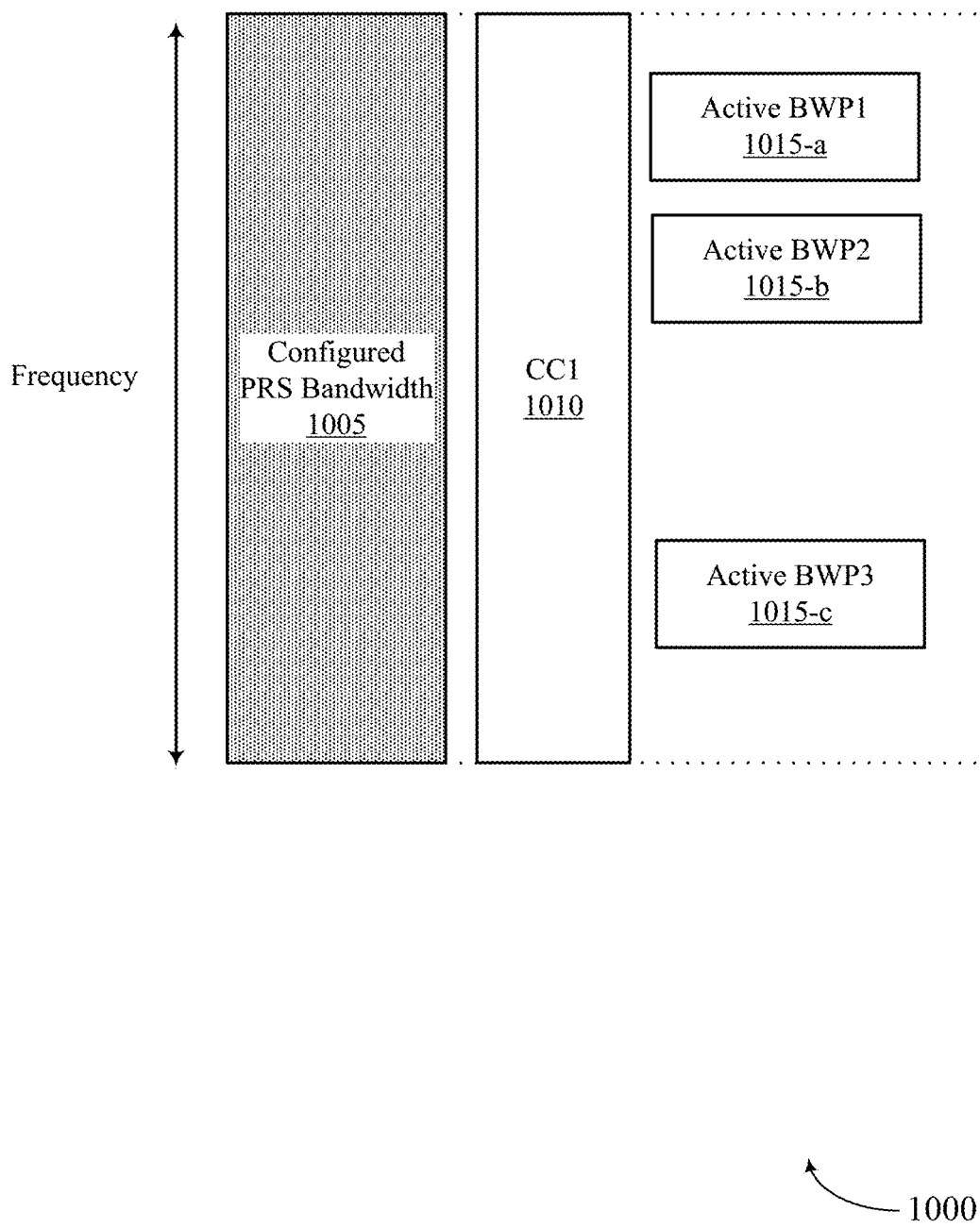
FIG. 10 illustrates an example of a PRS resource configuration that supports aspects of the present disclosure.

In some cases, such as the examples shown by FIG. 9 and FIG. 10, a UE 115 may be expected to measure a larger bandwidth than just the intersection of the PRS bandwidth with the active BWP. Whether such a measurement is expected by the UE may be based one of multiple different options, configurations, examples, or cases. In a first example, the expectation may be known to the UE by gNB indication. In a second example, the expectation may depend on whether the positioning method is UE-based or UE-assisted. In a third example, the expectation may be known to the gNB by UE capability indication. In a fifth example, the expectation may be based on whether sufficient gap before/after is provided to the UE. How much gap is considered "sufficient" is based on UE capability. Any combination of one or more of the above examples may be implemented.

In some cases, the UE 115 may be expected to measure PRS which are being transmitted by several gNBs. The active BWP (which may be configured with respect to the serving gNB) may change dynamically. In that case, the intersection of the active BWP with each PRS may be different, which may result in measurements of different accuracy. In some cases, to prevent the difference in accuracy, the active BWP may not be expected to change during the reception of a specific PRS occasion or PRS occasion group, of multiple consecutive PRS occasions/occasion group inside a predefined time window, of multiple PRS occasions/occasion group such that all configured gNBs have been measured, or of any combination thereof.

In another example, the active BWP may change during the reception of any of the above, but the UE 115 may not be expected to change the PRS measured bandwidth due to the active BWP change. For example, the UE 115 may first receive a PRS which has an intersection with a first BWP (e.g., BWP1) equal to the BWP1 bandwidth. Then, the UE 115 changes to BWP2 which has a smaller bandwidth and again receives a second PRS. The UE 115 may measure the larger PRS. In some cases, the UE may have measurements gaps before/after this second PRS.

In some cases, the same PRS resource may be configured in one of the component carriers with enough bandwidth to span across multiple component carriers. This may happen for the case that the PRS is defined with respect to reference point "A" as described in FIGS. 2 through 4. In a first example, the gNB may indicate to the UE 115 whether the same port is assumed across the whole PRS resource, or that the port in each component carrier is different. In a second example, the UE 115 may always assume that the same set of port(s) are transmitted. In a third example, if the two component carriers are contiguous, the UE 115 may always assume that the same set of port(s) are transmitted. In a fourth example, if the two component carriers are in the same band, the UE 115 may always assume that the same set of port(s) are transmitted. In a fifth example, if the frequency domain separation of the 2 component carriers is smaller than a threshold, the UE 115 may always assume that the same set of port(s) are transmitted. In some cases, the UE 115 may measure the PRS bandwidth which intersects with BWP1, or with BWP2, or measure both. A UE capability may be introduced to indicate the maximum bandwidth of the PRS that the UE 115 may process for the case that the PRS configuration is allowed to span across multiple component carriers. In some cases, the time-domain gaps before/after for such a measurement may be higher than the case of a PRS measured only inside one component carrier. Any one or more of the example described herein may be implemented.

In the illustrated example, a UE 115 may be configured with a first active BWP 915-*a* and a second active BWP 915-*b*. The first active BWP 915-*a* may be in a first component carrier 910-*a*, and the second active BWP 915-*b* may be in a second component carrier 910-*b*. The first active BWP 915-*a* may be an example of BWP1 as described herein, and the second active BWP 915-*b* may be an example of BWP2 as described herein. A configured PRS bandwidth 905 may span both the first component carrier 910-*a* and the second component carrier 910-*b* in bandwidth. The UE 115 may implement the techniques described above to transmit or receive PRS signals when the configured PRS resource (e.g., the configured PRS bandwidth 905) spans across multiple component carriers 910.

FIG. 10 illustrates an example of a PRS resource configuration 1000 that supports aspects of the present disclosure. In some examples, the PRS resource configuration 1000 may implement aspects of wireless communication system 100.

A transmission reception point, such as a base station 105, may configure a PRS resource for a UE 115 In some cases, the PRS resource (e.g., a configured PRS bandwidth 1005) may span across multiple active BWPs 1015, including a first active BWP 1015-*a*, a second active BWP 1015-*b*, and a third active BWP 1015-*c*. The PRS resource may be configured in a component carrier, such as component carrier 1010, with enough bandwidth to span across multiple active BWPs 1015. In a first example, the base station 105 may indicate to the UE 115 whether the same one or more ports are assumed across the active BWPs 1015 of the component carrier 1010. In a second example, the UE 115 may assume that the same set of one or more ports are transmitted. In a third example, if all the active BWPs 1015 are contiguous, the UE 115 may always assume that the same set of one or more ports are transmitted. In some cases, a UE capability may be used to indicate whether the UE 115 can measure PRS on multiple active BWPs 1015. The UE capability may indicate the maximum bandwidth of the PRS that the UE 115 may process for the case that the PRS configuration is supported to span across multiple BWPs 1015.

Figure 11:
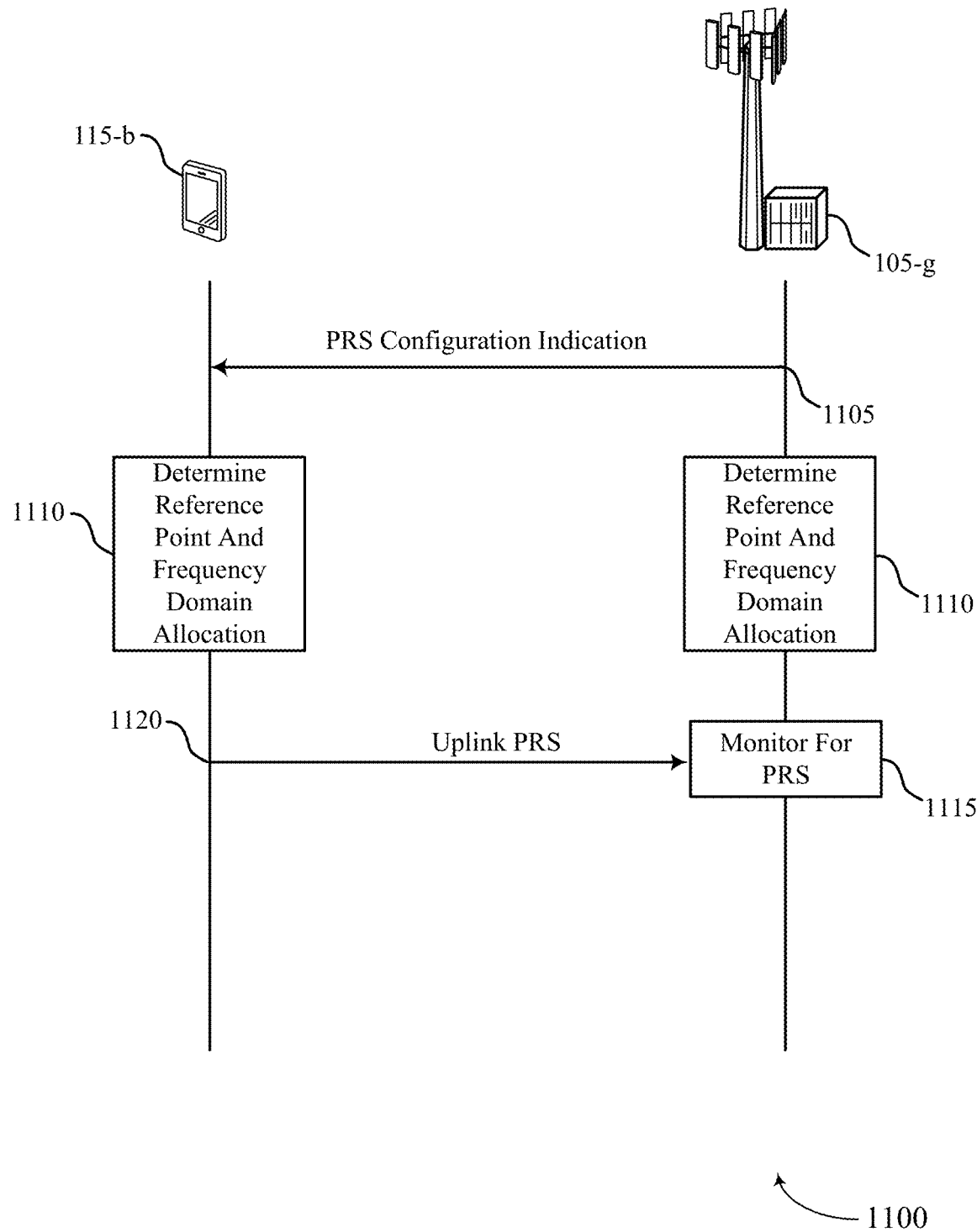
FIG. 11 illustrates an example of a process flow that supports aspects of the present disclosure.

FIG. 11 illustrates an example of a process flow 1100 that supports aspects of the present disclosure. In some examples, process flow 1100 may implement aspects of wireless communication system 100. Process flow 1100 may include UE 115-b and base station 105-g, which may be respective examples of a UE 115 and a base station 105 as described herein. Base station 105-g may be an example of a transmission reception point as described herein. In some cases, a network entity may control one or more transmission reception points, such as base station 105-g, to perform or facilitate one or more of the procedures described by the process flow 1100. In some cases, base station 105-g may be an example of a serving base station for UE 115. Base station 105-g may configure UE 115-b with one or more BWPs as described herein. Base station 105-g and UE 115-b may implement techniques for determining positioning of UE 115-b. Process flow 1100 may show an example of a configuration for and transmission of an uplink PRS.

A network entity may transmit an indication of a PRS configuration for base station 105-g. Base station 105-g may receive the indication of the PRS configuration from the network entity and, at 1105, base station 105-g may transmit the indication of the PRS configuration for base station 105-g to UE 115-b. At 1110, UE 115-b and base station 105-g may each determine, based on the PRS configuration, a reference point within a carrier bandwidth of a component carrier. UE 115-b and base station 105-g may also determine a frequency domain allocation for a PRS relative to the reference point. The frequency domain allocation for the PRS may be, for example, a defined bandwidth, a bandwidth which spans up to a bandwidth of a carrier, a BWP, a configured number of resource blocks, a configured bandwidth corresponding to a BWP, etc. In some cases, the reference point may differ from a starting resource block of the carrier bandwidth. In some other examples, the reference point may be a starting resource block of the carrier bandwidth.

At 1115, base station 105-g may monitor for a transmission of the PRS from UE 115-b within the frequency domain allocation. UE 115-b may transmit the PRS based on the frequency domain allocation.

In some cases, UE 115-b may transmit a PRS to each of multiple base stations 105. For example, UE 115-b may receive a second indication of a second PRS configuration for a second base station 105. UE 115-b may determine, based on the second PRS configuration, a second reference point within the carrier bandwidth of the component carrier and a second frequency domain allocation for a second PRS relative to the second reference point. UE 115-b may then transmit a second positioning signal within the second frequency domain allocation.

Figure 12:
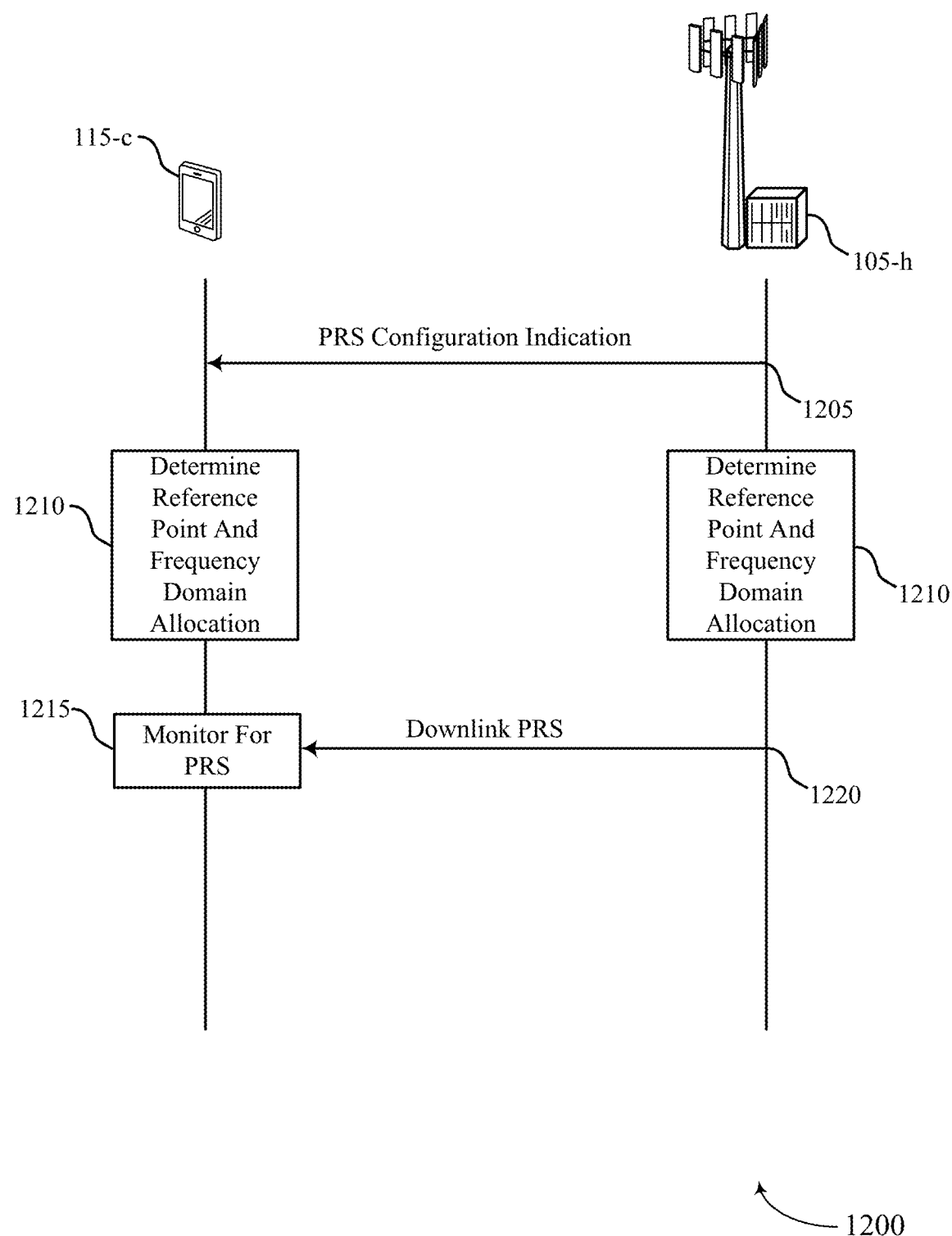
FIG. 12 illustrates an example of a process flow that supports aspects of the present disclosure.

FIG. 12 illustrates an example of a process flow 1200 that supports aspects of the present disclosure. In some examples, process flow 1200 may implement aspects of wireless communication system 100. Process flow 1200 may include UE 115-c and base station 105-h, which may be respective examples of a UE 115 and a base station 105 as described herein. Base station 105-h may be an example of a transmission reception point as described herein. In some cases, a network entity may control one or more transmission reception points, such as base station 105-h, to perform or facilitate one or more of the procedures described by the process flow 1200. In some cases, base station 105-h may be an example of a serving base station for UE 115. Base station 105-h may configure UE 115-c with one or more BWPs as described herein. Base station 105-h and UE 115-c may implement techniques for determining positioning of UE 115-c. Process flow 1200 may show an example of a configuration for and transmission of a downlink PRS.

A network entity may transmit an indication of a PRS configuration for base station 105-h. Base station 105-h may receive the indication of the PRS configuration from the network entity and, at 1205, base station 105-h may transmit the indication of the PRS configuration for base station 105-h to UE 115-c. At 1210, UE 115-c and base station 105-h may each determine, based on the PRS configuration, a reference point within a carrier bandwidth of a component carrier. UE 115-c and base station 105-h may also determine a frequency domain allocation for a PRS relative to the reference point. The frequency domain allocation for the PRS may be, for example, a defined bandwidth, a bandwidth which spans up to a bandwidth of a carrier, a BWP, a configured number of resource blocks, a configured bandwidth corresponding to a BWP, etc. In some cases, the reference point may differ from a starting resource block of the carrier bandwidth. In some other examples, the reference point may be a starting resource block of the carrier bandwidth.

At 1215, UE 115-c may monitor for a transmission of the PRS from base station 105-c within the frequency domain allocation. Base station 105-h may transmit the PRS based on the frequency domain allocation.

In some cases, UE 115-c may monitor for a PRS to each of multiple base stations 105. For example, UE 115-c may receive a second indication of a second PRS configuration for a second base station 105. UE 115-c may determine, based on the second PRS configuration, a second reference point within the carrier bandwidth of the component carrier and a second frequency domain allocation for a second PRS relative to the second reference point. UE 115-c may then monitor for a second positioning signal within the second frequency domain allocation.

Figure 13:
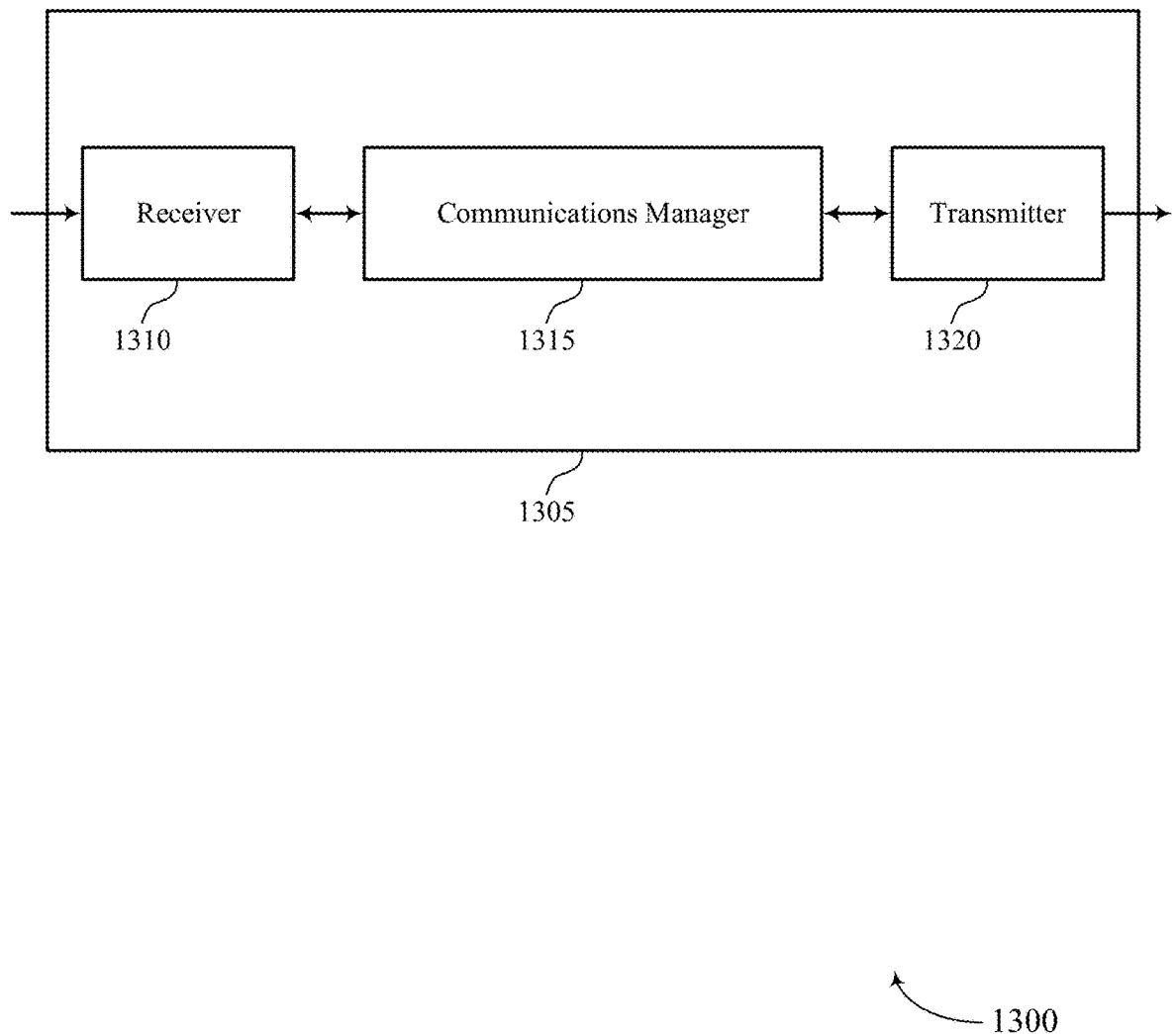
FIGS. 13 and 14 show block diagrams of devices that support aspects of the present disclosure.

FIG. 13 shows a block diagram 1300 of a device 1305 that supports aspects of the present disclosure. The device 1305 may be an example of aspects of a UE 115 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to bandwidth part considerations for uplink and downlink positioning reference signals, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may receive an indication of a positioning reference signal configuration for a transmission reception point, determine, based on the positioning reference signal configuration, a reference point within a carrier bandwidth of a component carrier and a frequency domain allocation for a positioning reference signal relative to the reference point, and transmit the positioning reference signal or measuring the positioning reference signal based on the frequency domain allocation. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
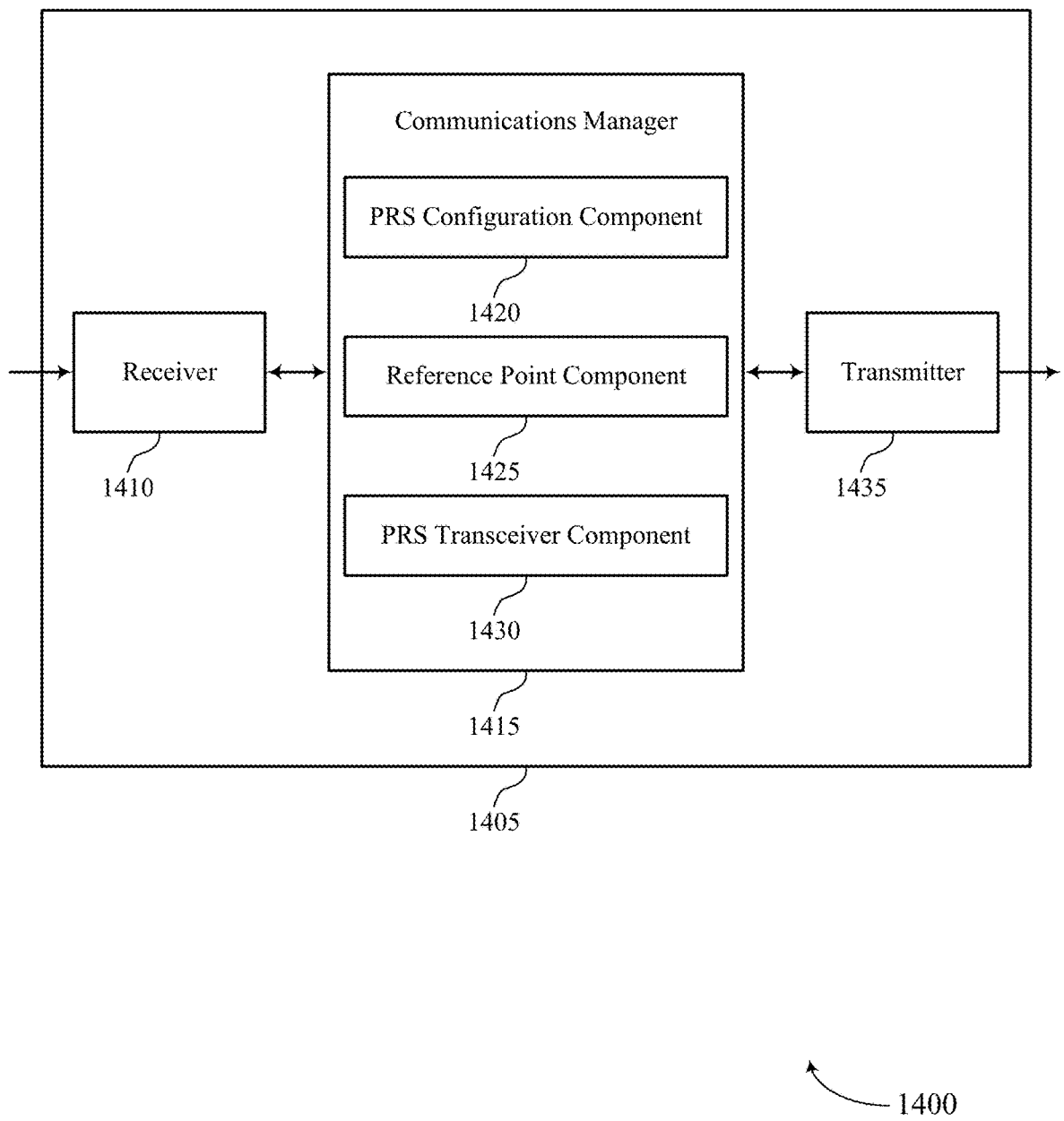

FIG. 14 shows a block diagram 1400 of a device 1405 that supports aspects of the present disclosure. The device 1405 may be an example of aspects of a device 1305, or a UE 115 as described herein. The device 1405 may include a receiver 1410, a communications manager 1415, and a transmitter 1435. The device 1405 may also include a processor. Each of these components may be in communication with one another (e.g., via one or more buses).

The receiver 1410 may receive information such as packets, user data, or control information associated with various information channels (e.g., control channels, data channels, and information related to bandwidth part considerations for uplink and downlink positioning reference signals, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a PRS configuration component 1420, a reference point component 1425, and a PRS transceiver component 1430. The communications manager 1415 may be an example of aspects of the communications manager 1610 described herein.

The PRS configuration component 1420 may receive an indication of a positioning reference signal configuration for a transmission reception point. The reference point component 1425 may determine, based on the positioning reference signal configuration, a reference point within a carrier bandwidth of a component carrier and a frequency domain allocation for a positioning reference signal relative to the reference point. The PRS transceiver component 1430 may transmit the positioning reference signal or measuring the positioning reference signal based on the frequency domain allocation.

The transmitter 1435 may transmit signals generated by other components of the device 1405. In some examples, the transmitter 1435 may be collocated with a receiver 1410 in a transceiver module. For example, the transmitter 1435 may be an example of aspects of the transceiver 1620 described with reference to FIG. 16. The transmitter 1435 may utilize a single antenna or a set of antennas.

Figure 15:
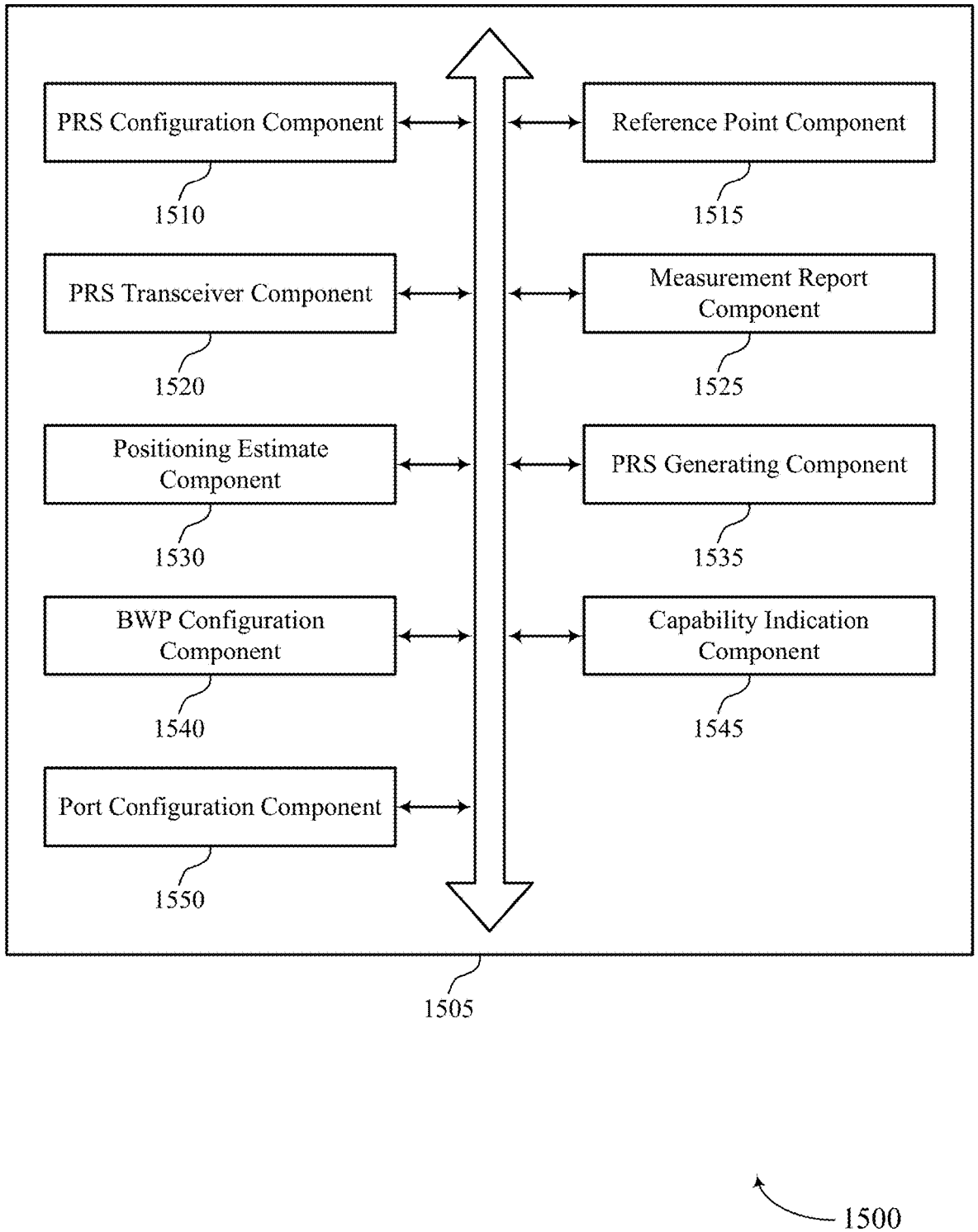
FIG. 15 shows a block diagram of a communications manager that supports aspects of the present disclosure.

FIG. 15 shows a block diagram 1500 of a communications manager 1505 that supports aspects of the present disclosure. The communications manager 1505 may be an example of aspects of a communications manager 1315, a communications manager 1415, or a communications manager 1610 described herein. The communications manager 1505 may include a PRS configuration component 1510, a reference point component 1515, a PRS transceiver component 1520, a measurement report component 1525, a positioning estimate component 1530, a PRS generating component 1535, a BWP configuration component 1540, a capability indication component 1545, and a port configuration component 1550. Each of these modules may communicate, directly or indirectly, with one another (e.g., via one or more buses).

The PRS configuration component 1510 may receive an indication of a positioning reference signal configuration for a transmission reception point. In some examples, the PRS configuration component 1510 may receive a second indication of a second positioning reference signal configuration of a second transmission reception point. In some examples, the PRS configuration component 1510 may transmission of the positioning reference signal occurs periodically throughout the duration of the connection.

In some examples, the PRS configuration component 1510 may receive a gap indicator that indicates one or more symbols before or after a positioning reference signal occasion. In some cases, the UE maintains transmission of the positioning reference signal throughout a duration of a connection with the transmission reception point based on received RRC signaling or a received configuration. In some cases, the UE maintains transmission of the positioning reference signal beginning after receiving a first MAC CE and until receiving a second MAC CE that de-activates the transmission of the positioning reference signal.

The reference point component 1515 may determine, based on the positioning reference signal configuration, a reference point within a carrier bandwidth of a component carrier and a frequency domain allocation for a positioning reference signal relative to the reference point. In some examples, the reference point component 1515 may determine, based on the positioning reference signal configuration, a start of the frequency domain allocation relative to the reference point and a bandwidth or a number of resource blocks of the frequency domain allocation. In some examples, the reference point component 1515 may determine, based on the second positioning reference signal configuration, a second reference point within the carrier bandwidth of the component carrier and a second frequency domain allocation for a second positioning reference signal relative to the second reference point. In some cases, the reference point differs from a starting resource block of the carrier bandwidth. In some cases, the reference point is a starting resource block of the carrier bandwidth.

The PRS transceiver component 1520 may transmit the positioning reference signal or measuring the positioning reference signal based on the frequency domain allocation. In some examples, the PRS transceiver component 1520 may measure the positioning reference signal within the frequency domain allocation using a subcarrier spacing of the carrier bandwidth that differs from a subcarrier spacing of an active bandwidth part within the carrier bandwidth configured for the UE. In some examples, the PRS transceiver component 1520 may measure the positioning reference signal within the frequency domain allocation using a subcarrier spacing of the carrier bandwidth that is the same as a subcarrier spacing of an active bandwidth part within the carrier bandwidth configured for the UE.

In some examples, the PRS transceiver component 1520 may transmit a second positioning reference signal or measuring the second positioning reference signal within the second frequency domain allocation. In some examples, the PRS transceiver component 1520 may receive a message instructing the UE to transmit the positioning reference signal. In some examples, the PRS transceiver component 1520 may UE transmits the positioning reference signal one per DCI trigger. In some cases, the message is a RRC message, a higher layer protocol message, a positioning message, an LTE positioning protocol message, a New Radio (NR) positioning message, DCI, or a MAC CE. In some cases, the DCI trigger indicates to transmit the positioning reference signal in a positioning reference signal occasion or in a defined number of positioning reference signal occasions with a defined periodicity.

The measurement report component 1525 may generate a measurement of the positioning reference signal based on the frequency domain allocation. In some examples, the measurement report component 1525 may transmit the measurement to a network entity.

The positioning estimate component 1530 may determine a positioning estimate of the UE based on measuring the positioning reference signal within the frequency domain allocation. In some cases, the positioning estimate of the UE may be relative to the transmission reception point. In some examples, the positioning estimate component 1530 may receive positioning information that indicates a first measurement and a first location of the transmission reception point and at least a second location of at least a second transmission reception point based on transmitting the positioning reference signal. In some examples, the positioning estimate component 1530 may receive a positioning reference signal measurement report that indicates a first measurement and a first location of the transmission reception point and at least a second measurement and at least a second location of at least a second transmission reception point based on transmitting the positioning reference signal. In some examples, the positioning estimate component 1530 may determine a positioning estimate of the UE based on the positioning reference signal measurement report.

The PRS generating component 1535 may determine a scrambling sequence for the positioning reference signal based on the reference point. In some examples, the PRS generating component 1535 may scramble a first sequence with the scrambling sequence to generate a positioning reference sequence. In some examples, the PRS generating component 1535 may generate the positioning reference signal based on the positioning reference sequence.

In some examples, the PRS generating component 1535 may determine a scrambling sequence for the positioning reference signal based on a second reference point that differs from the reference point. In some examples, the PRS generating component 1535 may generate the positioning reference signal based on the positioning reference sequence.

The BWP configuration component 1540 may receive signaling that configures the UE with at least one bandwidth part and an active bandwidth part within the at least one bandwidth part, where the frequency domain allocation intersects with a bandwidth of the active bandwidth part. In some examples, the BWP configuration component 1540 may determine that an intersection of the frequency domain allocation and the bandwidth of the active bandwidth part satisfies a threshold. In some examples, the BWP configuration component 1540 may UE is configured with the threshold.

In some examples, the BWP configuration component 1540 may receive a measurement indicator that configures the UE to measure the positioning reference signal over the bandwidth of the frequency domain allocation that exceeds the bandwidth of the active bandwidth part. In some cases, the threshold is based on a capability of the UE, or a type of positioning method, or a configured positioning reference signal pattern, or frequency hopping pattern, or any combination thereof. In some cases, a bandwidth of the frequency domain allocation exceeds the bandwidth of the active bandwidth part. In some cases, the measurement indicator is based on a type of positioning method. In some cases, the active bandwidth part does not change during at least one positioning reference signal occasion or at least one positioning reference signal occasion group.

In some cases, the active bandwidth part does not change during a set of positioning reference signal occasions or a set of positioning reference signal occasion groups within a defined time window. In some cases, the active bandwidth part does not change during a set of positioning reference signal occasions or a set of positioning reference signal occasion groups for measuring a set of positioning reference signals of a set of transmission reception points. In some cases, the frequency domain allocation of the positioning reference signal does not change when the active bandwidth part changes to a second active bandwidth part during at least one positioning reference signal occasion or at least one positioning reference signal occasion group.

The capability indication component 1545 may transmit a capability indicator that indicates whether the UE is capable of measuring the positioning reference signal over the bandwidth of the frequency domain allocation that exceeds the bandwidth of the active bandwidth part, where the measurement indicator is based on the capability indicator. In some examples, the capability indication component 1545 may transmit a capability indicator that indicates a defined bandwidth support for the positioning reference signal that spans a set of component carriers.

In some examples, the capability indication component 1545 may receive a gap indicator that configures a time domain gap before or after a positioning reference signal occasion. In some examples, the capability indication component 1545 may transmit a capability indicator that indicates whether the UE supports measuring the positioning reference signal on a set of active bandwidth parts.

In some examples, the capability indication component 1545 may receive a measurement indicator that configures the UE to measure the positioning reference signal over at least one of the set of active bandwidth parts based on the capability indicator. In some examples, the capability indication component 1545 may transmit a capability indicator that indicates a measurement bandwidth that the UE supports for measuring the positioning reference signal. In some cases, the capability indicator indicates a gap before or after a positioning reference signal occasion.

The port configuration component 1550 may receive a port indication that indicates a same port has been applied across the frequency domain allocation or a different port has been applied for each component carrier of a set of component carriers, where the frequency domain allocation of the positioning reference signal spans the set of component carriers. In some examples, the port configuration component 1550 may determine a same port has been applied across the frequency domain allocation based on the frequency domain allocation of the positioning reference signal spanning a set of component carriers. In some examples, the port configuration component 1550 may determine a same port has been applied across the frequency domain allocation based on the frequency domain allocation of the positioning reference signal spanning a set of contiguous component carriers.

In some examples, the port configuration component 1550 may determine a same port has been applied across the frequency domain allocation based on the frequency domain allocation of the positioning reference signal spanning a set of component carriers within a same frequency band. In some examples, the port configuration component 1550 may determine a same port has been applied across the frequency domain allocation based on the frequency domain allocation of the positioning reference signal spanning a set of component carriers and a frequency domain separation of each pair of the set of component carriers satisfying a threshold. In some examples, the port configuration component 1550 may receive a port indication that indicates a same port has been applied for each active bandwidth part of a set of active bandwidth parts of the component carrier, where the frequency domain allocation spans the set of active bandwidth parts.

In some examples, the port configuration component 1550 may receive a port indication that indicates a different port has been applied for each active bandwidth part of a set of active bandwidth parts of the component carrier, where the frequency domain allocation spans the set of active bandwidth parts. In some examples, the port configuration component 1550 may determine a same port has been applied for each active bandwidth part of a set of active bandwidth parts of the component carrier, where the frequency domain allocation spans the set of active bandwidth parts. In some examples, the port configuration component 1550 may determine a same port has been applied for each active bandwidth part of a set of contiguous active bandwidth parts of the component carrier, where the frequency domain allocation spans the set of active bandwidth parts.

Figure 16:
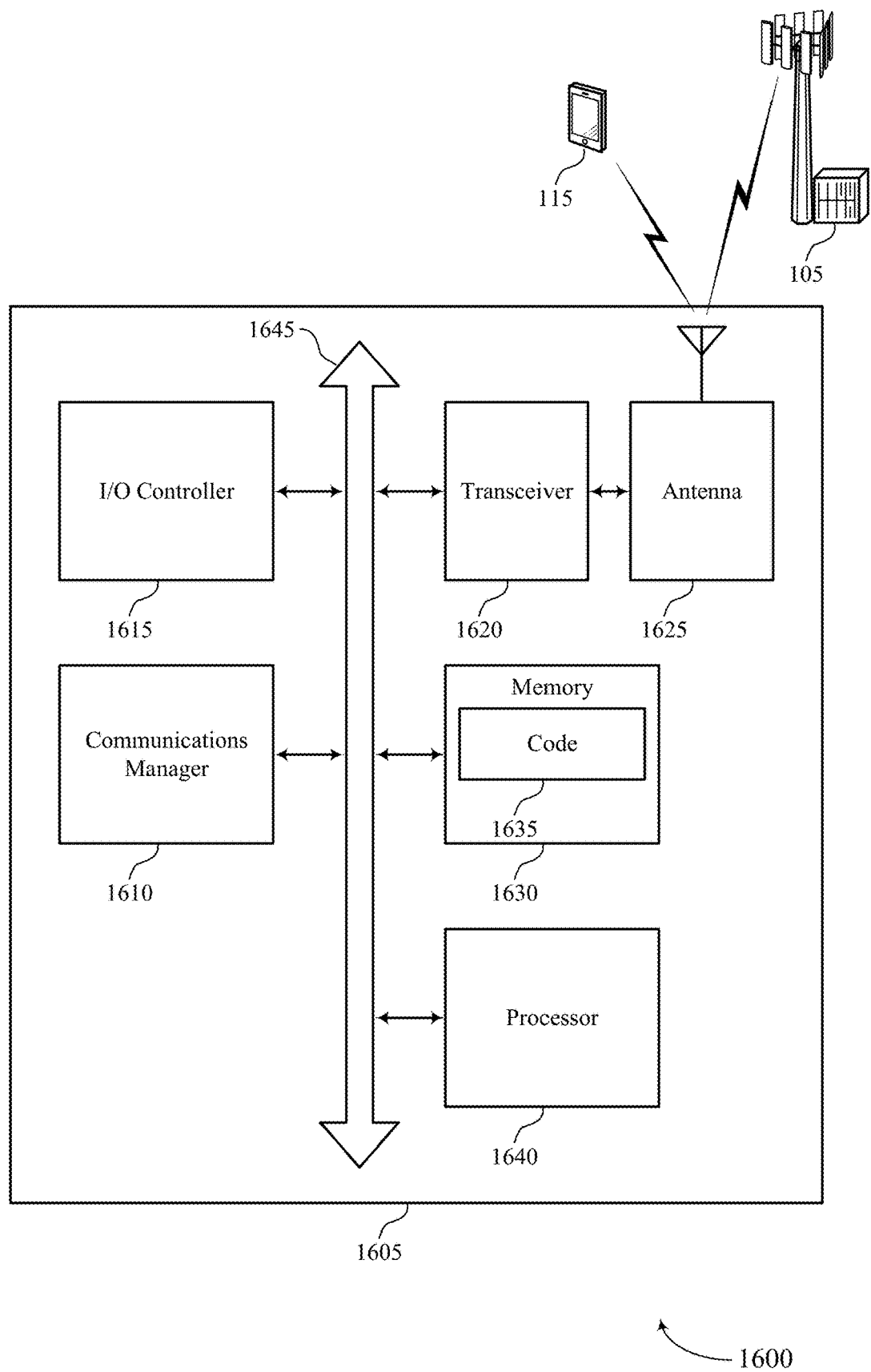
FIG. 16 shows a diagram of a system including a device that supports aspects of the present disclosure.

FIG. 16 shows a diagram of a system 1600 including a device 1605 that supports aspects of the present disclosure. The device 1605 may be an example of or include the components of device 1305, device 1405, or a UE 115 as described herein. The device 1605 may include components for bi-directional voice and data communications including components for transmitting and receiving communications, including a communications manager 1610, an I/O controller 1615, a transceiver 1620, an antenna 1625, memory 1630, and a processor 1640. These components may be in electronic communication via one or more buses (e.g., bus 1645).

The communications manager 1610 may receive an indication of a positioning reference signal configuration for a transmission reception point, determine, based on the positioning reference signal configuration, a reference point within a carrier bandwidth of a component carrier and a frequency domain allocation for a positioning reference signal relative to the reference point, and transmit the positioning reference signal or measuring the positioning reference signal based on the frequency domain allocation.

The I/O controller 1615 may manage input and output signals for the device 1605. The I/O controller 1615 may also manage peripherals not integrated into the device 1605. In some cases, the I/O controller 1615 may represent a physical connection or port to an external peripheral. In some cases, the I/O controller 1615 may utilize an operating system such as iOS®, ANDROID®, MS-DOS®, MS-WINDOWS®, OS/2®, UNIX®, LINUX®, or another known operating system. In other cases, the I/O controller 1615 may represent or interact with a modem, a keyboard, a mouse, a touchscreen, or a similar device. In some cases, the I/O controller 1615 may be implemented as part of a processor. In some cases, a user may interact with the device 1605 via the I/O controller 1615 or via hardware components controlled by the I/O controller 1615.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM and ROM. The memory 1630 may store computer-readable, computer-executable code 1635 including instructions that, when executed, cause the processor to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting bandwidth part considerations for uplink and downlink positioning reference signals).

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
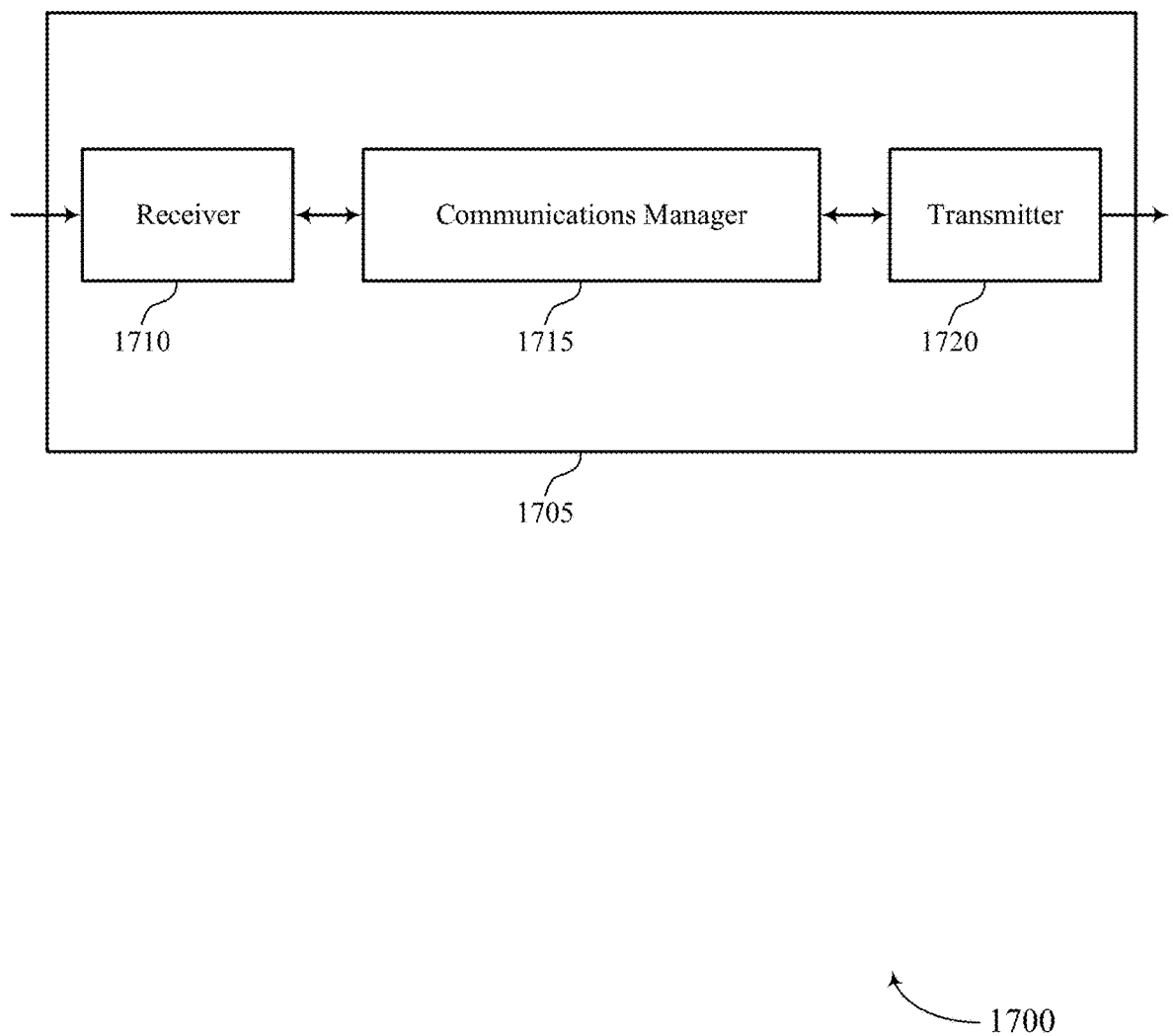
FIGS. 17 and 18 show block diagrams of devices that support aspects of the present disclosure.

FIG. 17 shows a block diagram 1700 of a device 1705 that supports aspects of the present disclosure. The device 1705 may be an example of aspects of a transmission reception point, such as a base station 105 as described herein, or a network entity controlling one or more transmission reception points. The network entity may be a part of a core network (e.g., a core network 130 described with reference to FIG. 1) and may communicate with one or more transmission reception points via backhaul links. The device 1705 may include a receiver 1710, a communications manager 1715, and a transmitter 1720. The device 1705 may also include a processor. Each of these components may be in communication with one another (e.g., via one or more buses).

The receiver 1710 may receive information such as packets, user data, or control information associated with various information channels (e.g., control channels, data channels, and information related to bandwidth part considerations for uplink and downlink positioning reference signals, etc.). Information may be pas sed on to other components of the device 1705. The receiver 1710 may be an example of aspects of the transceiver 2020 described with reference to FIG. 20. The receiver 1710 may utilize a single antenna or a set of antennas.

The communications manager 1715 may transmit an indication of a positioning reference signal configuration for the transmission reception point, determine, based on the positioning reference signal configuration, a reference point within a carrier bandwidth of a component carrier and a frequency domain allocation for a positioning reference signal relative to the reference point, and monitor for a transmission of the positioning reference signal from a UE within the frequency domain allocation. The communications manager 1715 may be an example of aspects of the communications manager 2010 described herein.

The communications manager 1715, or its sub-components, may be implemented in hardware, code (e.g., software or firmware) executed by a processor, or any combination thereof. If implemented in code executed by a processor, the functions of the communications manager 1715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1715, or its sub-components, may be physically located at various positions, including being distributed such that portions of functions are implemented at different physical locations by one or more physical components. In some examples, the communications manager 1715, or its sub-components, may be a separate and distinct component in accordance with various aspects of the present disclosure. In some examples, the communications manager 1715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1720 may transmit signals generated by other components of the device 1705. In some examples, the transmitter 1720 may be collocated with a receiver 1710 in a transceiver module. For example, the transmitter 1720 may be an example of aspects of the transceiver 2020 described with reference to FIG. 20. The transmitter 1720 may utilize a single antenna or a set of antennas.

Figure 18:
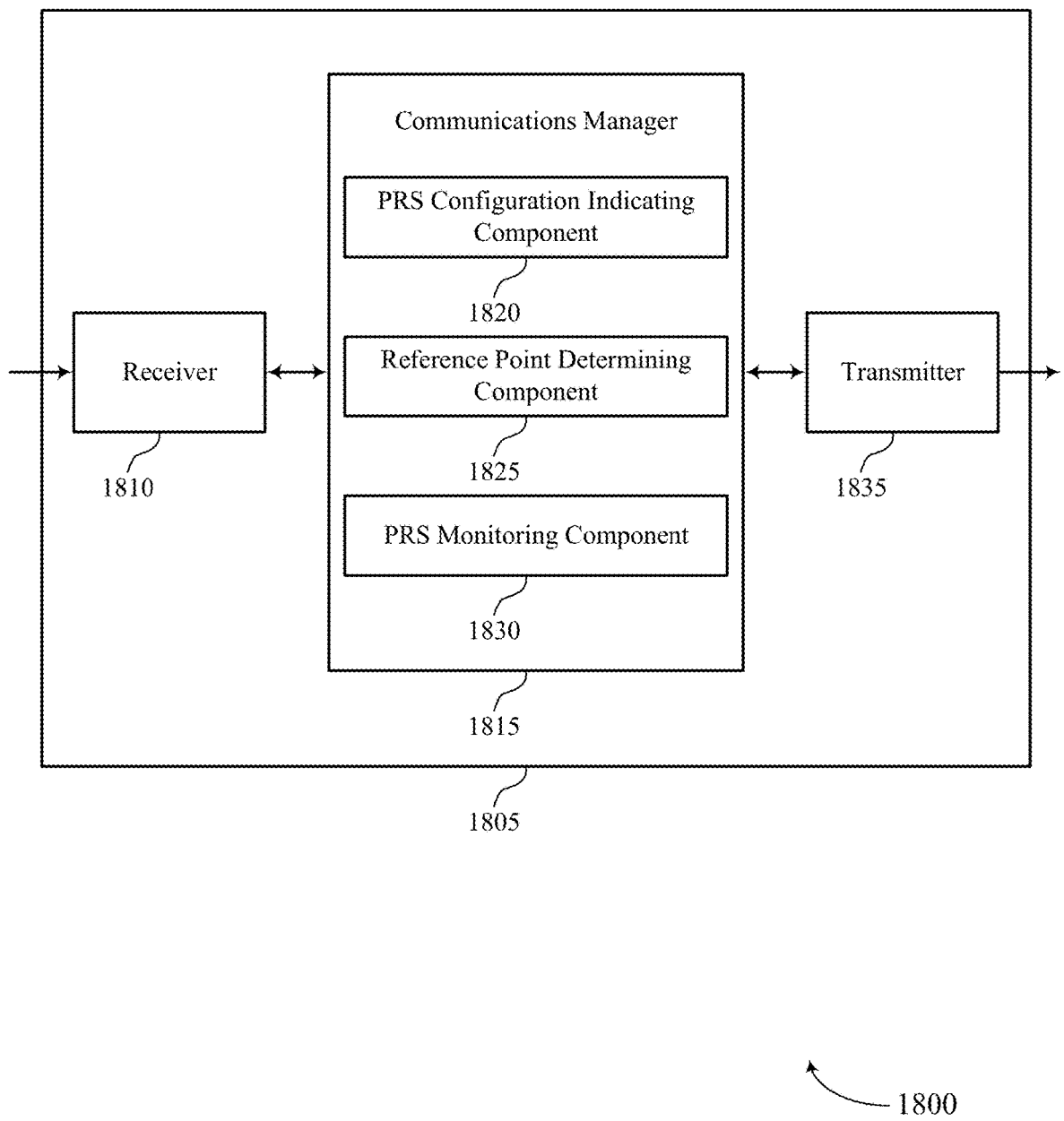

FIG. 18 shows a block diagram 1800 of a device 1805 that supports aspects of the present disclosure. The device 1805 may be an example of aspects of a device 1705, a transmission reception point, such as a base station 105 as described herein, or a network entity controlling one or more transmission reception points. The network entity may be a part of a core network (e.g., a core network 130 described with reference to FIG. 1) and may communicate with one or more transmission reception points via backhaul links. The device 1805 may include a receiver 1810, a communications manager 1815, and a transmitter 1835. The device 1805 may also include a processor. Each of these components may be in communication with one another (e.g., via one or more buses).

The receiver 1810 may receive information such as packets, user data, or control information associated with various information channels (e.g., control channels, data channels, and information related to bandwidth part considerations for uplink and downlink positioning reference signals, etc.). Information may be passed on to other components of the device 1805. The receiver 1810 may be an example of aspects of the transceiver 2020 described with reference to FIG. 20. The receiver 1810 may utilize a single antenna or a set of antennas.

The communications manager 1815 may be an example of aspects of the communications manager 1715 as described herein. The communications manager 1815 may include a PRS configuration indicating component 1820, a reference point determining component 1825, and a PRS monitoring component 1830. The communications manager 1815 may be an example of aspects of the communications manager 2010 described herein.

The PRS configuration indicating component 1820 may transmit an indication of a positioning reference signal configuration for the transmission reception point. The reference point determining component 1825 may determine, based on the positioning reference signal configuration, a reference point within a carrier bandwidth of a component carrier and a frequency domain allocation for a positioning reference signal relative to the reference point. The PRS monitoring component 1830 may monitor for a transmission of the positioning reference signal from a UE within the frequency domain allocation.

The transmitter 1835 may transmit signals generated by other components of the device 1805. In some examples, the transmitter 1835 may be collocated with a receiver 1810 in a transceiver module. For example, the transmitter 1835 may be an example of aspects of the transceiver 2020 described with reference to FIG. 20. The transmitter 1835 may utilize a single antenna or a set of antennas.

Figure 19:
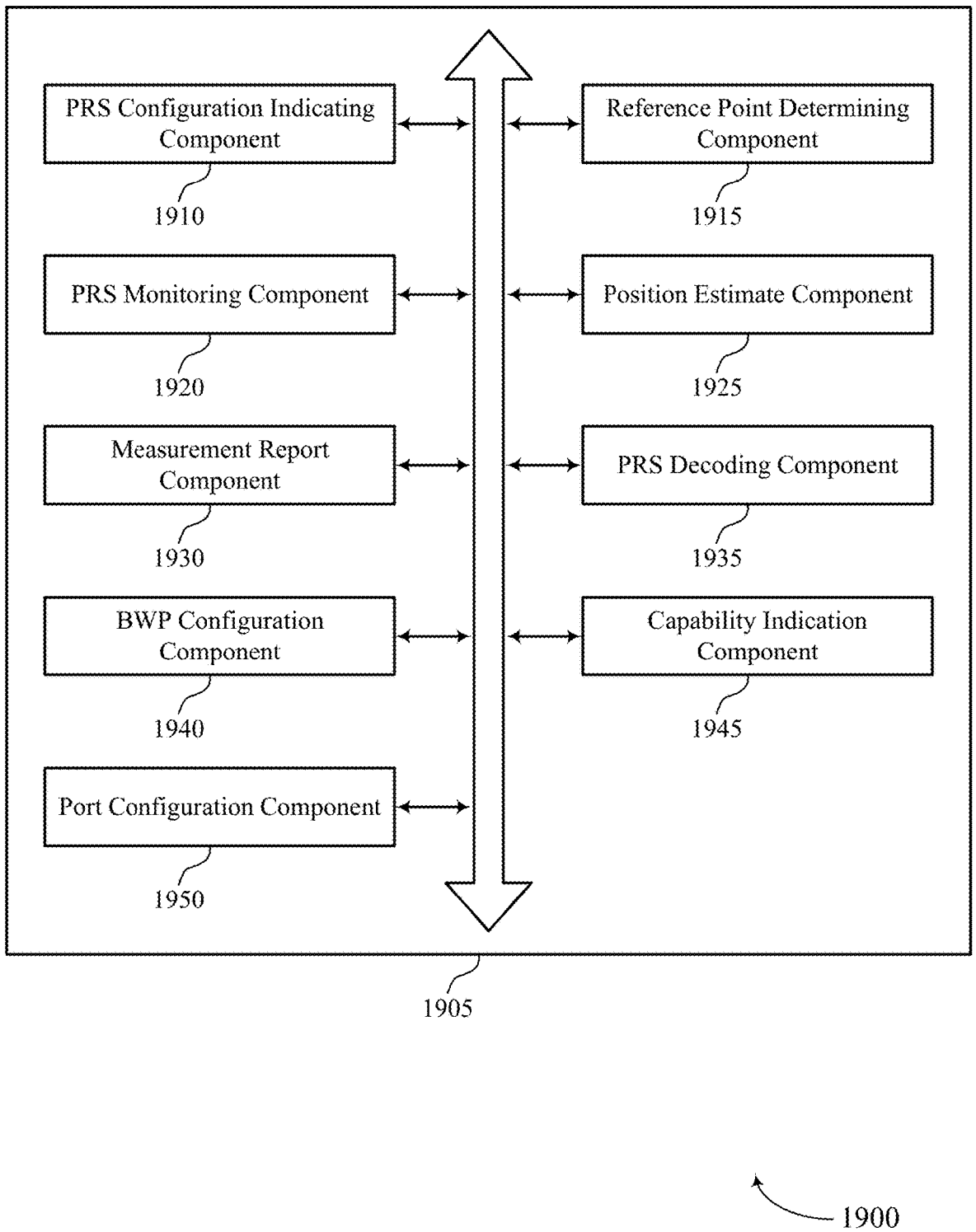
FIG. 19 shows a block diagram of a communications manager that supports aspects of the present disclosure.

FIG. 19 shows a block diagram 1900 of a communications manager 1905 that supports aspects of the present disclosure. The communications manager 1905 may be an example of aspects of a communications manager 1715, a communications manager 1815, or a communications manager 2010 described herein. For example, the communications manager 1905 may be included in a device such as a transmission reception point, a base station 105, or a network entity controlling one or more transmission reception points. The network entity may be a part of a core network (e.g., a core network 130 described with reference to FIG. 1) and may communicate with one or more transmission reception points via backhaul links. The communications manager 1905 may include a PRS configuration indicating component 1910, a reference point determining component 1915, a PRS monitoring component 1920, a position estimate component 1925, a measurement report component 1930, a PRS decoding component 1935, a BWP configuration component 1940, a capability indication component 1945, and a port configuration component 1950. Each of these modules may communicate, directly or indirectly, with one another (e.g., via one or more buses).

The PRS configuration indicating component 1910 may transmit an indication of a positioning reference signal configuration for the transmission reception point.

In some examples, the PRS configuration indicating component 1910 may transmit a message instructing the UE to transmit the positioning reference signal. In some examples, the PRS configuration indicating component 1910 may transmit a gap indicator that indicates one or more symbols before or after a positioning reference signal occasion. In some cases, the message is a RRC message, a higher layer protocol message, a positioning message, an LTE positioning protocol message, a NR positioning message, DCI, or a MAC CE.

The reference point determining component 1915 may determine, based on the positioning reference signal configuration, a reference point within a carrier bandwidth of a component carrier and a frequency domain allocation for a positioning reference signal relative to the reference point. In some examples, the reference point determining component 1915 may determine, based on the positioning reference signal configuration, a start of the frequency domain allocation relative to the reference point and a bandwidth or a number of resource blocks of the frequency domain allocation. In some cases, the reference point differs from a starting resource block of the carrier bandwidth. In some cases, the reference point is a starting resource block of the carrier bandwidth.

The PRS monitoring component 1920 may monitor for a transmission of the positioning reference signal from a UE within the frequency domain allocation. In some examples, the PRS monitoring component 1920 may measure the positioning reference signal within the frequency domain allocation using a subcarrier spacing of the carrier bandwidth that differs from a subcarrier spacing of an active bandwidth part within the carrier bandwidth configured for the UE. In some examples, the PRS monitoring component 1920 may measure the positioning reference signal within the frequency domain allocation using a subcarrier spacing of the carrier bandwidth that is the same as a subcarrier spacing of an active bandwidth part within the carrier bandwidth configured for the UE.

The position estimate component 1925 may determine a positioning estimate of the UE based on receiving the positioning reference signal from the UE within the frequency domain allocation. In some cases, the position estimate component 1925 may transmit positioning information that indicates first location of the transmission reception point and at least a second location of at least a second transmission reception point. The measurement report component 1930 may transmit a positioning reference signal measurement report that indicates a first measurement and a first location of the transmission reception point and at least a second measurement and at least a second location of at least a second transmission reception point.

The PRS decoding component 1935 may determine a scrambling sequence for the positioning reference signal based on the reference point. In some examples, the PRS decoding component 1935 may decode a first sequence from the frequency domain allocation. In some examples, the PRS decoding component 1935 may descramble the first sequence with the scrambling sequence to generate a candidate positioning reference sequence. In some examples, the PRS decoding component 1935 may determine that the candidate positioning reference sequence corresponds to a positioning reference sequence assigned to the UE.

The BWP configuration component 1940 may transmit signaling that configures the UE with at least one bandwidth part and an active bandwidth part within the at least one bandwidth part, where the frequency domain allocation intersects with a bandwidth of the active bandwidth part. In some examples, the BWP configuration component 1940 may determine that an intersection of the frequency domain allocation and the bandwidth of the active bandwidth part satisfies a threshold. In some examples, the BWP configuration component 1940 may configure the UE with the threshold.

In some examples, the BWP configuration component 1940 may transmit a measurement indicator to configure the UE to measure the positioning reference signal over the bandwidth of the frequency domain allocation that exceeds the bandwidth of the active bandwidth part. In some cases, the threshold is based on a capability of the UE, or a type of positioning method, or a configured positioning reference signal pattern, or frequency hopping pattern, or any combination thereof. In some cases, a bandwidth of the frequency domain allocation exceeds the bandwidth of the active bandwidth part. In some cases, the measurement indicator is based on a type of positioning method. In some cases, the active bandwidth part does not change during at least one positioning reference signal occasion or at least one positioning reference signal occasion group.

In some cases, the active bandwidth part does not change during a set of positioning reference signal occasions or a set of positioning reference signal occasion groups within a defined time window. In some cases, the active bandwidth part does not change during a set of positioning reference signal occasions or a set of positioning reference signal occasion groups for measuring a set of positioning reference signals of a set of transmission reception points. In some cases, the frequency domain allocation of the positioning reference signal does not change when the active bandwidth part changes to a second active bandwidth part during at least one positioning reference signal occasion or at least one positioning reference signal occasion group.

The capability indication component 1945 may receive a capability indicator that indicates whether the UE is capable of measuring the positioning reference signal over the bandwidth of the frequency domain allocation that exceeds the bandwidth of the active bandwidth part, where the measurement indicator is based on the capability indicator. In some examples, the capability indication component 1945 may receive a capability indicator that indicates a defined bandwidth support for the positioning reference signal that spans a set of component carriers. In some examples, the capability indication component 1945 may transmit a gap indicator that configures a time domain gap before or after a positioning reference signal occasion. In some examples, the capability indication component 1945 may receive a capability indicator that indicates whether the UE supports measuring the positioning reference signal on a set of active bandwidth parts.

In some examples, the capability indication component 1945 may transmit a measurement indicator that configures the UE to measure the positioning reference signal over at least one of the set of active bandwidth parts based on the capability indicator. In some examples, the capability indication component 1945 may receive a capability indicator that indicates a measurement bandwidth that the UE supports for measuring the positioning reference signal. In some cases, the capability indicator indicates a gap before or after a positioning reference signal occasion.

The port configuration component 1950 may transmit a port indication that indicates a same port has been applied across the frequency domain allocation or a different port has been applied for each component carrier of a set of component carriers, where the frequency domain allocation of the positioning reference signal spans the set of component carriers. In some examples, the port configuration component 1950 may apply a same port across the frequency domain allocation to transmit the positioning reference signal based on the frequency domain allocation of the positioning reference signal spanning a set of component carriers. In some examples, the port configuration component 1950 may apply a same port across the frequency domain allocation to transmit the positioning reference signal based on the frequency domain allocation of the positioning reference signal spanning a set of contiguous component carriers. In some examples, the port configuration component 1950 may apply a same port across the frequency domain allocation to transmit the positioning reference signal based on the frequency domain allocation of the positioning reference signal spanning a set of component carriers within a same frequency band.

In some examples, the port configuration component 1950 may apply a same port across the frequency domain allocation to transmit the positioning reference signal based on the frequency domain allocation of the positioning reference signal spanning a set of component carriers and a frequency domain separation of each pair of the set of component carriers satisfying a threshold. In some examples, the port configuration component 1950 may transmit a port indication that indicates a same port has been applied for each active bandwidth part of a set of active bandwidth parts of the component carrier, where the frequency domain allocation spans the set of active bandwidth parts. In some examples, the port configuration component 1950 may transmit a port indication that indicates a different port has been applied for each active bandwidth part of a set of active bandwidth parts of the component carrier, where the frequency domain allocation spans the set of active bandwidth parts. In some examples, the port configuration component 1950 may apply a same port for each active bandwidth part of a set of active bandwidth parts of the component carrier to transmit the positioning reference signal, where the frequency domain allocation spans the set of active bandwidth parts. In some examples, the port configuration component 1950 may apply a same port for each active bandwidth part of a set of contiguous active bandwidth parts of the component carrier to transmit the positioning reference signal, where the frequency domain allocation spans the set of active bandwidth parts.

Figure 20:
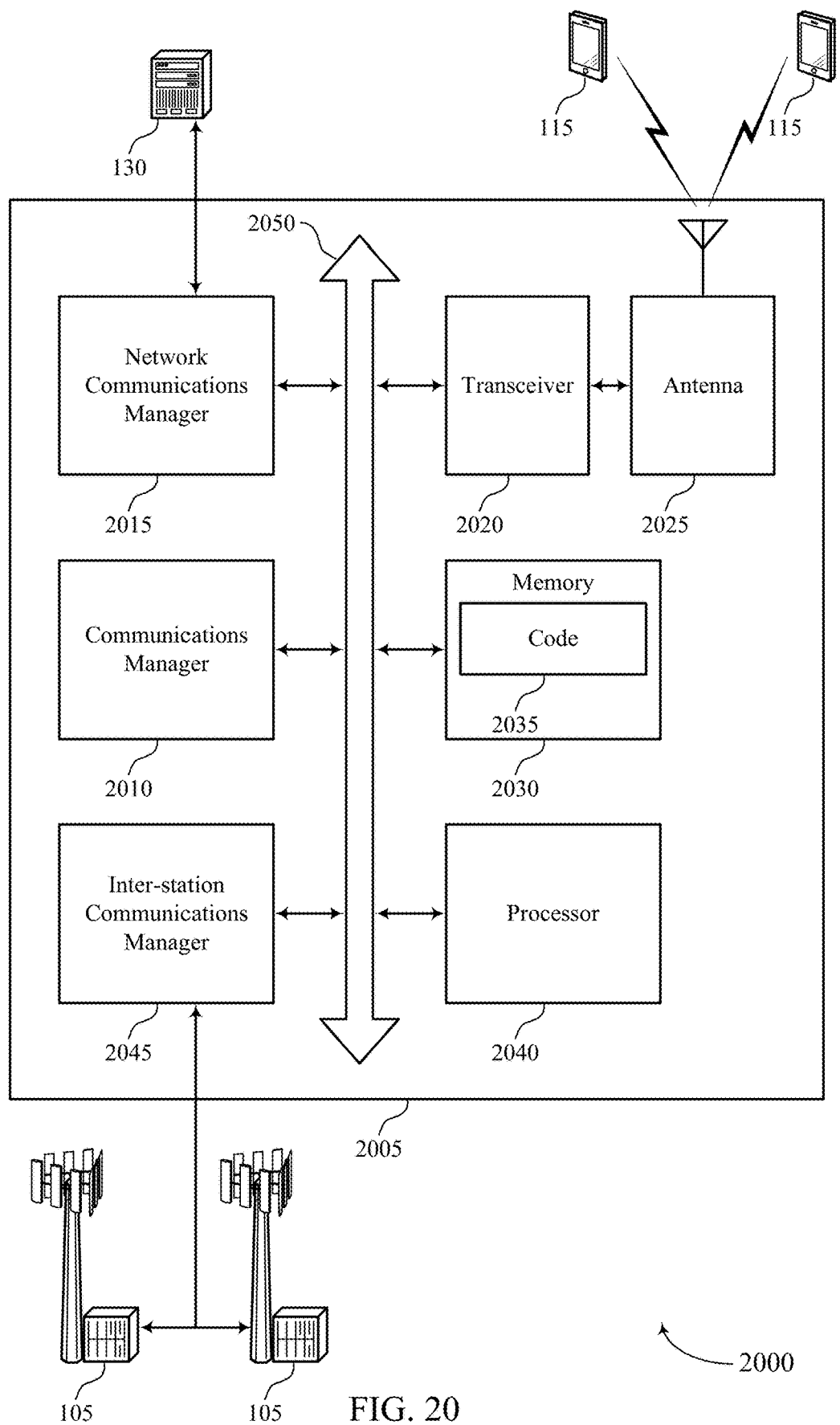
FIG. 20 shows a diagram of a system including a device that supports aspects of the present disclosure.

FIG. 20 shows a diagram of a system 2000 including a device 2005 that supports aspects of the present disclosure. The device 2005 may be an example of or include the components of device 1705, device 1805, or a base station 105 as described herein. The device 2005 may include components for bi-directional voice and data communications including components for transmitting and receiving communications, including a communications manager 2010, a network communications manager 2015, a transceiver 2020, an antenna 2025, memory 2030, a processor 2040, and an inter-station communications manager 2045. These components may be in electronic communication via one or more buses (e.g., bus 2050).

The communications manager 2010 may transmit an indication of a positioning reference signal configuration for the transmission reception point, determine, based on the positioning reference signal configuration, a reference point within a carrier bandwidth of a component carrier and a frequency domain allocation for a positioning reference signal relative to the reference point, and monitor for a transmission of the positioning reference signal from a UE within the frequency domain allocation.

The network communications manager 2015 may manage communications with the core network (e.g., via one or more wired backhaul links). For example, the network communications manager 2015 may manage the transfer of data communications for client devices, such as one or more UEs 115.

The transceiver 2020 may communicate bi-directionally, via one or more antennas, wired, or wireless links as described above. For example, the transceiver 2020 may represent a wireless transceiver and may communicate bi-directionally with another wireless transceiver. The transceiver 2020 may also include a modem to modulate the packets and provide the modulated packets to the antennas for transmission, and to demodulate packets received from the antennas.

In some cases, the wireless device may include a single antenna 2025. However, in some cases the device may have more than one antenna 2025, which may be capable of concurrently transmitting or receiving multiple wireless transmissions.

The memory 2030 may include RAM, ROM, or a combination thereof. The memory 2030 may store computer-readable code 2035 including instructions that, when executed by a processor (e.g., the processor 2040) cause the device to perform various functions described herein. In some cases, the memory 2030 may contain, among other things, a BIOS which may control basic hardware or software operation such as the interaction with peripheral components or devices.

The processor 2040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2040 may be configured to operate a memory array using a memory controller. In some cases, a memory controller may be integrated into processor 2040. The processor 2040 may be configured to execute computer-readable instructions stored in a memory (e.g., the memory 2030) to cause the device 2005 to perform various functions (e.g., functions or tasks supporting bandwidth part considerations for uplink and downlink positioning reference signals).

The inter-station communications manager 2045 may manage communications with other base station 105, and may include a controller or scheduler for controlling communications with UEs 115 in cooperation with other base stations 105. For example, the inter-station communications manager 2045 may coordinate scheduling for transmissions to UEs 115 for various interference mitigation techniques such as beamforming or joint transmission. In some examples, the inter-station communications manager 2045 may provide an X2 interface within an LTE/LTE-A wireless communication network technology to provide communication between base stations 105.

The code 2035 may include instructions to implement aspects of the present disclosure, including instructions to support wireless communications. The code 2035 may be stored in a non-transitory computer-readable medium such as system memory or other type of memory. In some cases, the code 2035 may not be directly executable by the processor 2040 but may cause a computer (e.g., when compiled and executed) to perform functions described herein.

Figure 21:
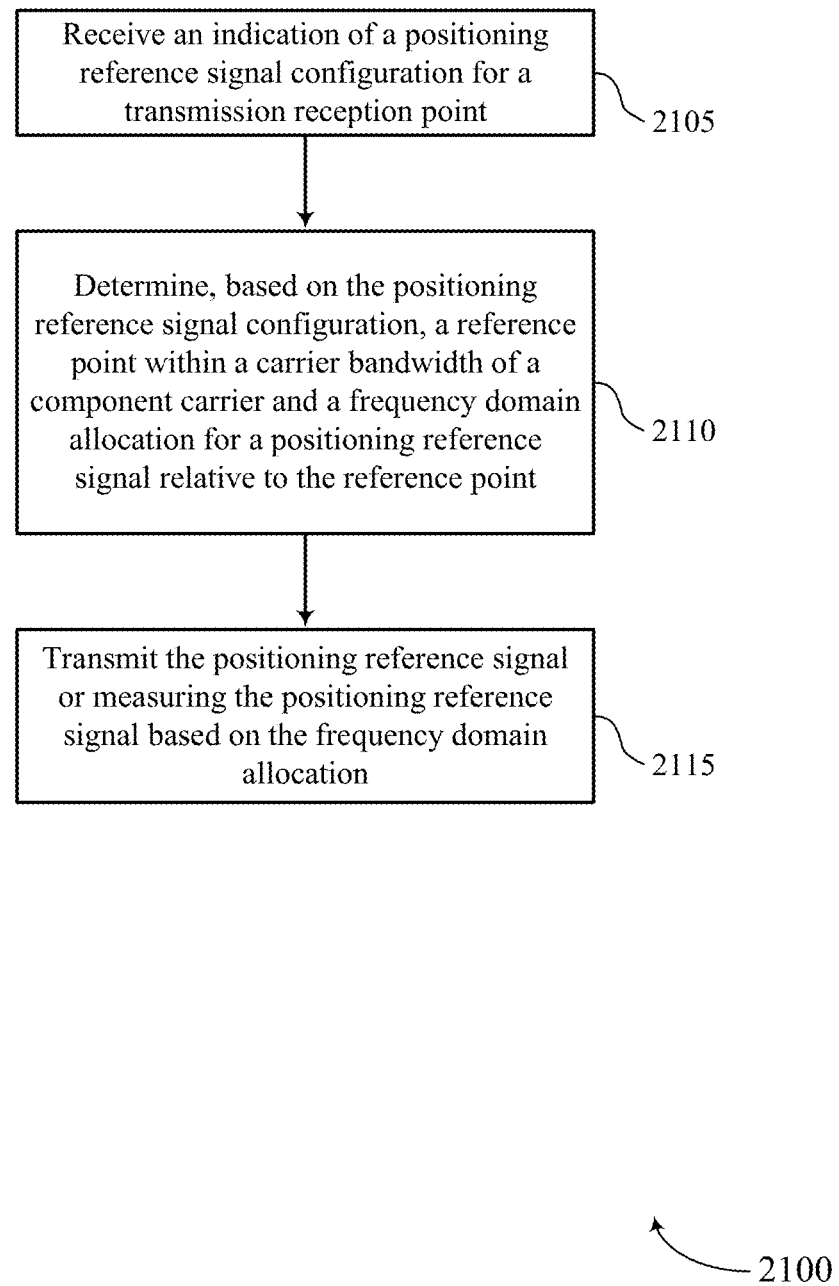
FIGS. 21 through 26 show flowcharts illustrating methods that support aspects of the present disclosure.

FIG. 21 shows a flowchart illustrating a method 2100 that supports aspects of the present disclosure. The operations of method 2100 may be implemented by a UE 115 or its components as described herein. For example, the operations of method 2100 may be performed by a communications manager as described with reference to FIGS. 13 through 16. In some examples, a UE may execute a set of instructions to control the functional elements of the UE to perform the functions described below. Additionally or alternatively, a UE may perform aspects of the functions described below using special-purpose hardware.

At 2105, the UE may receive an indication of a positioning reference signal configuration for a transmission reception point. The operations of 2105 may be performed according to the methods described herein. In some examples, aspects of the operations of 2105 may be performed by a PRS configuration component as described with reference to FIGS. 13 through 16.

At 2110, the UE may determine, based on the positioning reference signal configuration, a reference point within a carrier bandwidth of a component carrier and a frequency domain allocation for a positioning reference signal relative to the reference point. The operations of 2110 may be performed according to the methods described herein. In some examples, aspects of the operations of 2110 may be performed by a reference point component as described with reference to FIGS. 13 through 16.

At 2115, the UE may transmit the positioning reference signal or measuring the positioning reference signal based on the frequency domain allocation. The operations of 2115 may be performed according to the methods described herein. In some examples, aspects of the operations of 2115 may be performed by a PRS transceiver component as described with reference to FIGS. 13 through 16.

Figure 22:
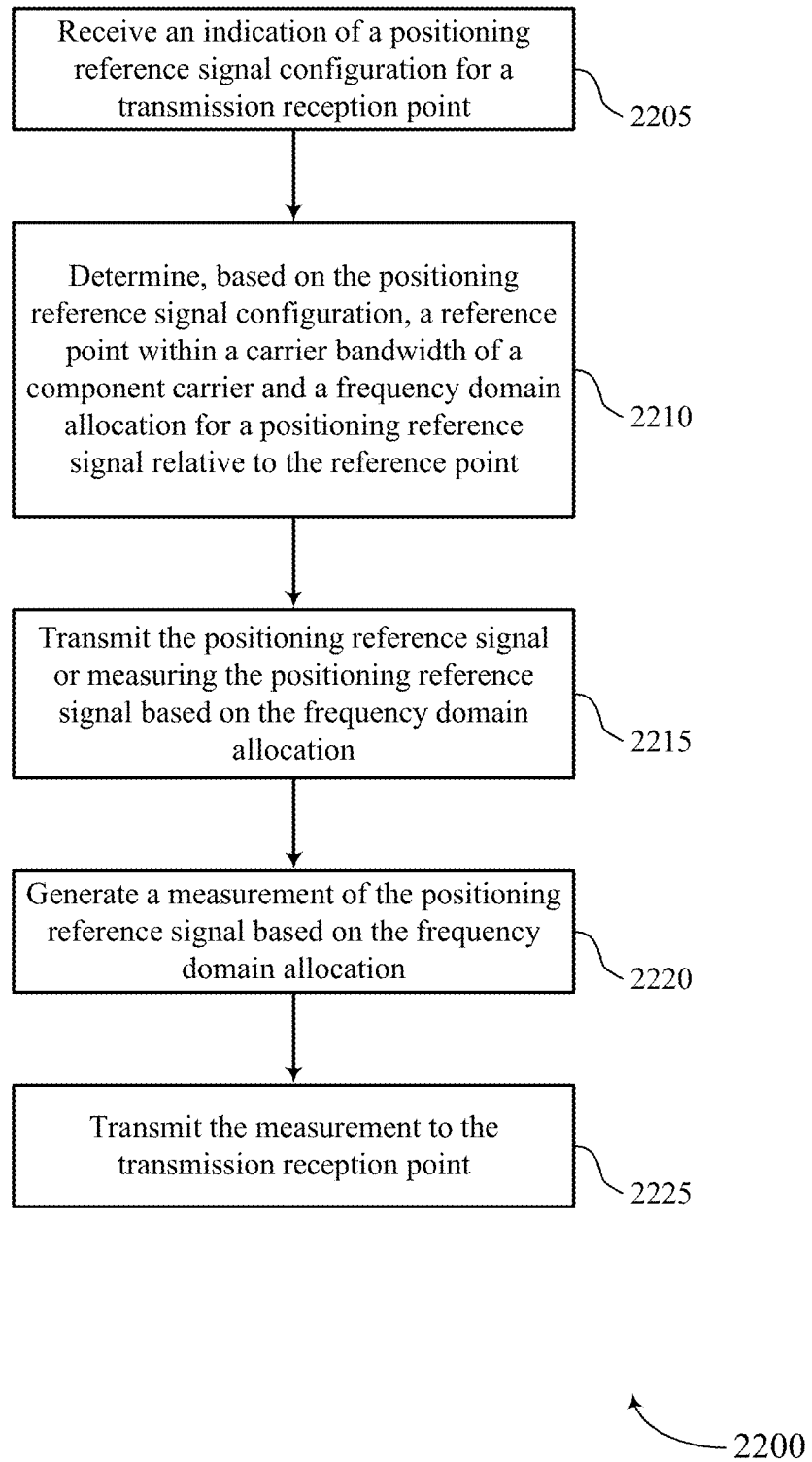

FIG. 22 shows a flowchart illustrating a method 2200 that supports aspects of the present disclosure. The operations of method 2200 may be implemented by a UE 115 or its components as described herein. For example, the operations of method 2200 may be performed by a communications manager as described with reference to FIGS. 13 through 16. In some examples, a UE may execute a set of instructions to control the functional elements of the UE to perform the functions described below. Additionally or alternatively, a UE may perform aspects of the functions described below using special-purpose hardware.

At 2205, the UE may receive an indication of a positioning reference signal configuration for a transmission reception point. The operations of 2205 may be performed according to the methods described herein. In some examples, aspects of the operations of 2205 may be performed by a PRS configuration component as described with reference to FIGS. 13 through 16.

At 2210, the UE may determine, based on the positioning reference signal configuration, a reference point within a carrier bandwidth of a component carrier and a frequency domain allocation for a positioning reference signal relative to the reference point. The operations of 2210 may be performed according to the methods described herein. In some examples, aspects of the operations of 2210 may be performed by a reference point component as described with reference to FIGS. 13 through 16.

At 2215, the UE may transmit the positioning reference signal or measuring the positioning reference signal based on the frequency domain allocation. The operations of 2215 may be performed according to the methods described herein. In some examples, aspects of the operations of 2215 may be performed by a PRS transceiver component as described with reference to FIGS. 13 through 16.

At 2220, the UE may generate a measurement of the positioning reference signal based on the frequency domain allocation. The operations of 2220 may be performed according to the methods described herein. In some examples, aspects of the operations of 2220 may be performed by a measurement report component as described with reference to FIGS. 13 through 16.

At 2225, the UE may transmit the measurement to a network entity. The operations of 2225 may be performed according to the methods described herein. In some examples, aspects of the operations of 2225 may be performed by a measurement report component as described with reference to FIGS. 13 through 16.

Figure 23:
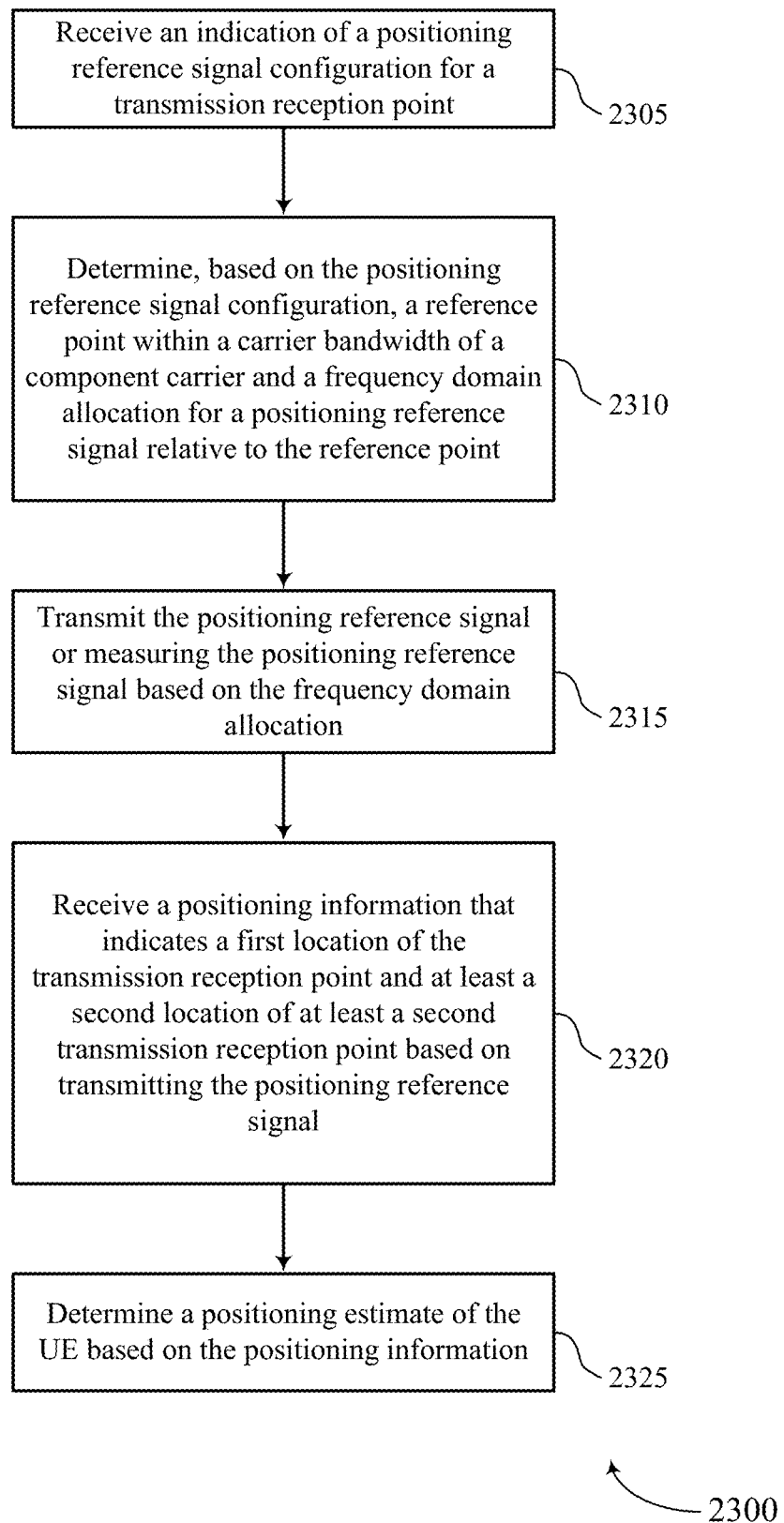

FIG. 23 shows a flowchart illustrating a method 2300 that supports aspects of the present disclosure. The operations of method 2300 may be implemented by a UE 115 or its components as described herein. For example, the operations of method 2300 may be performed by a communications manager as described with reference to FIGS. 13 through 16. In some examples, a UE may execute a set of instructions to control the functional elements of the UE to perform the functions described below. Additionally or alternatively, a UE may perform aspects of the functions described below using special-purpose hardware.

At 2305, the UE may receive an indication of a positioning reference signal configuration for a transmission reception point. The operations of 2305 may be performed according to the methods described herein. In some examples, aspects of the operations of 2305 may be performed by a PRS configuration component as described with reference to FIGS. 13 through 16.

At 2310, the UE may determine, based on the positioning reference signal configuration, a reference point within a carrier bandwidth of a component carrier and a frequency domain allocation for a positioning reference signal relative to the reference point. The operations of 2310 may be performed according to the methods described herein. In some examples, aspects of the operations of 2310 may be performed by a reference point component as described with reference to FIGS. 13 through 16.

At 2315, the UE may transmit the positioning reference signal or measuring the positioning reference signal based on the frequency domain allocation. The operations of 2315 may be performed according to the methods described herein. In some examples, aspects of the operations of 2315 may be performed by a PRS transceiver component as described with reference to FIGS. 13 through 16.

At 2320, the UE may receive a positioning reference signal measurement report that indicates a first measurement and a first location of the transmission reception point and at least a second measurement and at least a second location of at least a second transmission reception point based on transmitting the positioning reference signal. The operations of 2320 may be performed according to the methods described herein. In some examples, aspects of the operations of 2320 may be performed by a positioning estimate component as described with reference to FIGS. 13 through 16.

At 2325, the UE may determine a positioning estimate of the UE based on the positioning reference signal measurement report. The operations of 2325 may be performed according to the methods described herein. In some examples, aspects of the operations of 2325 may be performed by a positioning estimate component as described with reference to FIGS. 13 through 16.

Figure 24:
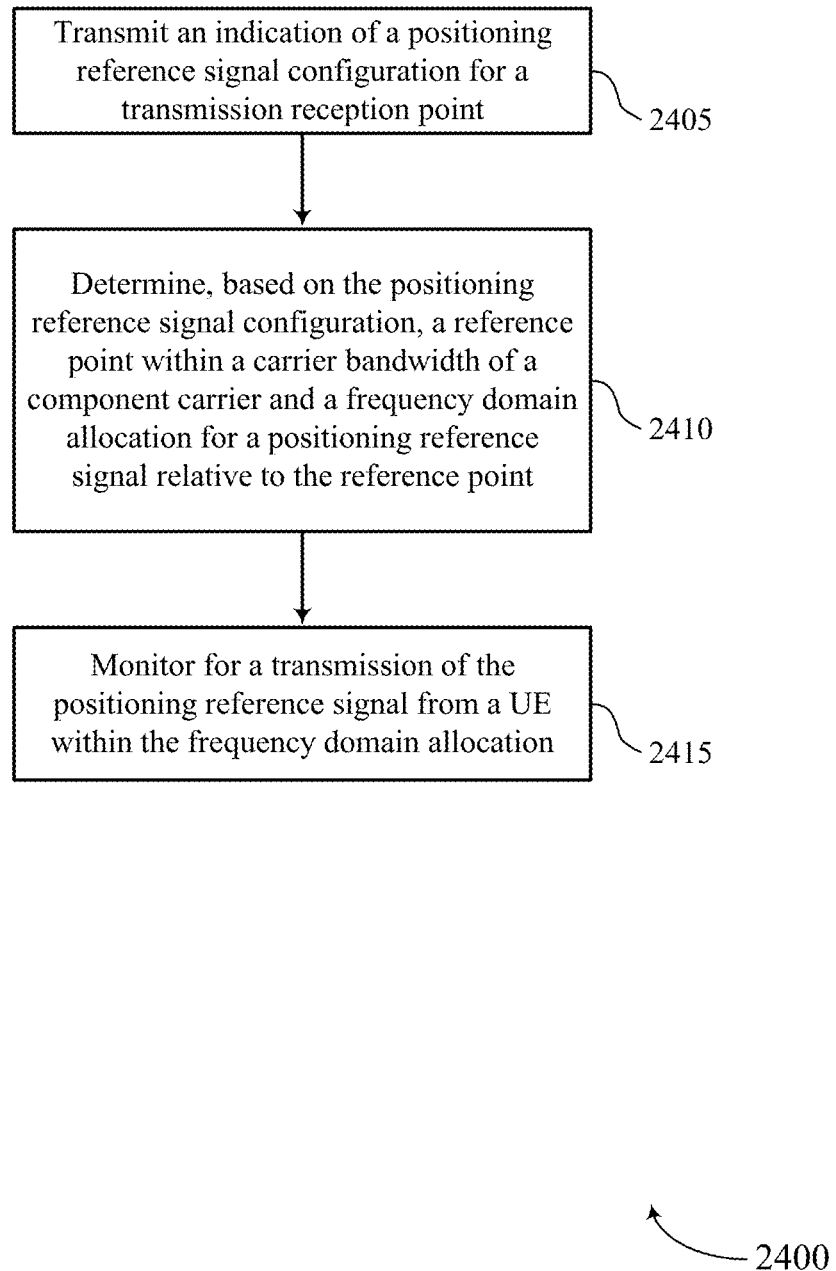

FIG. 24 shows a flowchart illustrating a method 2400 that supports aspects of the present disclosure. The operations of method 2400 may be implemented by a base station 105 or its components as described herein. For example, the operations of method 2400 may be performed by a communications manager as described with reference to FIGS. 17 through 20.

In some examples, a base station may execute a set of instructions to control the functional elements of the base station to perform the functions described below. Additionally or alternatively, a base station may perform aspects of the functions described below using special-purpose hardware. In some cases, some operations of the method 2400 may be performed by a transmission reception point, such as a base station 105. In some cases, the network entity may instruct which of the operations the transmission reception point is to perform. For example, the network entity may perform some of these operations via one or more transmission reception points.

At 2405, a network entity may transmit an indication of a positioning reference signal configuration for the transmission reception point. The operations of 2405 may be performed according to the methods described herein. In some examples, aspects of the operations of 2405 may be performed by a PRS configuration indicating component as described with reference to FIGS. 17 through 20.

At 2410, the network entity may determine, based on the positioning reference signal configuration, a reference point within a carrier bandwidth of a component carrier and a frequency domain allocation for a positioning reference signal relative to the reference point. The operations of 2410 may be performed according to the methods described herein. In some examples, aspects of the operations of 2410 may be performed by a reference point determining component as described with reference to FIGS. 17 through 20.

At 2415, the network entity may monitor for a transmission of the positioning reference signal from a UE within the frequency domain allocation. The operations of 2415 may be performed according to the methods described herein. In some examples, aspects of the operations of 2415 may be performed by a PRS monitoring component as described with reference to FIGS. 17 through 20.

Figure 25:
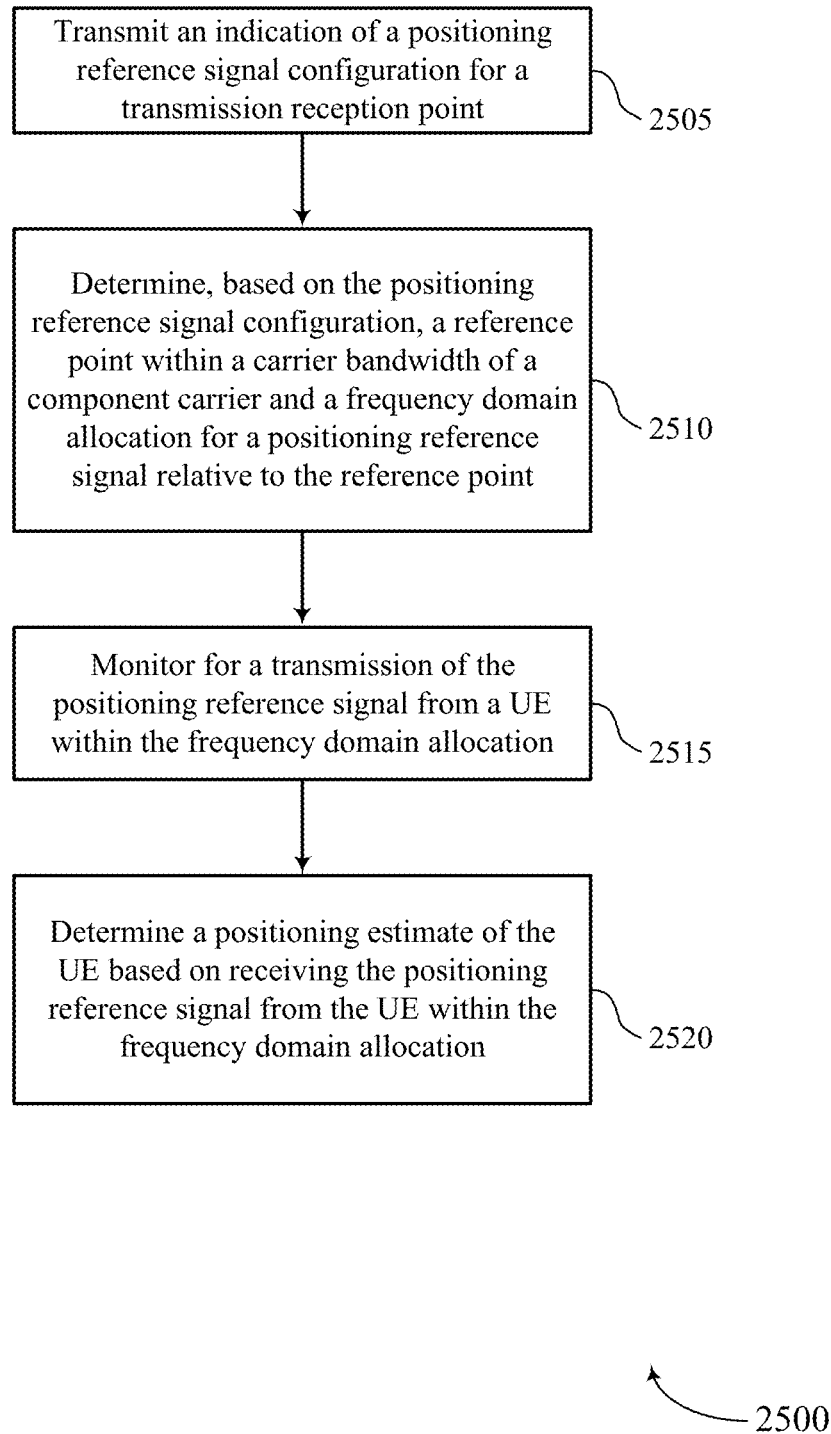

FIG. 25 shows a flowchart illustrating a method 2500 that supports aspects of the present disclosure. The operations of method 2500 may be implemented by a base station 105 or its components as described herein. For example, the operations of method 2500 may be performed by a communications manager as described with reference to FIGS. 17 through 20.

In some examples, a base station may execute a set of instructions to control the functional elements of the base station to perform the functions described below. Additionally or alternatively, a base station may perform aspects of the functions described below using special-purpose hardware. In some cases, some operations of the method 2500 may be performed by a transmission reception point, such as a base station 105. In some cases, the network entity may instruct which of the operations the transmission reception point is to perform. For example, the network entity may perform some of these operations via one or more transmission reception points.

At 2505, a network entity may transmit an indication of a positioning reference signal configuration for a transmission reception point. The operations of 2505 may be performed according to the methods described herein. In some examples, aspects of the operations of 2505 may be performed by a PRS configuration indicating component as described with reference to FIGS. 17 through 20.

At 2510, the network entity may determine, based on the positioning reference signal configuration, a reference point within a carrier bandwidth of a component carrier and a frequency domain allocation for a positioning reference signal relative to the reference point. The operations of 2510 may be performed according to the methods described herein. In some examples, aspects of the operations of 2510 may be performed by a reference point determining component as described with reference to FIGS. 17 through 20.

At 2515, the network entity may monitor for a transmission of the positioning reference signal from a UE within the frequency domain allocation. The operations of 2515 may be performed according to the methods described herein. In some examples, aspects of the operations of 2515 may be performed by a PRS monitoring component as described with reference to FIGS. 17 through 20.

At 2520, the network entity may determine a positioning estimate of the UE based on receiving the positioning reference signal from the UE within the frequency domain allocation. The operations of 2520 may be performed according to the methods described herein. In some examples, aspects of the operations of 2520 may be performed by a position estimate component as described with reference to FIGS. 17 through 20.

Figure 26:
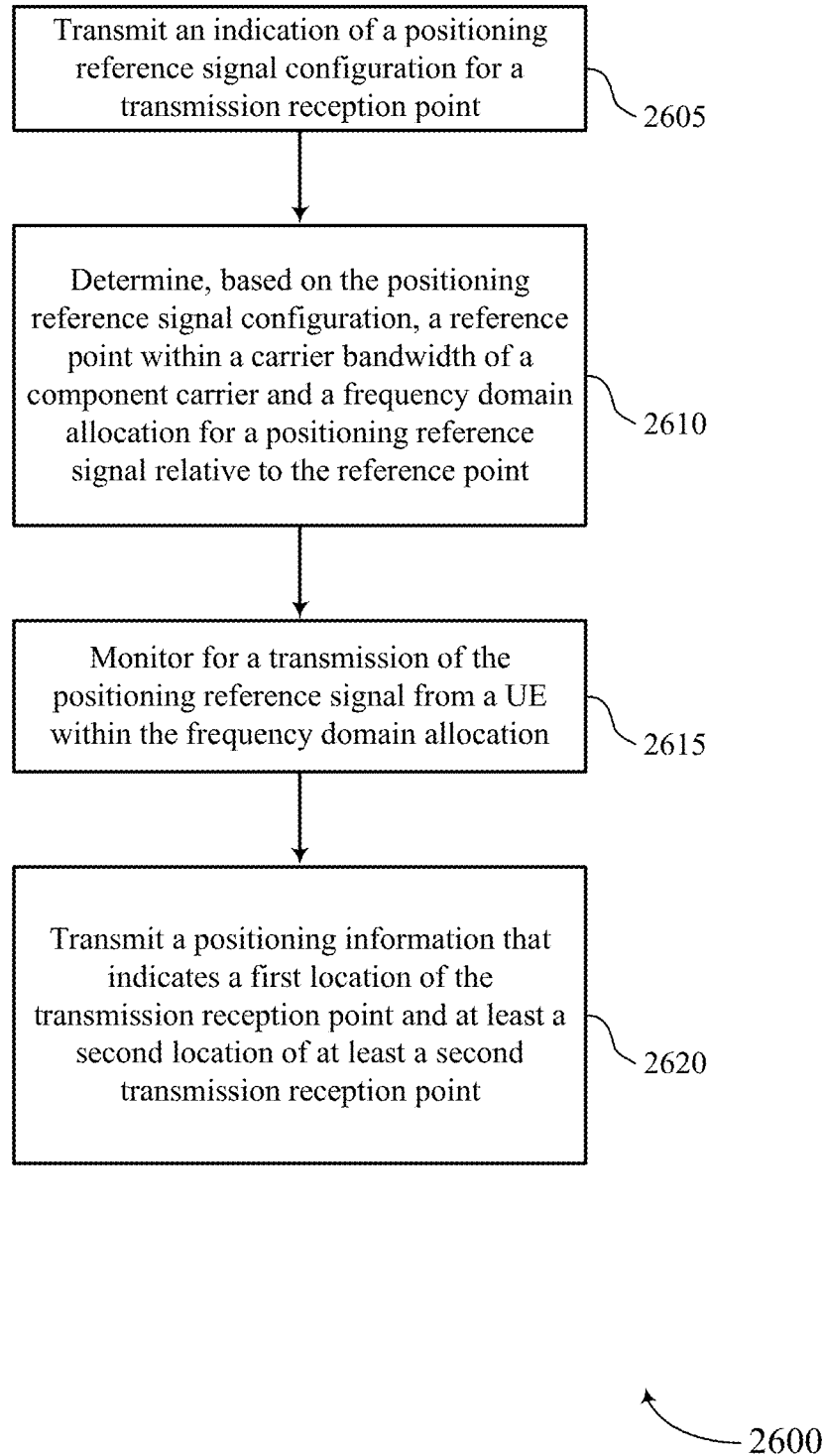

FIG. 26 shows a flowchart illustrating a method 2600 that supports aspects of the present disclosure. The operations of method 2600 may be implemented by a base station 105 or its components as described herein. For example, the operations of method 2600 may be performed by a communications manager as described with reference to FIGS. 17 through 20.

In some examples, a base station may execute a set of instructions to control the functional elements of the base station to perform the functions described below. Additionally or alternatively, a base station may perform aspects of the functions described below using special-purpose hardware. In some cases, some operations of the method 2600 may be performed by a transmission reception point, such as a base station 105. In some cases, the network entity may instruct which of the operations the transmission reception point is to perform. For example, the network entity may perform some of these operations via one or more transmission reception points.

At 2605, a network entity may transmit an indication of a positioning reference signal configuration for a transmission reception point. The operations of 2605 may be performed according to the methods described herein. In some examples, aspects of the operations of 2605 may be performed by a PRS configuration indicating component as described with reference to FIGS. 17 through 20.

At 2610, the network entity may determine, based on the positioning reference signal configuration, a reference point within a carrier bandwidth of a component carrier and a frequency domain allocation for a positioning reference signal relative to the reference point. The operations of 2610 may be performed according to the methods described herein. In some examples, aspects of the operations of 2610 may be performed by a reference point determining component as described with reference to FIGS. 17 through 20.

At 2615, the network entity may monitor for a transmission of the positioning reference signal from a UE within the frequency domain allocation. The operations of 2615 may be performed according to the methods described herein. In some examples, aspects of the operations of 2615 may be performed by a PRS monitoring component as described with reference to FIGS. 17 through 20.

At 2620, the network entity may transmit a positioning reference signal measurement report that indicates a first measurement and a first location of the transmission reception point and at least a second measurement and at least a second location of at least a second transmission reception point. The operations of 2620 may be performed according to the methods described herein. In some examples, aspects of the operations of 2620 may be performed by a measurement report component as described with reference to FIGS. 17 through 20.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A user equipment (UE) for wireless communication, comprising:
one or more memories storing processor-executable code; and
one or more processors coupled with the one or more memories and individually or collectively operable to execute the code to cause the UE to:
receive, via a first signaling, an indication of a positioning reference signal configuration for one or more transmission reception points, the positioning reference signal configuration associated with a positioning reference signal and indicating a reference point within a carrier bandwidth of a component carrier and a bandwidth or a number of resource blocks of a positioning reference signal resource;
determine, based at least in part on the positioning reference signal configuration, a start of the positioning reference signal resource that is offset by a gap in frequency relative to the reference point;
receive an indication of a measurement gap and an indication to measure the positioning reference signal over the bandwidth or the number of resource blocks of the positioning reference signal resource that is at least partially outside an active bandwidth part; and
measure, during the measurement gap, the positioning reference signal on the positioning reference signal resource that is at least partially outside the active bandwidth part.

2. The UE of claim 1, wherein the one or more processors are individually or collectively further operable to cause the UE to:
generate a measurement of the positioning reference signal based at least in part on the positioning reference signal resource; and
transmit the measurement to a network entity.

3. The UE of claim 1, wherein the one or more processors are individually or collectively further operable to cause the UE to:
determine a positioning estimate of the UE based at least in part on measuring the positioning reference signal within the positioning reference signal resource.

4. The UE of claim 1, wherein the one or more processors are individually or collectively further operable to cause the UE to:
receive positioning information that indicates a first location of a first transmission reception point and at least a second location of at least a second transmission reception point; and
determine a positioning estimate of the UE based at least in part on the positioning information.

5. The UE of claim 1, wherein the one or more processors are individually or collectively further operable to cause the UE to:
receive a positioning reference signal measurement report that indicates a first measurement and a first location of a first transmission reception point and at least a second measurement and at least a second location of at least a second transmission reception point; and
determine a positioning estimate of the UE based at least in part on the positioning reference signal measurement report.

6. The UE of claim 1, wherein the reference point differs from a starting resource block of the carrier bandwidth.

7. The UE of claim 6, wherein the one or more processors are individually or collectively further operable to cause the UE to:
determine a scrambling sequence for the positioning reference signal based at least in part on the reference point;

scramble a first sequence with the scrambling sequence to generate a positioning reference sequence; and generate the positioning reference signal based at least in part on the positioning reference sequence.

8. The UE of claim 6, wherein the one or more processors are individually or collectively further operable to cause the UE to:

measure the positioning reference signal within the positioning reference signal resource using a subcarrier spacing of the carrier bandwidth that differs from a subcarrier spacing of the active bandwidth part within the carrier bandwidth configured for the UE.

9. The UE of claim 1, wherein the reference point is a starting resource block of the carrier bandwidth.

10. The UE of claim 9, wherein the one or more processors are individually or collectively further operable to cause the UE to:

measure the positioning reference signal within the positioning reference signal resource using a subcarrier spacing of the carrier bandwidth that is the same as a subcarrier spacing of the active bandwidth part within the carrier bandwidth configured for the UE.

11. The UE of claim 1, wherein the one or more processors are individually or collectively further operable to cause the UE to:

receive a second indication of a second positioning reference signal configuration of a second transmission reception point;

determine, based at least in part on the second positioning reference signal configuration, a second reference point within the carrier bandwidth of the component carrier and a second positioning reference signal resource for a second positioning reference signal relative to the second reference point; and transmit the second positioning reference signal or measuring the second positioning reference signal within the second positioning reference signal resource.

12. The UE of claim 1, wherein the UE maintains transmission of the positioning reference signal throughout a duration of a connection with the one or more transmission reception points based at least in part on received RRC signaling or a received configuration.

13. The UE of claim 1, wherein the UE maintains transmission of the positioning reference signal beginning after receiving a first medium access control (MAC) control element (CE) and until receiving a second MAC CE that de-activates the transmission of the positioning reference signal.

14. The UE of claim 1, wherein the measurement gap comprises one or more symbols before or after a positioning reference signal occasion.

15. The UE of claim 1, wherein the one or more processors are individually or collectively further operable to cause the UE to:

receive signaling that configures the UE with at least one bandwidth part and the active bandwidth part from the at least one bandwidth part, wherein the positioning reference signal resource intersects with a bandwidth of the active bandwidth part.

16. The UE of claim 15, wherein the one or more processors are individually or collectively further operable to cause the UE to:

determine that an intersection of the positioning reference signal resource and the bandwidth of the active bandwidth part satisfies a threshold.

17. The UE of claim 15, wherein the active bandwidth part does not change during at least one positioning reference signal occasion or at least one positioning reference signal occasion group.

18. The UE of claim 15, wherein the active bandwidth part does not change during a plurality of positioning reference signal occasions or a plurality of positioning reference signal occasion groups within a defined time window.

19. The UE of claim 15, wherein the active bandwidth part does not change during a plurality of positioning reference signal occasions or a plurality of positioning reference signal occasion groups for measuring a positioning reference signal of a plurality of transmission reception points.

20. The UE of claim 15, wherein the positioning reference signal resource of the positioning reference signal does not change when the active bandwidth part changes to a second active bandwidth part during at least one positioning reference signal occasion or at least one positioning reference signal occasion group.

21. The UE of claim 1, wherein the bandwidth or the number of resource blocks of the positioning reference signal resource exceeds a bandwidth of the active bandwidth part.

22. The UE of claim 1, wherein the one or more processors are individually or collectively further operable to cause the UE to:

transmit a capability indicator that indicates a defined bandwidth support for the positioning reference signal that spans a plurality of component carriers, wherein the measurement gap comprises a time domain gap before or after a positioning reference signal occasion.

23. The UE of claim 1, wherein the one or more processors are individually or collectively further operable to cause the UE to:

receive the positioning reference signal, wherein measuring the positioning reference signal is based at least in part on receiving the positioning reference signal.

24. The UE of claim 1, wherein the one or more processors are individually or collectively further operable to cause the UE to:

receive a port indication that indicates to apply a same port across the positioning reference signal resource or to apply a different port for each component carrier of a plurality of component carriers, wherein the positioning reference signal resource spans the plurality of component carriers.

25. The UE of claim 24, wherein the one or more processors are individually or collectively further operable to cause the UE to:

determine to apply the same port across the positioning reference signal resource based at least in part on the positioning reference signal resource spanning the plurality of component carriers.

26. A network entity for wireless communication, comprising:

one or more memories storing processor-executable code; and one or more processors coupled with the one or more memories and individually or collectively operable to execute the code to cause the network entity to:

transmit, via a first signaling, an indication of a positioning reference signal configuration for one or more transmission reception points, the positioning reference signal configuration associated with a positioning reference signal and indicating a reference point within a carrier bandwidth of a component carrier and a bandwidth or a number of resource blocks of a positioning reference signal resource;

determine, based at least in part on the positioning reference signal configuration, a start of the positioning reference signal resource that is offset by a gap in frequency relative to the reference point;

transmit an indication of a measurement gap and an indication for a user equipment (UE) to measure the positioning reference signal over the bandwidth or the number of resource blocks of the positioning reference signal resource that is at least partially outside an active bandwidth part; and transmit, during the measurement gap, the positioning reference signal to the UE on the positioning reference signal resource that is at least partially outside the active bandwidth part.

27. A method for wireless communication by a user equipment (UE), comprising:

receiving, via a first signaling, an indication of a positioning reference signal configuration for one or more transmission reception points, the positioning reference signal configuration associated with a positioning reference signal and indicating a reference point within a carrier bandwidth of a component carrier and a bandwidth or a number of resource blocks of a positioning reference signal resource;

determining, based at least in part on the positioning reference signal configuration, a start of the positioning reference signal resource that is offset by a gap in frequency relative to the reference point;

receiving an indication of a measurement gap and an indication to measure the positioning reference signal over the bandwidth or the number of resource blocks of the positioning reference signal resource that is at least partially outside an active bandwidth part; and measuring, during the measurement gap, the positioning reference signal on the positioning reference signal resource that is at least partially outside the active bandwidth part.

28. The method of claim 27, further comprising:

generating a measurement of the positioning reference signal based at least in part on the positioning reference signal resource; and transmitting the measurement to a network entity.

29. The method of claim 27, further comprising:

determining a positioning estimate of the UE based at least in part on measuring the positioning reference signal within the positioning reference signal resource.

30. A method for wireless communication by a network entity, comprising:

transmitting, via a first signaling, an indication of a positioning reference signal configuration for one or more transmission reception points, the positioning reference signal configuration associated with a positioning reference signal and indicating a reference point within a carrier bandwidth of a component carrier and a bandwidth or a number of resource blocks of a positioning reference signal resource;

determining, based at least in part on the positioning reference signal configuration, a start of the positioning reference signal resource that is offset by a gap in frequency relative to the reference point;

transmitting an indication of a measurement gap and an indication for a user equipment (UE) to measure the positioning reference signal over the bandwidth or the number of resource blocks of the positioning reference signal resource that is at least partially outside an active bandwidth part; and transmitting, during the measurement gap, the positioning reference signal to the UE on the positioning reference signal resource that is at least partially outside the active bandwidth part.

\* \* \* \* \*